US010652640B2

(12) United States Patent
Chase et al.

(10) Patent No.: US 10,652,640 B2
(45) Date of Patent: May 12, 2020

(54) VIDEO HEADPHONES, SYSTEM, PLATFORM, METHODS, APPARATUSES AND MEDIA

(71) Applicant: Stephen Chase, Freeport, NY (US)

(72) Inventors: Stephen Chase, Freeport, NY (US); Dmitry Alekseevich Gorilovsky, Nuremberg (DE)

(73) Assignee: SOUNDSIGHT IP, LLC, New York, NY (US)

( * ) Notice: Subject to any disclaimer, the term of this patent is extended or adjusted under 35 U.S.C. 154(b) by 0 days.

(21) Appl. No.: 14/092,088

(22) Filed: Nov. 27, 2013

(65) Prior Publication Data
US 2014/0161412 A1   Jun. 12, 2014

Related U.S. Application Data

(60) Provisional application No. 61/731,126, filed on Nov. 29, 2012.

(51) Int. Cl.
*H04R 1/02*      (2006.01)
*H04N 21/4223*   (2011.01)
(Continued)

(52) U.S. Cl.
CPC .......... *H04R 1/028* (2013.01); *G11B 27/031* (2013.01); *H04N 5/77* (2013.01); *H04N 9/79* (2013.01);
(Continued)

(58) Field of Classification Search
USPC ................. 386/223–224, 239–248, 278–290
See application file for complete search history.

(56) References Cited

U.S. PATENT DOCUMENTS 5,521,638 A  *  5/1996  Dezaki et al. ........... 348/208.16
7,593,618 B2 *  9/2009  Xu ........................ G06F 16/786
                                                       386/239
(Continued)

FOREIGN PATENT DOCUMENTS

DE    10 2008 010 040 A1    8/2009
WO    WO 2012/018271 A1 *   2/2012  ........... H04N 21/218

OTHER PUBLICATIONS

International Search Report, dated Apr. 16, 2014, and Written Opinion issued in corresponding International Application No. PCT/US2013/072270.

(Continued)

*Primary Examiner* — Hung Q Dang
(74) *Attorney, Agent, or Firm* — Rafael Perez-Pineiro, Esq.; The Brickell IP Group, PLLC

(57) ABSTRACT

There are provided music headphones including a pair of small loudspeakers for high quality stereo music reproduction, in which at least one integral video camera is built into the headphones and the headphones include at least one connection to a physically separate portable music device, such as a smartphone, where at least one of the connections enables (i) high quality playback of stereo music from the portable music device using the small loudspeakers; and at least one of the connections enables (ii) transferring of video data from the or each video camera to the portable music device for one or more of: editing or mixing music or other audio in order to create a soundtrack for a video recording, or sharing a video recording, and where the video data is editable.

34 Claims, 71 Drawing Sheets

(51) Int. Cl.
*H04N 21/4788* (2011.01)
*H04N 21/2743* (2011.01)
*H04N 21/472* (2011.01)
*H04N 5/77* (2006.01)
*G11B 27/031* (2006.01)
*H04N 9/79* (2006.01)
*H04R 5/033* (2006.01)

(52) U.S. Cl.
CPC ..... *H04N 21/2743* (2013.01); *H04N 21/4223* (2013.01); *H04N 21/4788* (2013.01); *H04N 21/47205* (2013.01); *H04R 5/033* (2013.01); *H04R 2201/10* (2013.01)

(56) References Cited

U.S. PATENT DOCUMENTS

| | | | |
|---|---|---|---|
| 2006/0013079 A1* | 1/2006 | Rekimoto | 369/30.01 |
| 2006/0204214 A1* | 9/2006 | Shah et al. | 386/54 |
| 2006/0239648 A1 | 10/2006 | Varghese et al. | |
| 2007/0121959 A1* | 5/2007 | Philipp | 381/74 |
| 2007/0123192 A1* | 5/2007 | Sinai | 455/403 |
| 2008/0215620 A1* | 9/2008 | Folgner et al. | 707/104.1 |
| 2009/0281435 A1 | 11/2009 | Ahmed | |
| 2010/0220197 A1 | 9/2010 | Dukellis et al. | |
| 2010/0245585 A1* | 9/2010 | Fisher et al. | 348/164 |
| 2010/0324919 A1* | 12/2010 | Shore | 705/1.1 |
| 2011/0085041 A1* | 4/2011 | Kildevaeld | H04N 7/181 348/158 |
| 2011/0228983 A1 | 9/2011 | Matsuda | |
| 2012/0035883 A1* | 2/2012 | Teissier et al. | 702/150 |
| 2012/0045084 A1* | 2/2012 | Groset et al. | 381/384 |
| 2012/0096357 A1* | 4/2012 | Folgner et al. | 715/726 |
| 2012/0204225 A1* | 8/2012 | Cohen | 726/3 |
| 2013/0202274 A1* | 8/2013 | Chan | 386/362 |
| 2013/0278631 A1* | 10/2013 | Border et al. | 345/633 |
| 2014/0013271 A1* | 1/2014 | Moore et al. | 715/792 |

OTHER PUBLICATIONS

Kee, concept headphones captures images as well. ubergizmo. [retrieved on Apr. 2, 2014] retrieved from the internat: <URL: http://www.ubergizmo.com/2010/02/concept-headphones-captures-images-as-well/>, by Edwin Kee on Feb. 25, 2010.

Communication About Intention to Grant a European Patent, European Patent Office, dated Apr. 1, 2019.

Supplementary European Search Report, European Patent Office, dated Jun. 17, 2016.

"PIGear, Earphone Camera, PV500, PV700, PV800," retrieved from the Internet; URL: http://pigear.com/store/Earphone-Camera_PV500-Series-p530.html; pp. 1-2 [retrieved on Sep. 17, 2017].

* cited by examiner

FIGURE 33

Camera Detects Movement of Subject
Stitching all images captured from the 3 cameras, providing a constant radius image, for example.

Camera Detects Movement of Subject Moving along the track from Socket 1 to Socket 3, capturing a constant radius image, for example.

VIDEO HEADPHONES, SYSTEM, PLATFORM, METHODS, APPARATUSES AND MEDIA

CROSS-REFERENCE TO RELATED APPLICATIONS

This application is based on, and claims priority to, U.S. Provisional Application No. 61/731,126, filed Nov. 29, 2012, the entire contents of which is fully incorporated herein by reference.

This disclosure includes a description of VIDEO HEADPHONES PLATFORM METHODS, APPARATUSES AND MEDIA (hereinafter "VHP"). A portion of the disclosure of this patent document contains material which is subject to copyright and/or mask work protection. The copyright and/or mask work owners have no objection to the facsimile reproduction by anyone of the patent document or the patent disclosure, as it appears in the US Patent and Trademark Office or World Intellectual Property Organization patent file or records, but otherwise reserve all copyright and mask work rights whatsoever.

BACKGROUND OF THE INVENTION

1. Field of the Invention

The present disclosure is directed generally to video headphones, to systems including video headphones, especially to systems including video headphones connected to mobile devices, to methods including use of video headphones or mobile devices which are connectable to video headphones and to media created using video headphones.

2. Technical Background

Many different types of headphones currently exist on the market. Some headphones concentrate more on providing optimal sound reproduction (e.g., high fidelity sound reproduction), while others concentrate on portability (e.g., small size, light weight, foldable). Headphones may obtain an audio signal from an audio source (e.g., a portable music player) either via an audio cable or via a wireless receiver.

SUMMARY OF THE INVENTION

According to a first aspect of the invention, there are provided music headphones including a pair of small loudspeakers for high quality stereo music reproduction, in which at least one integral video camera is built into the headphones and the headphones include at least one connection to a physically separate portable music device, such as a smartphone;

wherein at least one of the connections enables (i) high quality playback of stereo music from the portable music device using the small loudspeakers; and at least one of the connections enables (ii) transferring of video data from the or each video camera to the portable music device for one or more of: editing or mixing music or other audio in order to create a soundtrack for a video recording, or sharing a video recording, and wherein the video data is editable.

The music headphones may be ones in which the music headphones provide hi-fi stereo music reproduction and are circum-aural, with an earpad that surrounds each outer ear of the user, or supra-aural, with an earpad that is pressed upon each outer ear of the user, and wherein the earpads are attached to a loudspeaker housing and that housing conceals the or each video camera.

The music headphones may be ones in which a user can record a video, such as a point of view (POV) video using the or each integral video camera, and the user can select at least one music track, genre, channel or playlist stored or accessible from the portable music device, to be the soundtrack to that video.

The music headphones may be ones in which the selected track, genre, channel or playlist that forms the soundtrack to the video is being played by the portable music device over the music headphones at the time the video is being recorded.

The music headphones may be ones in which the selected track, genre, channel or playlist is not being played by the portable music device over the music headphones at the time the video is being recorded, but instead is subsequently selected by the user interacting with the portable music device and is then made the soundtrack to that video.

The music headphones may be ones in which a body of the or each integral video camera is entirely contained within a speaker housing of the headphones.

The music headphones may be ones in which the presence of a camera lens is the only visible object or structure denoting the presence of a video camera in the music headphones.

The music headphones may be ones in which a surface of the or each video camera forms a contiguous surface with the surface of a speaker housing.

The music headphones may be ones in which the headphones include a motion sensor, such as an accelerometer or gyro, to detect motion.

The music headphones may be ones in which the motion sensor is used for image stabilisation of the image filmed by the or each integral video camera.

The music headphones may be ones which include a sensor to detect whether they are being worn or not, and to automatically pause music playback when not being worn.

The music headphones may be ones which include a sensor to detect whether they are being worn or not, and to automatically pause video recording when not being worn.

The music headphones may be ones in which the or each video camera is positioned inside rotatable units that form part of the speaker housing, enabling the user to alter the orientation of the or each camera, including for example one forward POV and one rearward POV.

The music headphones may be ones in which there is a video camera positioned inside a rotatable unit that forms part of the loudspeaker housing for each housing, and each unit is independently rotatable.

The music headphones may be ones in which the music headphones include multiple integral video cameras.

The music headphones may be ones in which a position of each video camera can be altered by sliding that camera along a member, such as part of a headband of the music headphones.

The music headphones may be ones in which the connection to the portable music device includes a physical connector selected from the list: an audio jack, phone jack, phone plug, jack plug, stereo plug, mini-stereo, mini jack, headphone jack, USB, USB OTG, Firewire, Thunderbolt.

The music headphones may be ones in which the connection to the portable music device includes a short-distance wireless connection, such as Bluetooth A2DP, or Wi-Fi.

The music headphones may be ones which are not headsets as such because, inter alia, no microphone is present.

The music headphones may be ones including multiple video cameras, each positioned to enable a panoramic image, including both video and still images, to be taken.

The music headphones may be ones including an ambient light sensor.

The music headphones may be ones including a colour or colour temperature sensor.

The music headphones may be ones including a physiological sensor to detect physiological parameters of the user, such as heart rate, and/or skin conductance.

The music headphones may be ones which transmit, in real-time, video to the connected music player after the user initiates video recording and that video is shown on a display screen of the music player.

The music headphones may be ones in which the real-time video is relatively low resolution but sufficient to enable the user to view the scene being videoed, and high resolution image data is sent subsequently to the music player for the music player to store and to allow the user to edit that video on the music player.

The music headphones may be ones in which the real-time video is editable by the user and any edits are subsequently and automatically applied to the high resolution version.

According to a second aspect of the invention, there is provided a system including stereo music headphones including a pair of speakers for high quality stereo music reproduction, in which at least one integral video camera is built into the headphones and the headphones include at least one connection to a physically separate portable music device, such as a smartphone, the connection specifically enabling high quality playback of stereo music from the portable music device using the speakers;

the system further including an application running on a processor in the portable music device, or elsewhere, such as in the cloud, the application handling video data from the music headphones and enabling a user to do one or more of: edit the video; add music or other audio to the video; share the video.

The system may be one in which the application provides music edit capability and the user creates or edits a soundtrack for the video by adding or editing a music track, genre, channel or playlist of choice.

The system may be one in which the application provides video edit capability and the user edits the video on the device by adding or using an image filter of choice.

The system may be one in which the application provides video edit capability and the user edits the video on the device by adding or using a video effect filter of choice.

The system may be one in which the headphones include a motion sensor, such as an accelerometer or gyro, to detect motion and data from the motion sensor is used by the application for image stabilisation of the image filmed by the or each integral video camera.

The system may be one in which the application displays an on-screen menu item on the music playback device that, if selected, enables a user to purchase an image and/or video filter for application to video(s).

The system may be one in which the application displays an on-screen menu item on the portable music device that, if selected, enables a user to purchase a music track, genre, channel or playlist for application to video(s).

The system may be one in which the application is a downloadable app that allows users to record video, edit video, select music as the soundtrack for that video, edit music, and to share videos with accompanying soundtracks.

The system may be one in which the portable music device is a data connected device such as a smartphone that can share the video with its accompanying music soundtrack over a wireless or wired data network.

The system may be one in which sharing can be live streaming of a POV video and accompanying music track(s)

The system may be one in which sharing is to one or more of a social network, a social media platform, a website to which users can contribute and share videos with others.

According to a third aspect of the invention, there is provided a method of creating videos, including the steps of:

(i) a user specifying that a video will include, as a soundtrack to that video, one or more specified music tracks, genres, channels or playlists stored or accessible from a portable music player, such as a smartphone;

(ii) the user recording, either after or before step (i) above, a scene using at least one video camera that is connected to a physically separate portable music player, (iii) an application running on a processor in the portable music player or elsewhere, as in the cloud, including some or all of the specified music track(s), genre(s), channel(s) or playlist(s) as the soundtrack to the video recording.

The method of creating videos may be one in which the video camera is a standalone camera, such as a ruggedized personal video camera.

The method of creating videos may be one in which the video camera in integrated into music headphones.

The method of creating videos may be one in which the video camera is integrated into augmented reality glasses, such as Google Glass.

The method of creating videos may be one in which the soundtrack is the music that the music player is playing back over a pair of music headphones whilst the user wearing those music headphones is recording the video.

The method of creating videos may be one in which the recorded soundtrack is not music that the music player is playing to the user over any music headphones whilst the user is recording the video, but a track, genre, channel or playlist selected by the user after recording is complete.

The method of creating videos may be one in which the user edits the video by adding music and/or other audio to it.

The method of creating videos may be one in which the user adds image filters to the video using the application.

The method of creating videos may be one in which the user adds video effects filters to the video using the application.

The method of creating videos may be one including the step of the user providing (e.g. posting, live posting, streaming or live streaming) the video and its soundtrack to a social network, a social media platform, a website to which users can contribute and share videos with others, using the application.

According to a fourth aspect of the invention, there is provided a head-mountable device comprising:

a first earphone assembly that includes a first housing defining a first interior space and a first loudspeaker disposed at least partially within the first interior space and integrated with the first housing;

a second earphone assembly that includes a second housing defining a second interior space and a second loudspeaker disposed at least partially within the second interior space and integrated with the second housing;

an image capturing apparatus that includes a camera integrated with the first earphone assembly;

audio input connections each configured to receive audio signals from at least one of two independent audio sources; and an audio output configured to supply audio signals from the audio input connections to the first and second loudspeakers;

wherein the head mountable device is configured to permit switching between the first one of the audio sources and the second one of the audio sources, and wherein the image capturing apparatus is configured to operate concurrently with either one of the audio sources.

The head-mountable device may be one wherein the audio sources are a microphone and an audio player.

The head-mountable device may be one wherein the camera is disposed within the first interior space and arranged to receive light from an aperture defined in the first housing to capture images.

The head-mountable device may be one wherein the microphone resides within either the first interior space or the second interior space.

The head-mountable device may be one further comprising a manual switch associated with either the first earphone or the second earphone, wherein the manual switch turns the camera ON and OFF, and wherein the manual switch turns one of the audio sources ON and OFF concurrent with the camera.

The head-mountable device may be one wherein the camera is rotatably mounted within the first interior space.

According to a fifth aspect of the invention, there is provided a processor-implemented method to share a world view video, comprising:

receiving via a processor a request to record a user's world view video;

recording via video headphones the world view video;

adjusting via the processor the world view video based on user instructions; and sharing via the processor the adjusted world view video with the user's social network.

The method may be one wherein the video headphones comprise audio headphones with an embedded video camera and a microphone.

The method may be one wherein the adjusting the world view video comprises trimming the world view video.

The method may be one wherein the adjusting the world view video comprises adding audio to the world view video.

The method may be one wherein the adjusting the world view video comprises adding video effects to the world view video.

BRIEF DESCRIPTION OF THE DRAWINGS

The accompanying Figures and Appendices illustrate various examples in accordance with the present disclosure. The above and other aspects of the invention will now be described, by way of example only, with reference to the following Figures, in which:

FIG. 33 shows examples of Create—Go Live! user interface screens.

DETAILED DESCRIPTION

A request to record a user's world view video may be received. The world view video may be recorded via video headphones and adjusted based on user instructions. The adjusted world view video may be shared with the user's social network.

Introduction

A VHP empowers users to record, edit and share their world view with their social networks. A user may record a video through a video camera embedded in the user's headphones. Audio may also be recorded through one or more microphones, which are installed into the headphone cable control unit and/or located underneath the video camera. Once the user finishes recording the video, the user may add music, apply filters, make audio and/or video adjustments, provide a description of the video, and/or the like. After the user finishes editing the video, the video may be shared with the user's social networks.

Detailed Description of a VHP

Figure 1:
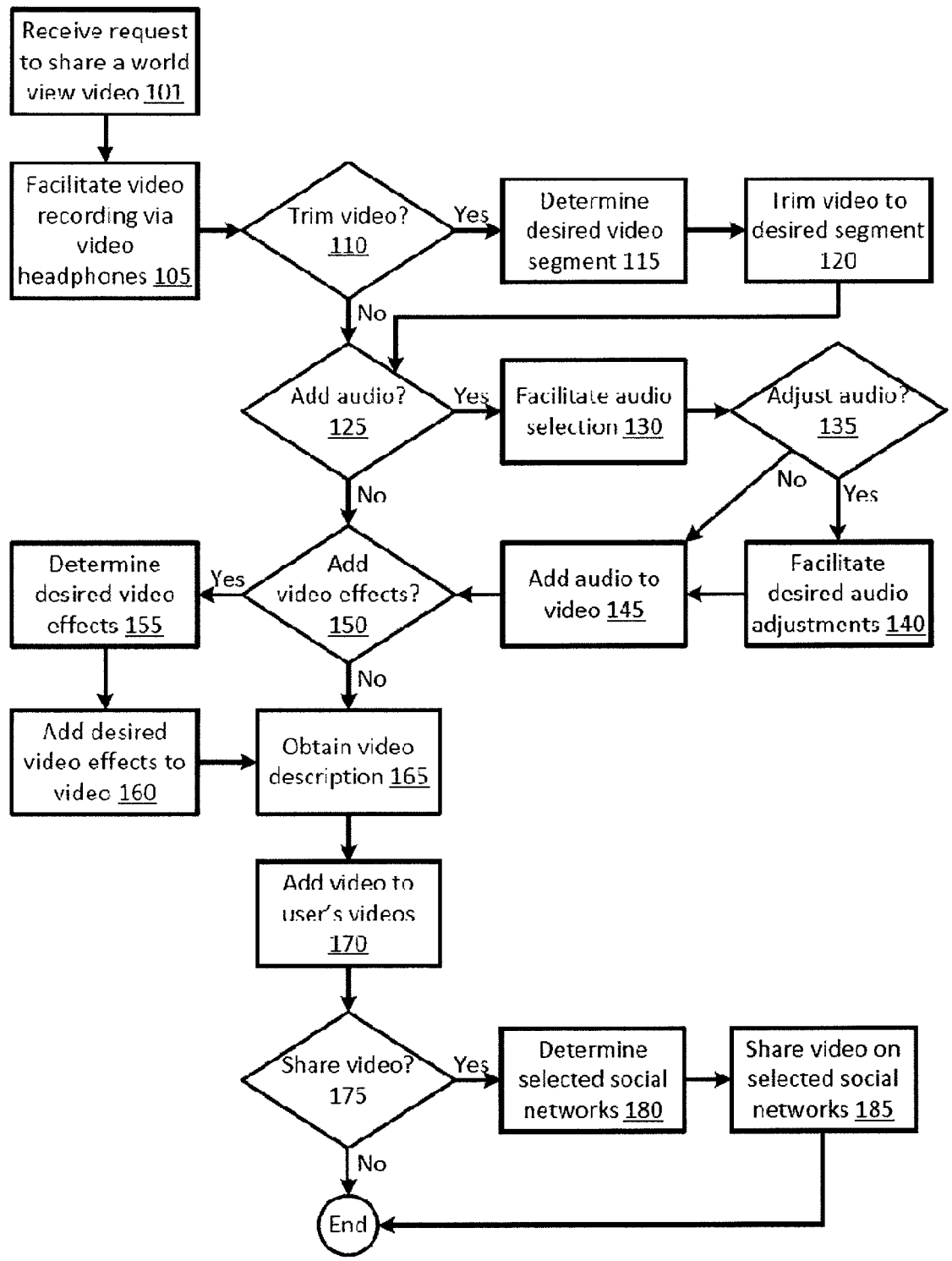
FIG. 1 shows a logic flow diagram illustrating a world view sharing (WVS) component in one example of a VHP. This is an exemplary VHP world view sharing (WVS) component.

FIG. 1 shows a logic flow diagram illustrating a world view sharing (WVS) component in one example of a VHP. In FIG. 1, a request to share a world view video may be received at 101. For example, a world view video may be a video showing what may be seen and/or heard by a user (i.e., the view from the user's eye level). In one example, the request to share a world view video may be received based on activation of a record button on video headphones (e.g., the record button may be integrated into a headphone cable) by the user. In another example, the request to share a world view video may be received based on activation of a record button of a VHP mobile app (e.g., running on the user's smart phone) by the user.

A VHP may facilitate video recording via video headphones at 105. In various examples, video headphones may be headphones with an embedded and/or attached video camera. In various implementations, video headphones may include features such as high definition (HD) premium quality sound, pivoting ear pads for multi-angle recording, one or more HD (e.g., 1080p) video cameras, one or more dynamic microphones, audio and/or video controls (e.g., record video, adjust volume, skip forward and/or back, mute) integrated into a headphone cable, and/or the like. In one implementation, the video headphones may include a video camera on one of the earpieces, and the video camera may have a microphone (e.g., located underneath the video camera). In another implementation, the video headphones may include two video cameras, one on each earpiece, and each video camera may have a microphone. A video camera and/or the accompanying microphone, if the video camera has a microphone, may pivot and/or swivel (e.g., 360 degrees in any direction) to allow the user to record video in any direction. For example, a user may angle the video camera up to record a video of a bird in a tree. In another example, the user may point one video camera straight ahead and the other video camera towards the back to record a split screen of what is in front and behind the user. In yet another example, the user may position both video cameras in such a way (e.g., both video cameras pointing in the same direction) as to allow three dimensional (3D) video recording. The video headphones may be connected (e.g., via a headphone cable, via a wireless technology capable of transmitting HD video) to the user's client (e.g., a smart phone, a portable media player, a tablet) and may record and transmit the video (e.g., including video and/or audio) to the client (e.g., via a VHP mobile app). For example, the video may be stored locally on the client. In another example, the video may be stored remotely (e.g., on a remote server). In one implementation, the video may be of any desired length. In another implementation, a minimum and/or a maximum length for the video (e.g., 15 seconds) may be specified.

A determination may be made at 110 whether the user wishes to trim the recorded video. In one example, this determination may be made by prompting the user to indicate whether the user wishes to trim the video (e.g., via a "would you like to trim the video?" prompt). In another example, this determination may be made by displaying a video selection widget via a VHP mobile app and allowing the user to trim the video via the video selection widget if the user chooses to do so.

If the user wishes to trim the video, a desired video segment may be determined at 115. In one example, the user may trim the video by dragging a video selection widget of a VHP mobile app to select a video segment of a predetermined size (e.g., a 10 second video segment). In another example, the user may trim the video by expanding and/or shrinking the size of a video selection widget of a VHP mobile app to select a desired video segment. In yet another example, the user may combine multiple videos (e.g., the current video and one or more previously recorded videos) into one video. The video may be trimmed to the desired video segment at 120.

A determination may be made at 125 whether the user wishes to add audio to the video. In one example, this determination may be made by prompting the user to indicate whether the user wishes to add audio to the video (e.g., via a "would you like to add audio?" prompt). In another example, this determination may be made by facilitating user selection of audio via a VHP mobile app and allowing the user to add audio to the video if the user chooses to do so.

If the user wishes to add audio to the video, a VHP may facilitate audio selection at 130. In one example, the user may select audio (e.g., music) from the user's audio collection (e.g., by pressing a "My Music" button of a VHP mobile app). In one implementation, the user may select a music album and/or track (e.g., a song) and/or a playlist from the user's music collection. The user may also utilize an audio selection widget to select the desired portion of the audio to be added to the video. For example, the length of the selected audio portion may be set to be equal to the length of the video. In another implementation, a VHP may suggest audio to the user that well matches actions in the video. For example, a VHP may suggest songs and/or playlists and/or audio portions whose tempo matches the actions in the video. In another example, the user may select audio from a VHP's audio collection (e.g., by pressing a "VHP Library" button of a VHP mobile app). For example, the user may purchase music albums and/or songs and/or audio effects via a VHP mobile app. In one implementation, the user may select audio and/or a portion of the audio from a VHP's audio collection in a similar manner as described above with regard to the user's audio collection. In another implementation, the user may select audio from a VHP's audio collection based on suggestions from a VHP made in a similar manner as described above with regard to the user's audio collection.

A determination may be made at 135 whether the user wishes to adjust the audio. In one example, this determination may be made by prompting the user to indicate whether the user wishes to adjust the audio (e.g., via a "would you like to adjust the audio?" prompt). In another example, this determination may be made by facilitating user selection of audio adjustments via a VHP mobile app and allowing the user to adjust the audio if the user chooses to do so.

If the user wishes to adjust the audio, a VHP may facilitate desired audio adjustments at 140. In one example, the user may adjust the audio by speeding up and/or slowing down the audio. For example, the user may utilize "Slow Down" and/or "Speed Up" buttons of a VHP mobile app to adjust audio speed (e.g., in discreet chunks, such as 2× or 3× faster or slower; continuously, such as based on the length of time that a button is pressed). In this example, the length of the selected audio portion may vary based on the speed of the audio. For example, if the user speeds up a song, the user may be able to select a longer portion of the song. In another example, the user may choose to have an entire song play during the duration (e.g., 2 minutes) of the video, and the speed at which the song is played back may be adjusted accordingly (e.g., so that the entire song is played back in 2 minutes) by a VHP. In another example, the user may adjust the audio by auto tuning the audio. For example, the user may utilize an "Auto Tune" button of a VHP mobile app. In yet another example, the user may adjust the audio by adding sound effects to the audio. For example, the user may utilize a sound effects selection widget of a VHP mobile app.

The audio may be added to the video at 145. In one example, the added audio may replace audio recorded in the video. In another example, the added audio may be combined with audio recorded in the video. In some examples, the user may post artist credit (e.g., via a "Post Artist Credit" button of a VHP mobile app) for audio (e.g., a song) being used in the video. For example, the artist credit may scroll in a specified location (e.g., across the bottom of the video).

A determination may be made at 150 whether the user wishes to add video effects to the video. In one example, this determination may be made by prompting the user to indicate whether the user wishes to add video effects to the video (e.g., via a "would you like to add video effects?" prompt). In another example, this determination may be made by facilitating user selection of video effects via a VHP mobile app and allowing the user to add video effects to the video if the user chooses to do so.

If the user wishes to add video effects to the video, a VHP may determine desired video effects at 155. In one example, the user may select desired video effects (e.g., sepia filter, black and white filter, monochromatic filter, a light filter, a frame around the video, speed up and/or slow down the video) via a video effect selection widget of a VHP mobile app. In another example, the user may wish to add various video elements (e.g., a video start element, a video end element, a transition element, a comments element) to the video. For example, the user may wish to insert a comment into the video after an amusing scene in the video. The desired video effects may be added to the video at 160.

A description of the video may be obtained from the user at 165. In one example, the description may include a title. In another example, the description may include the user's description for the video. In some implementations, the description may have a minimum and/or a maximum size. For example, a title may have to be at least 1 character long and no more than 50 characters long. In another example, the user's description for the video may have to be no more than 148 characters. In yet another example, the minimum and/or the maximum size for the description may correspond to those specified by social networks on which the video may be shared (e.g., a maximum of 140 characters for Twitter).

The video may be added to the user's video library at 170. For example, the video may be stored (e.g., on the client, on a remote server) and added to the user's VHP profile. If the user chooses to share the video with other VHP users, the other VHP users may comment on the video, mark the video as favorite, forward the video to others, and/or the like. The user may also see how many times the video has been viewed, post comments, and/or the like.

A determination may be made at 175 whether the user wishes to share the video via one or more social networks (e.g., Facebook, Tumblr, Twitter, Instagram, Pinterest, Vimeo, YouTube). In one example, this determination may be made by prompting the user to indicate whether the user wishes to share the video (e.g., via a "would you like to share the video?" prompt). In another example, this determination may be made by facilitating user selection of social networks on which to share the video via a VHP mobile app and allowing the user to share the video if the user chooses to do so.

If the user wishes to share the video, social networks on which the user wishes to share the video may be determined at 180. In one example, the user may select desired social networks via appropriate buttons of a VHP mobile app and press a "Share Now" button to initiate sharing on the selected social networks. In another example, the user may specify default desired social networks (e.g., via the user's profile settings) so that the default desired social networks are preselected for the user, and the user may press a "Share Now" button to initiate sharing on the selected social networks. The video may be shared on the selected social networks at 185 (e.g., via appropriate APIs provided by the social networks).

Figure 2:
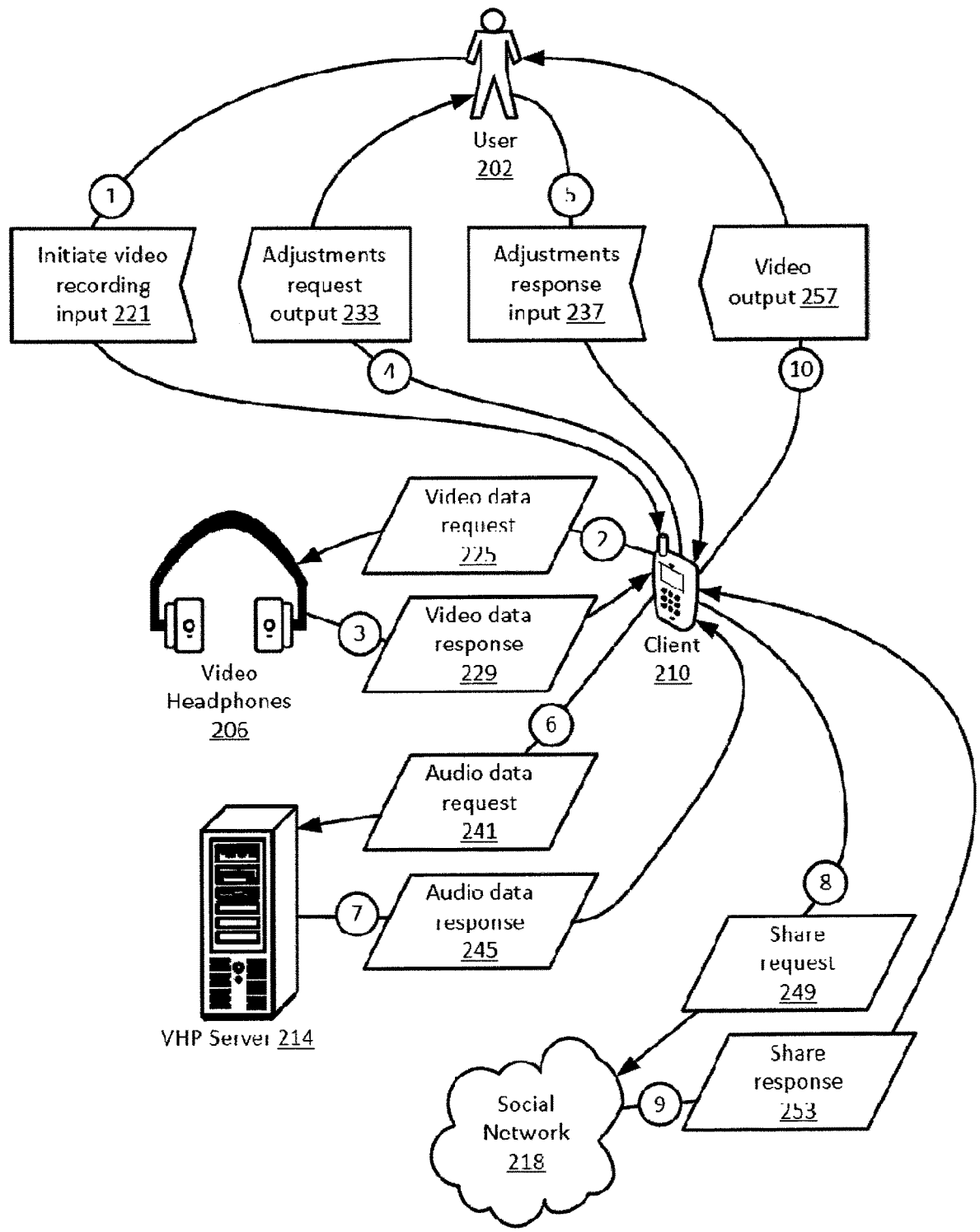
FIG. 2 shows a data flow diagram in one example of a VHP. This is an exemplary VHP data flow.

FIG. 2 shows a data flow diagram in one example of a VHP. FIG. 2 provides an example of how data may flow to, through, and/or from a VHP. In FIG. 2, a user 202 may provide a command to initiate video recording 221 to the client 210 (e.g., a smart phone, a portable media player, a tablet). In one example, the user may provide the command to initiate video recording by pressing a record button on the user's video headphones 206. In another example, the user may provide the command to initiate video recording by pressing a record button of a VHP mobile app on the client.

The client may send a video data request 225 to the video headphones. For example, the video data request may be in XML format and may include data such as a command to initiate video recording, video parameters (e.g., video resolution, video aspect ratio, audio quality), video recording length, and/or the like. The video headphones may begin and/or end video recording based on the video data request.

The video headphones may send a video data response 229 to the client. For example, the video data response may be in XML format and may include data such as the recorded video (e.g., including video and/or audio), video information (e.g., date and/or time of recording, location of the video), and/or the like.

The client may output an adjustments request 233 to the user. In various examples, the adjustments request may prompt the user to trim the video, to add audio to the video, to adjust audio in the video, to add video effects to the video, to provide a description of the video, to share the video, and/or the like. For example, the adjustments request may be output via a GUI of a VHP mobile app.

The user may input an adjustments response 237 into the client. In various examples, the adjustments response may indicate whether and/or how the user wishes to trim the video, to add audio to the video, to adjust audio in the video, to add video effects to the video, to describe the video, to share the video, and/or the like. For example, the adjustments response may be input via a GUI of a VHP mobile app.

If the user wishes to add audio (e.g., from a VHP's audio collection) to the video, the client may send an audio data request 241 to a VHP server 214. For example, a VHP server may store songs available from a VHP (e.g., in an audio data store 330c). For example, the audio data request may be in XML format and may include data such as the user's identifier and/or password, an identifier of a requested song and/or album and/or playlist, audio parameters (e.g., audio format, audio quality in Kbps), a payment method, and/or the like.

A VHP server may send an audio data response 245 to the client. For example, the audio data response may be in XML format and may include data such as the requested song and/or album and/or playlist, audio parameters, a payment confirmation, and/or the like. The client may add the obtained audio to the video and/or adjust the obtained audio and/or the video based on user instructions.

If the user wishes to share the video, the client may send a share request 249 to a social network 218. The share request may include the video and instruct the social network to post the video via the user's social network account. For example, the share request may be sent via the social network's API command and may include data such as the user's identifier and/or password on the social network, the video, the description of the video, video information (e.g., date and/or time of recording, location of the video obtained via the client's GPS), and/or the like. The social network may send a share response 253 to the client. For example, the share response may be sent via the social network's API command and may indicate whether the video was shared on the social network successfully.

The client may provide a video output 257 to the user. For example, the video output may inform the user whether the user's video has been stored (e.g., in a videos data store 330d), added to the user's profile, shared on one or more social networks, and/or the like.

Detailed Description of a VHP Coordinator

Figure 3:
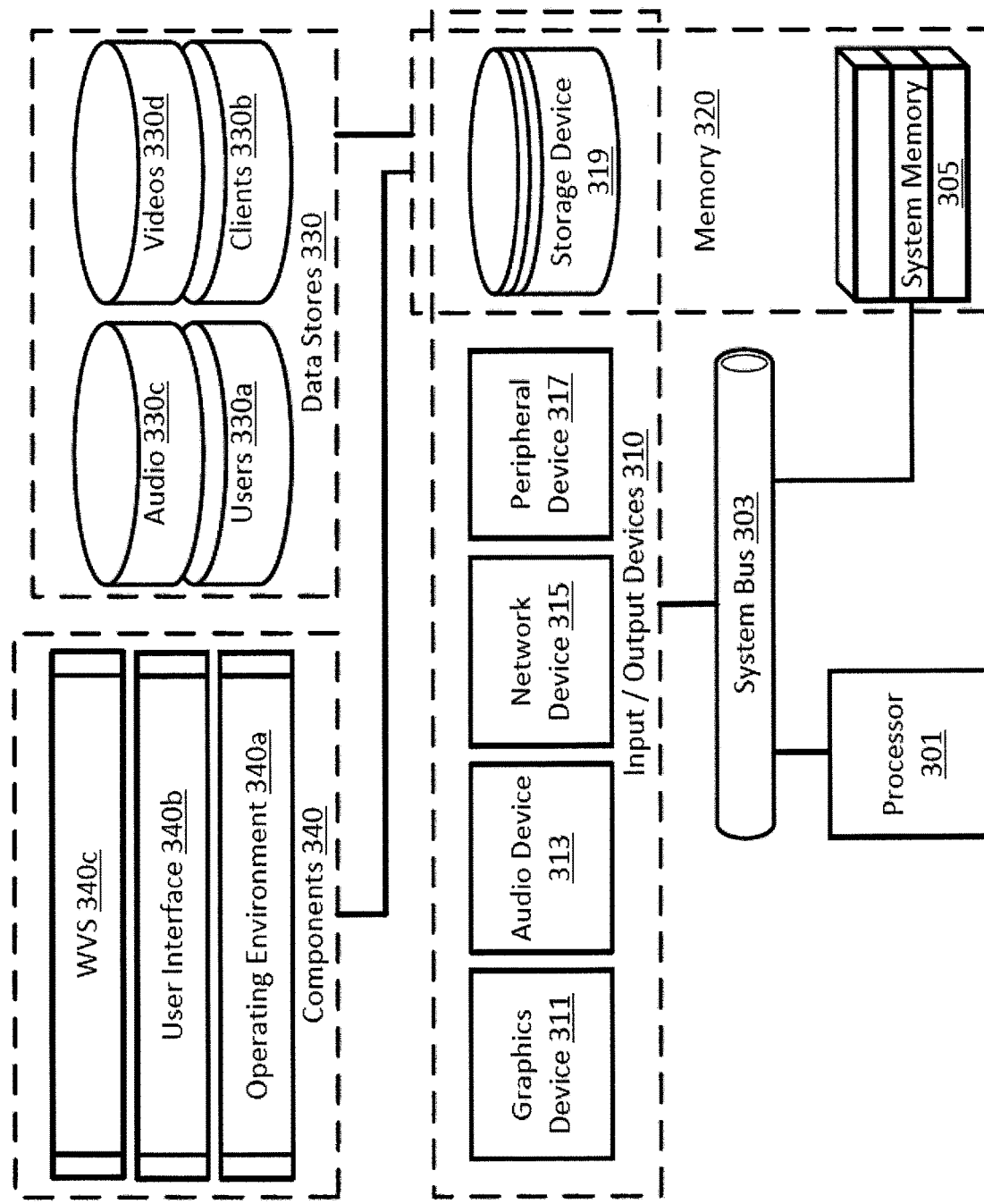
FIG. 3 shows a block diagram illustrating an exemplary VHP coordinator in one example of a VHP. This is an exemplary VHP coordinator.
Figure 4:
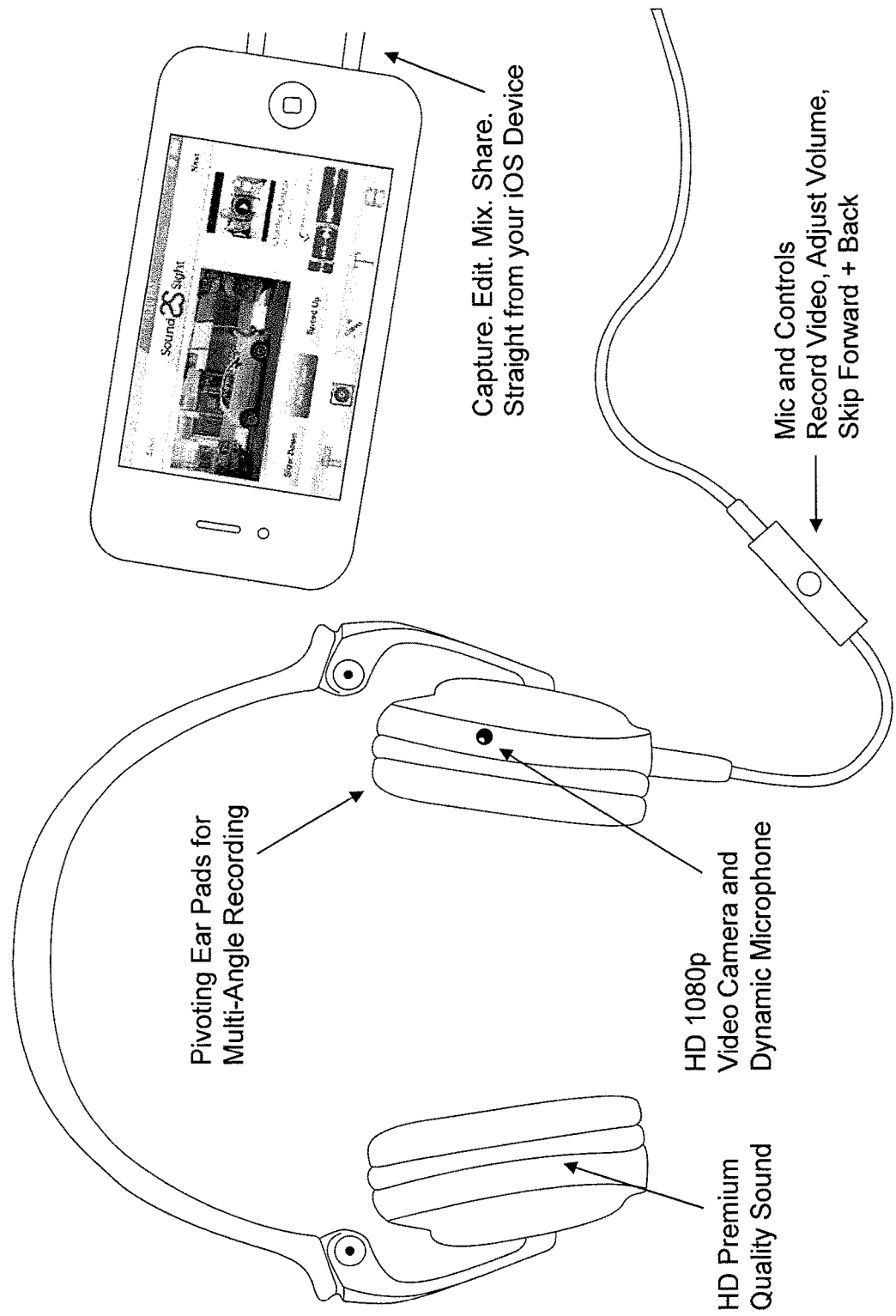
FIGS. 4 to 20 illustrate additional examples of a VHP.
Figure 5:
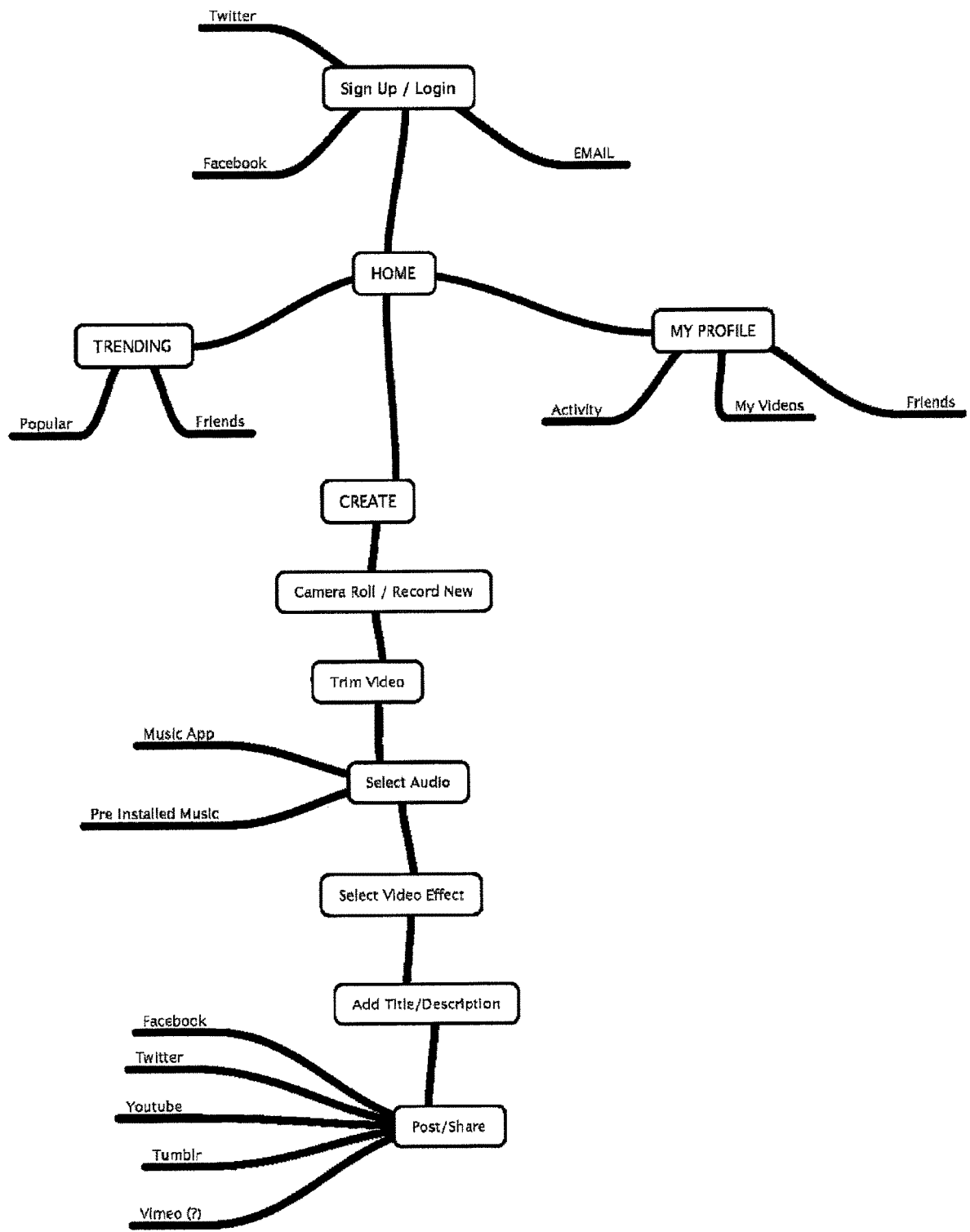
Figure 6:
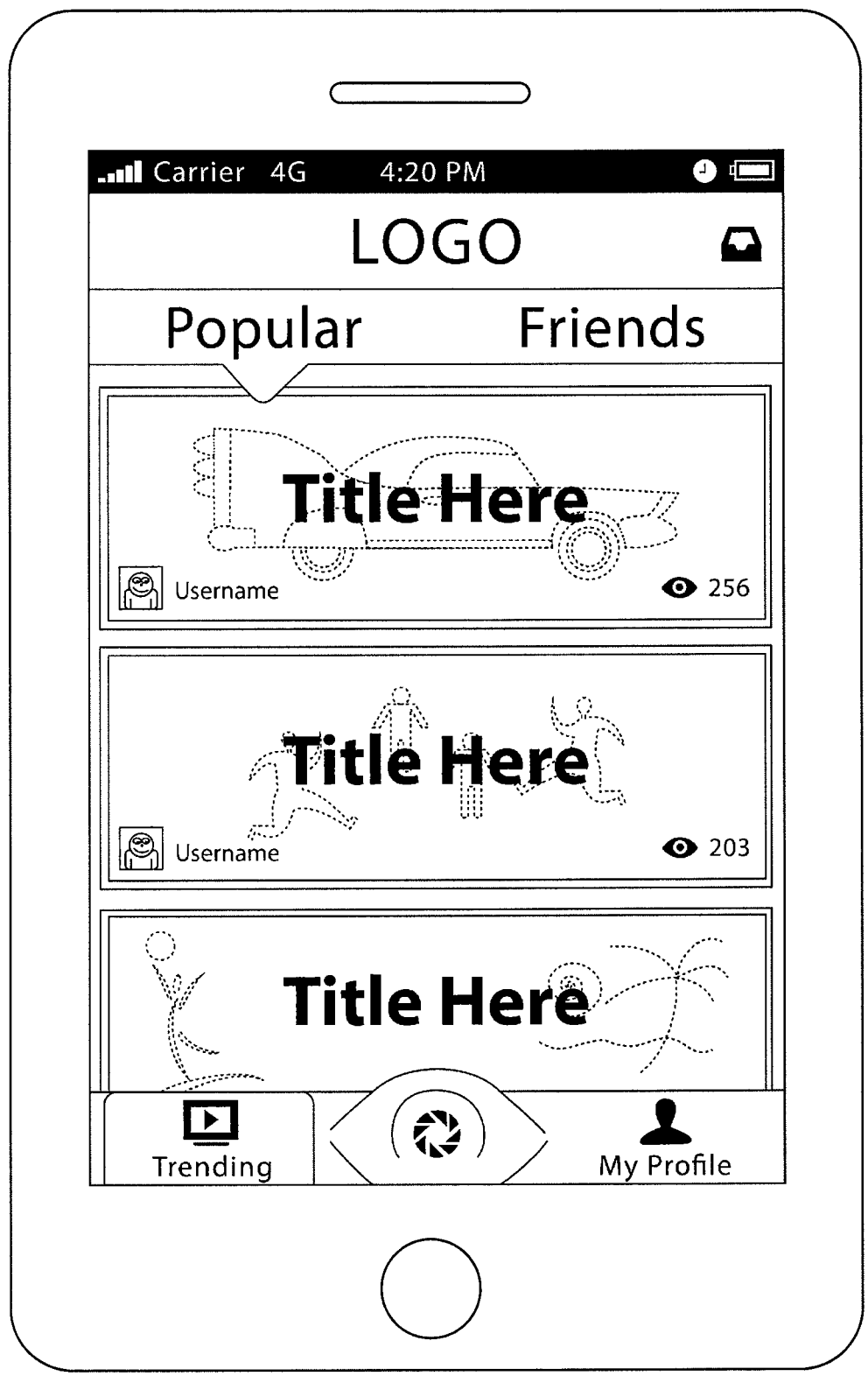
Figure 7:
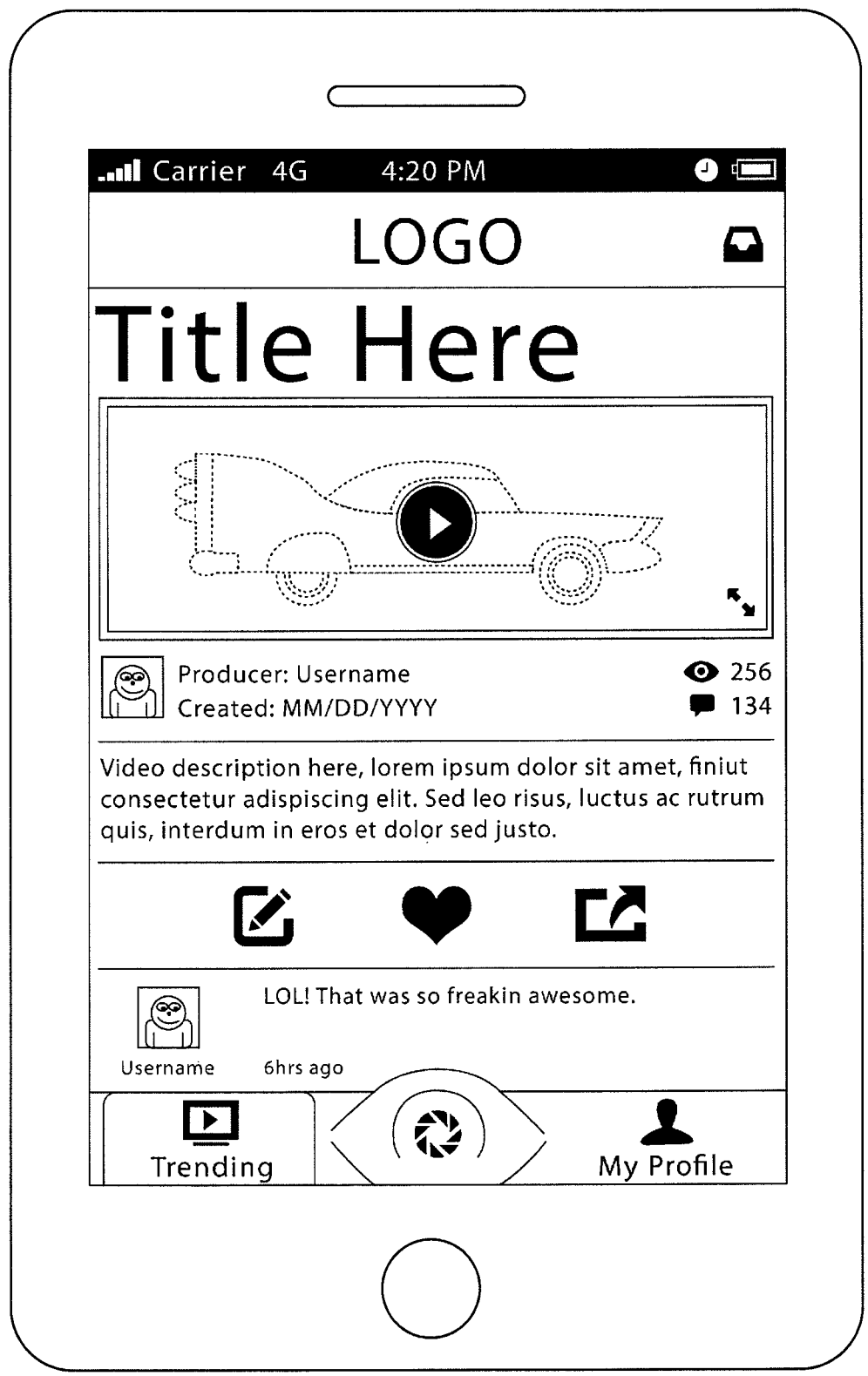
Figure 8:
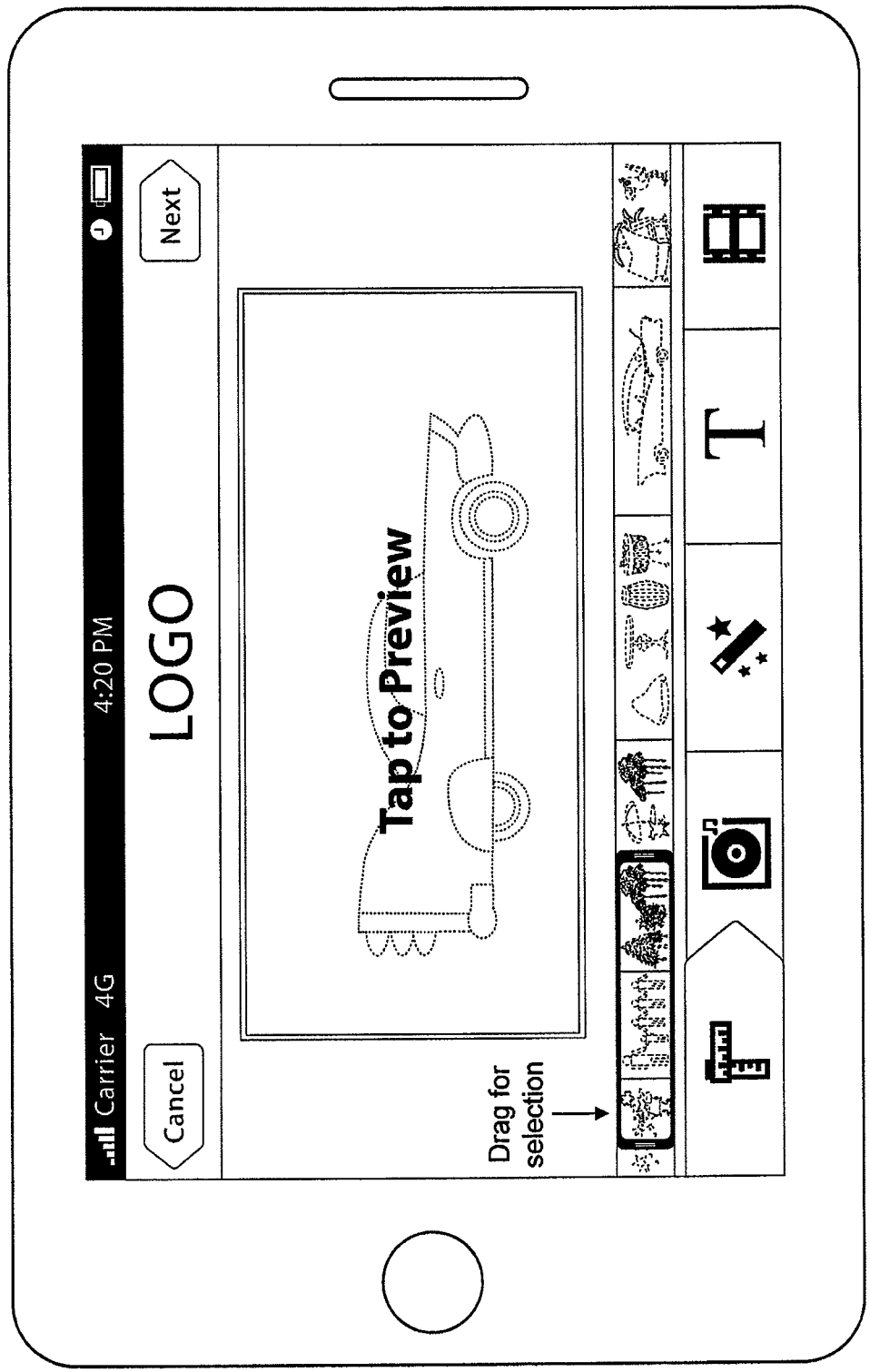
Figure 9:
Figure 10:
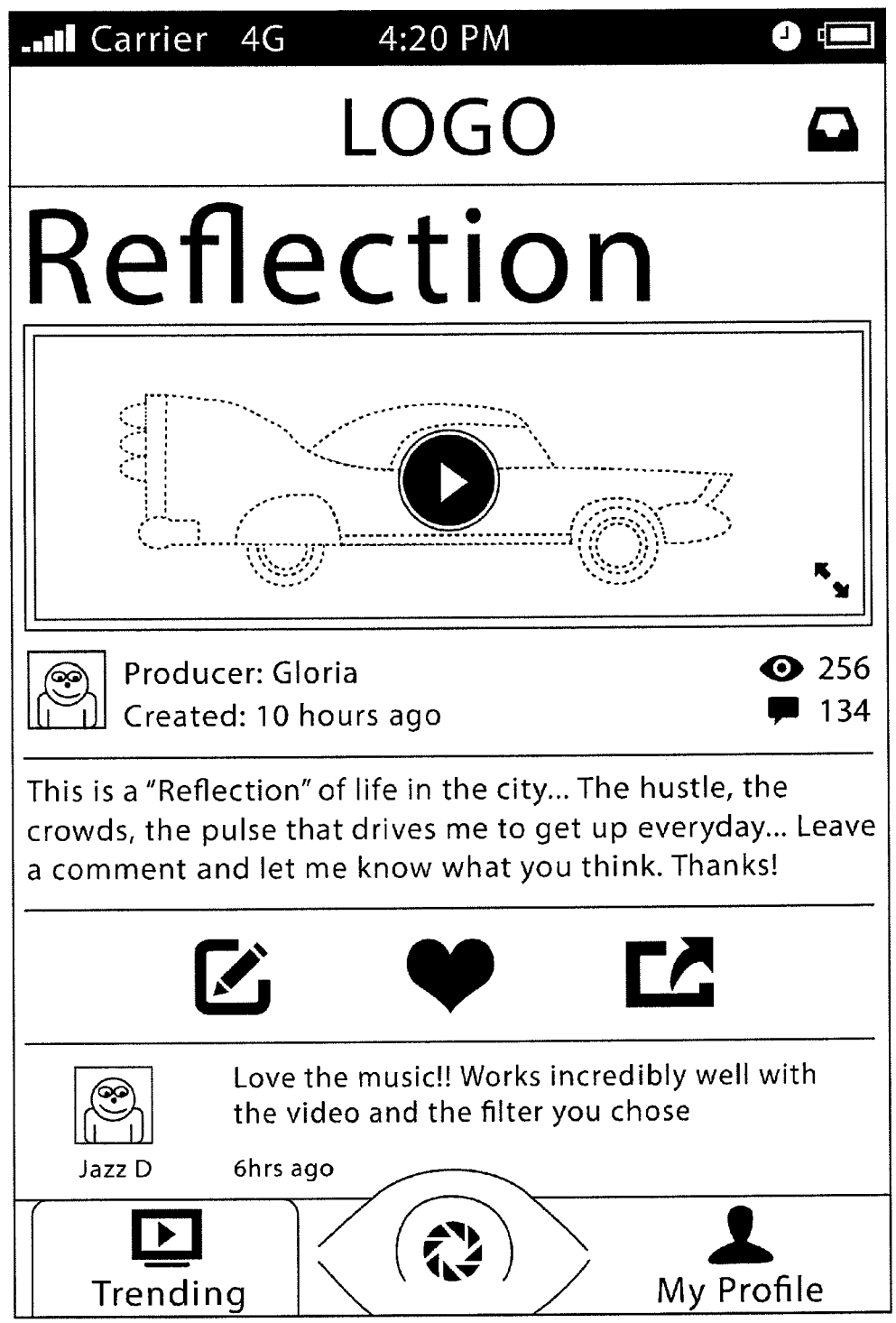
Figure 11:
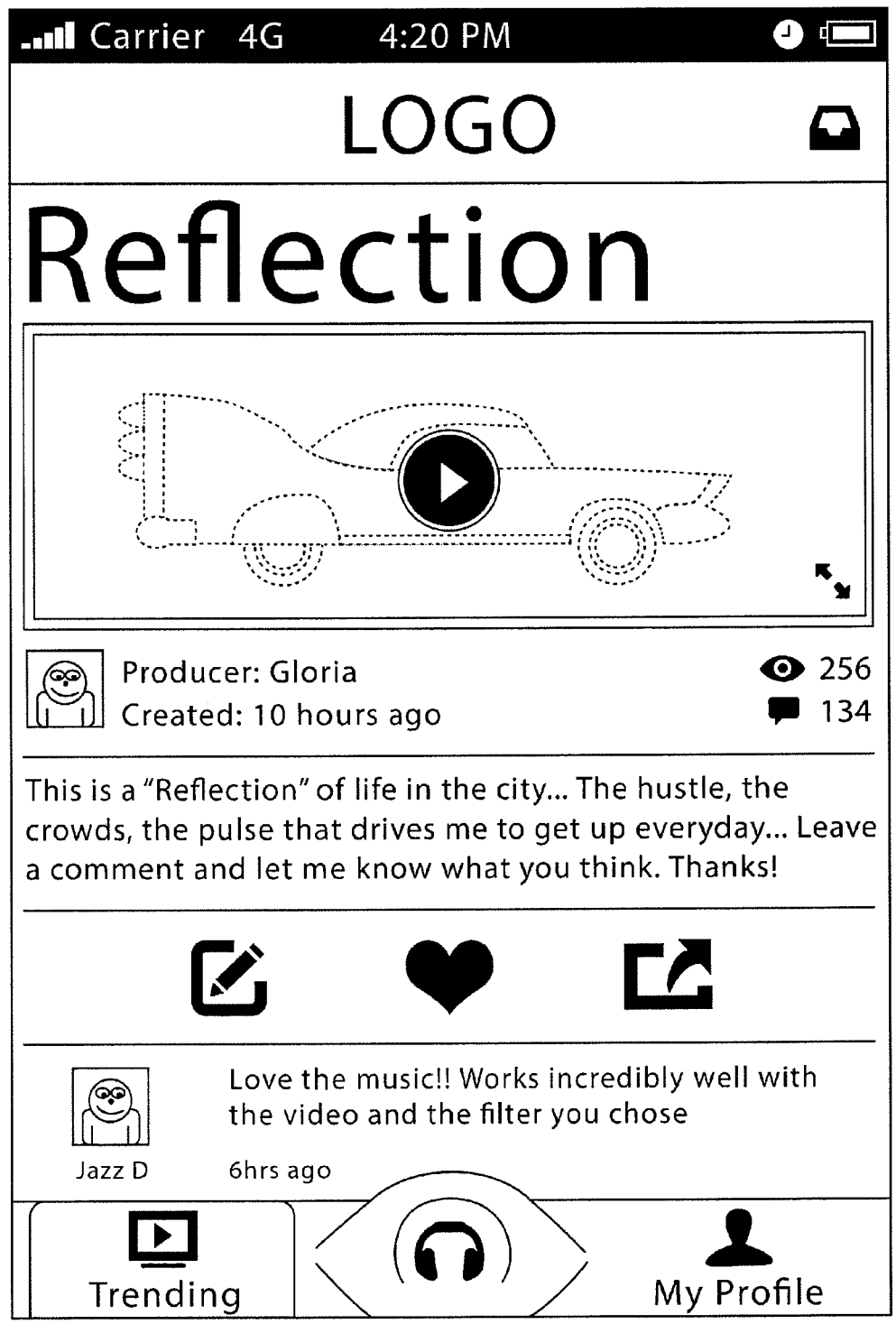
Figure 12:
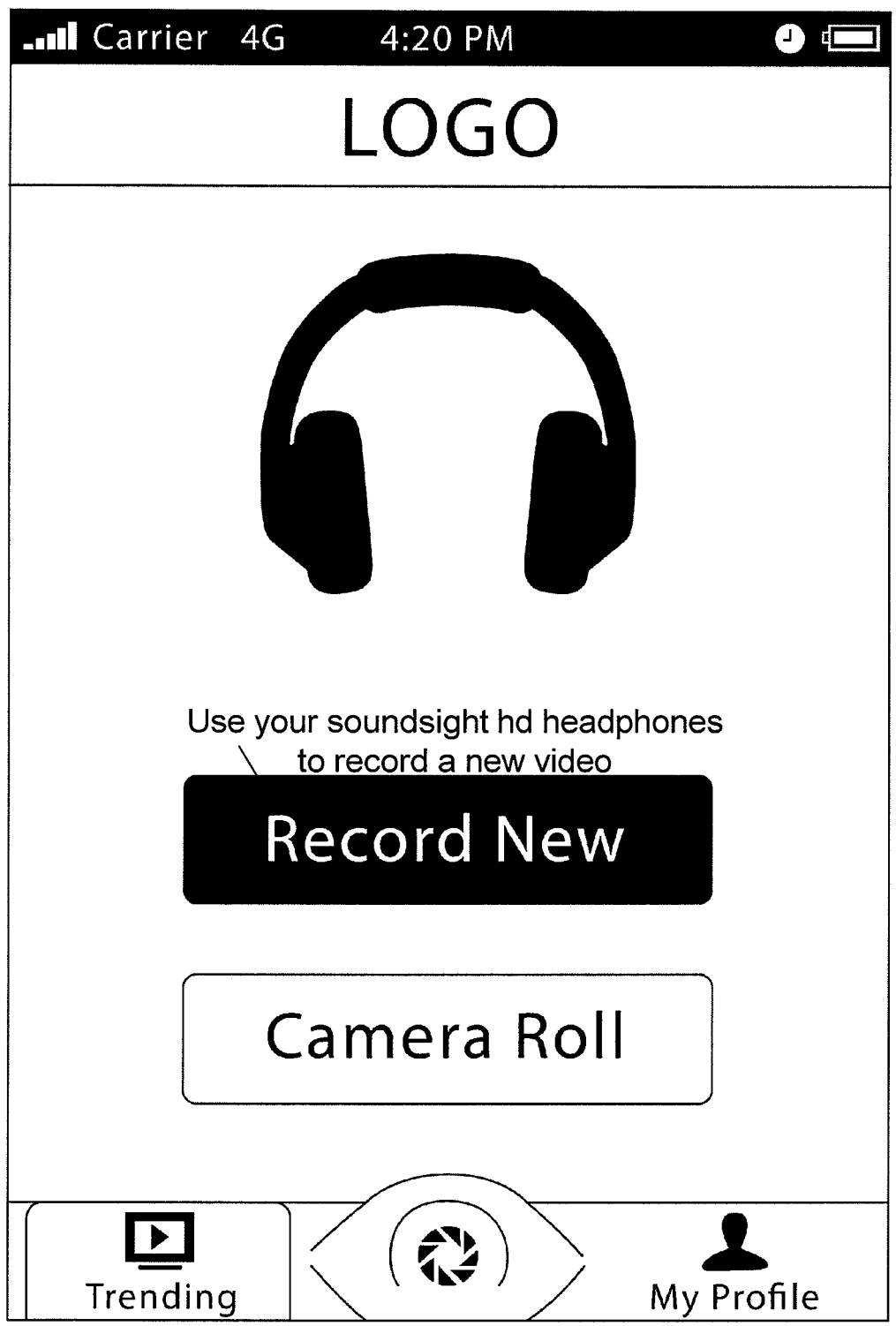
Figure 13:
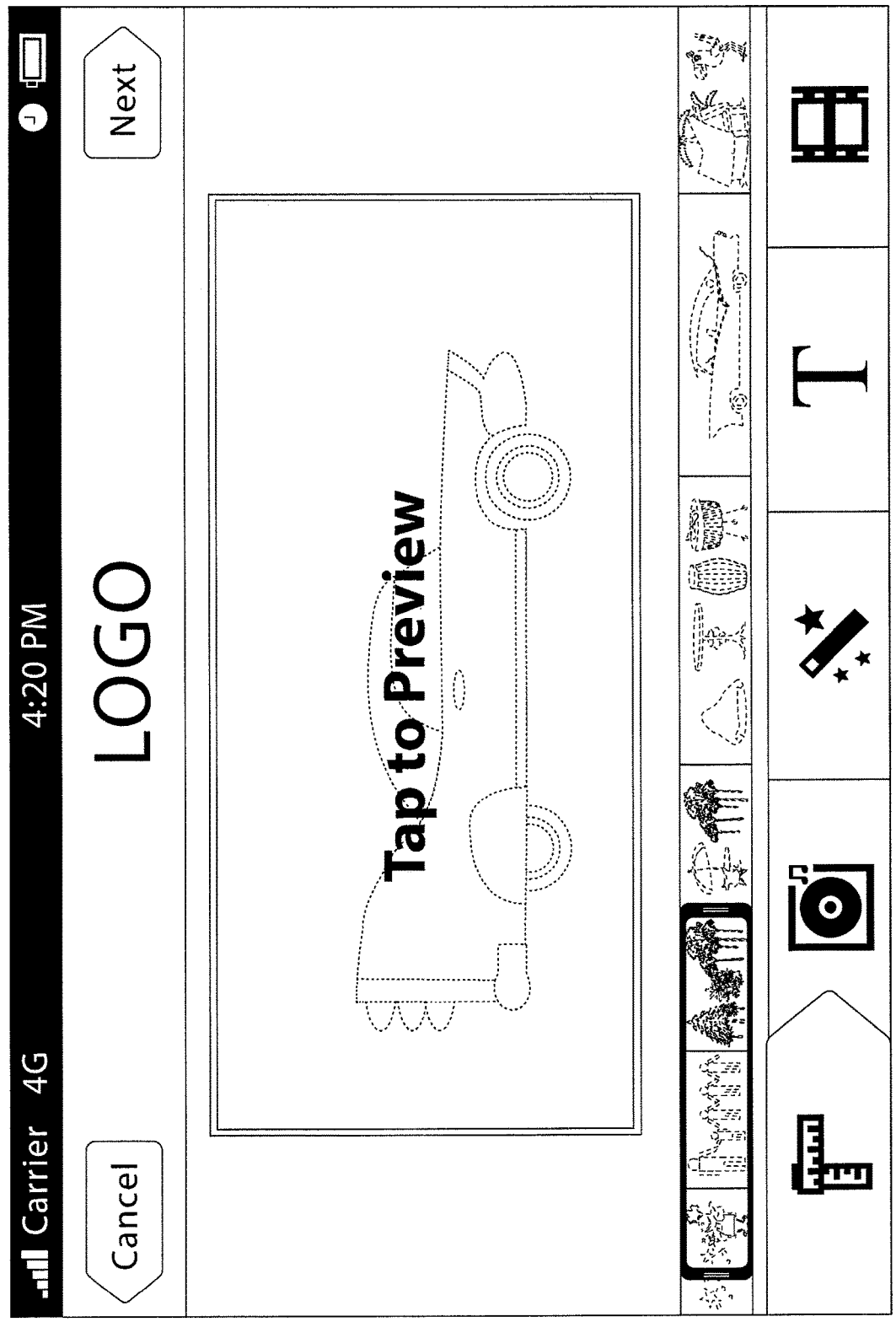
Figure 14:
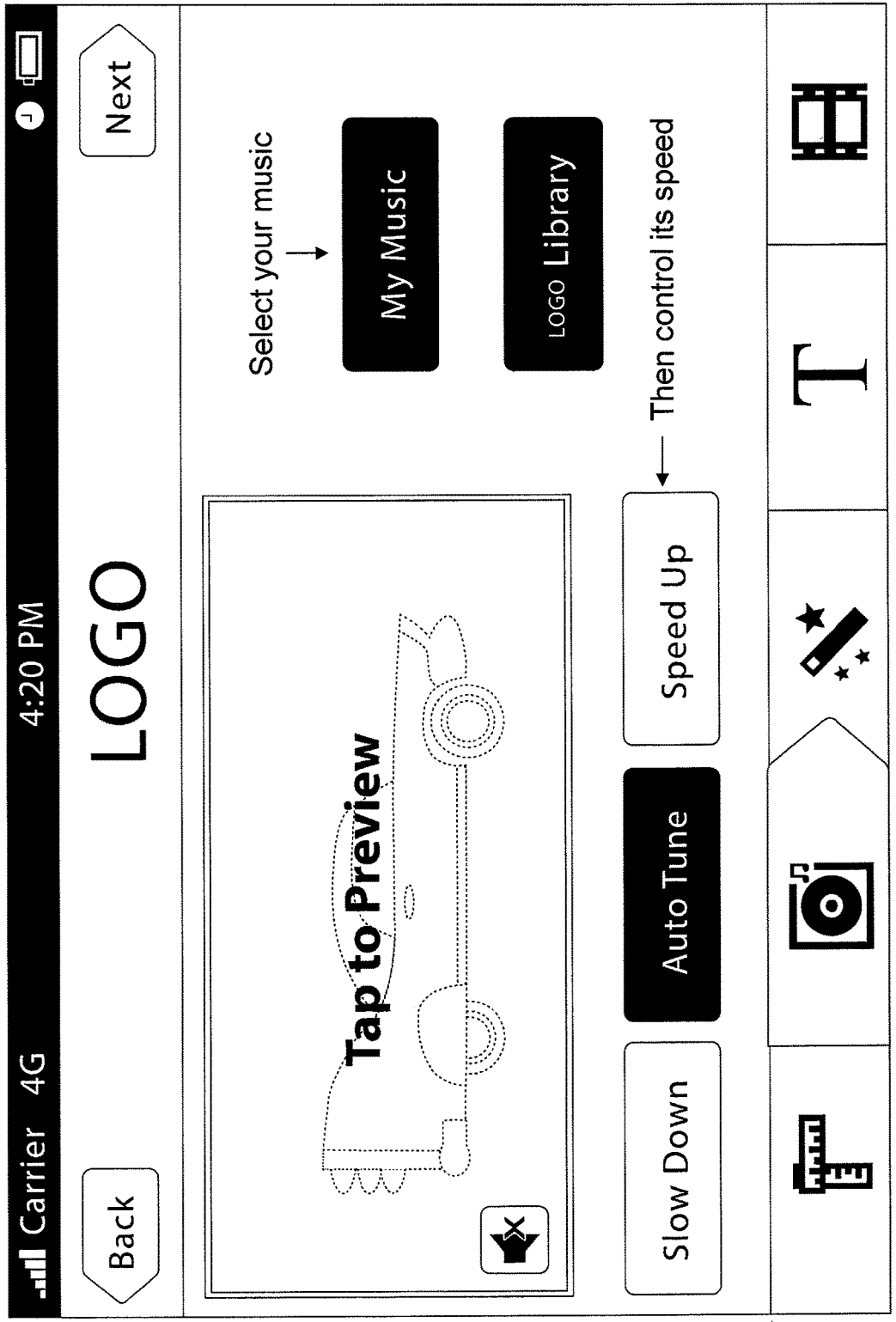
Figure 15:
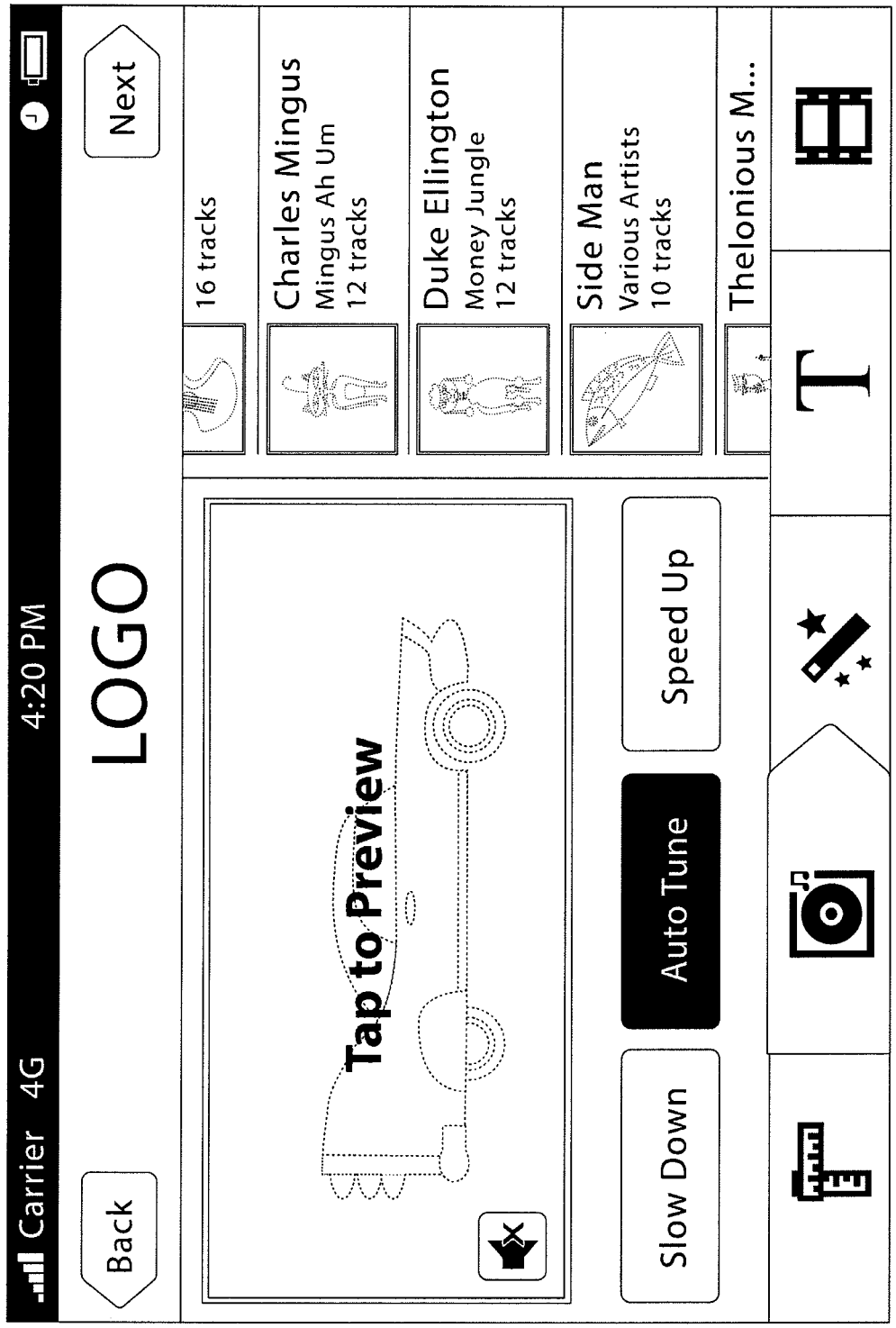
Figure 16:
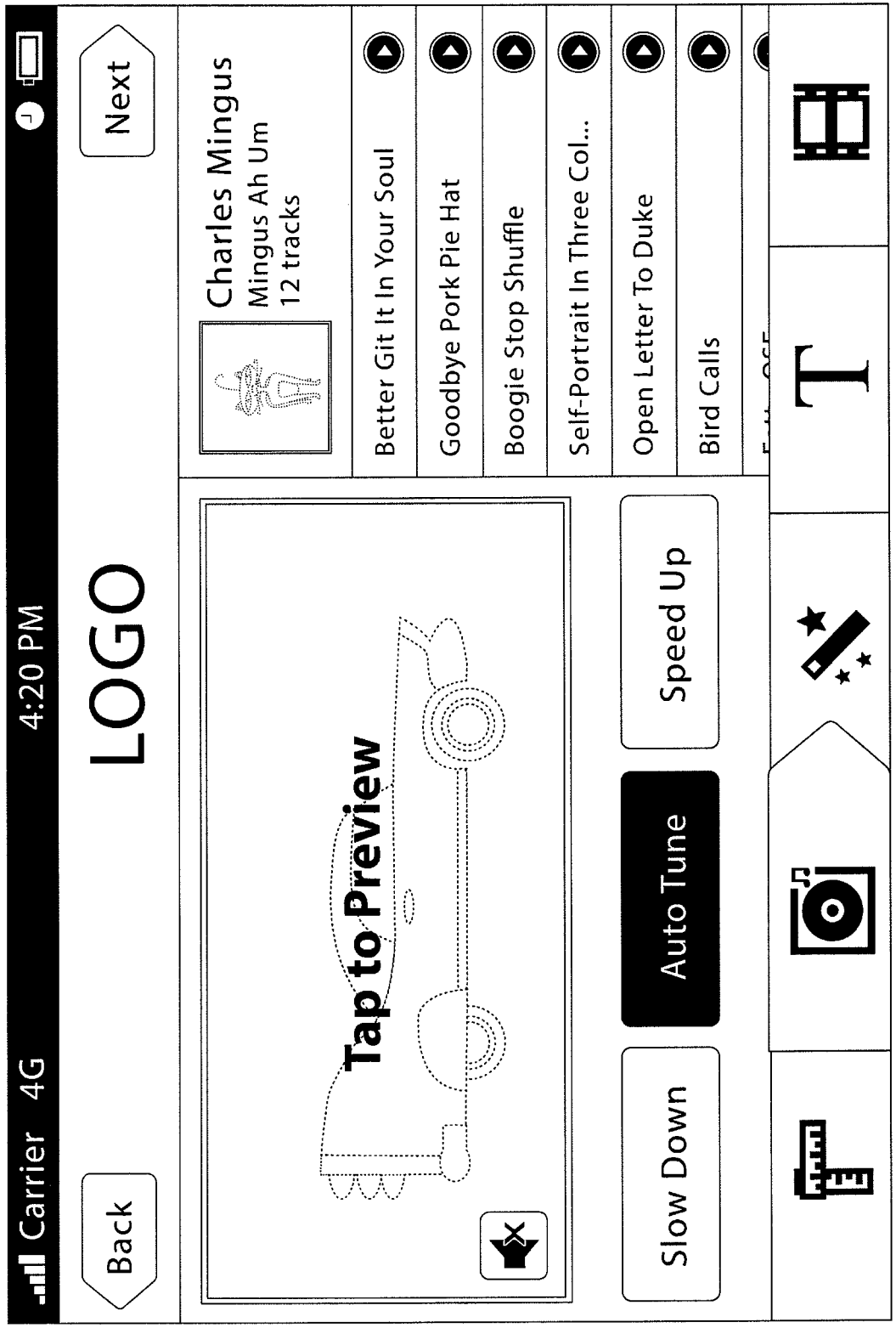
Figure 17:
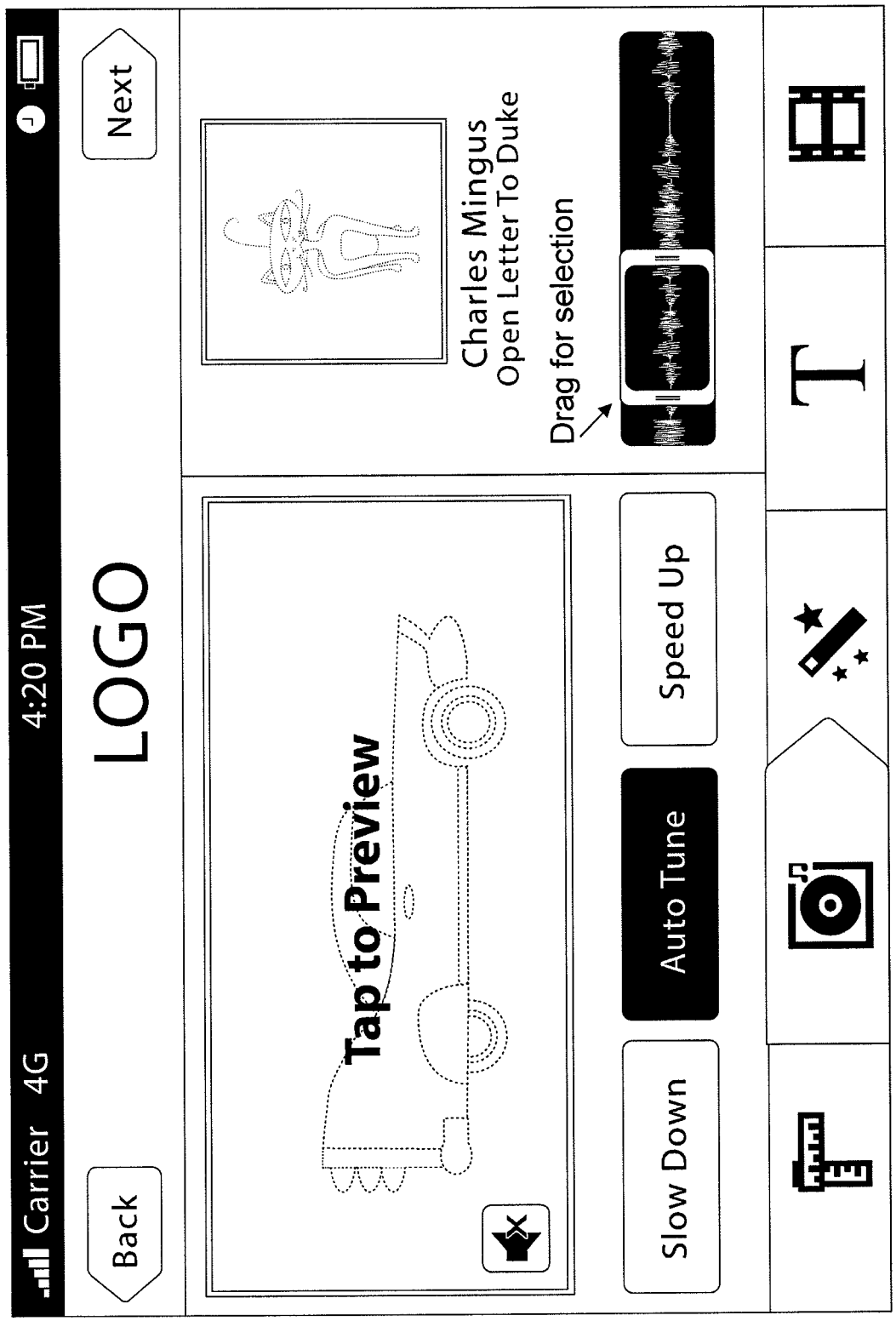
Figure 18:
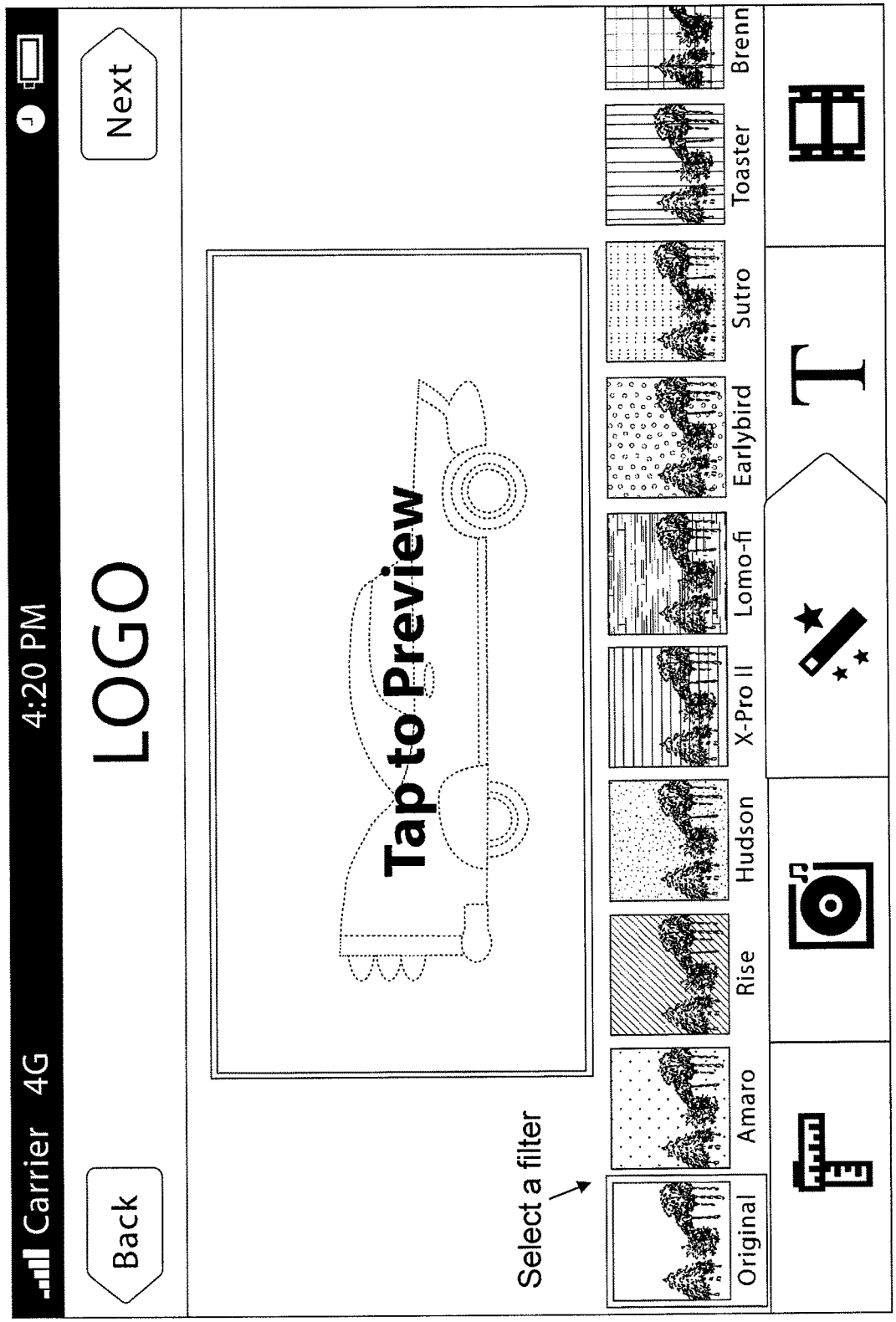
Figure 19:
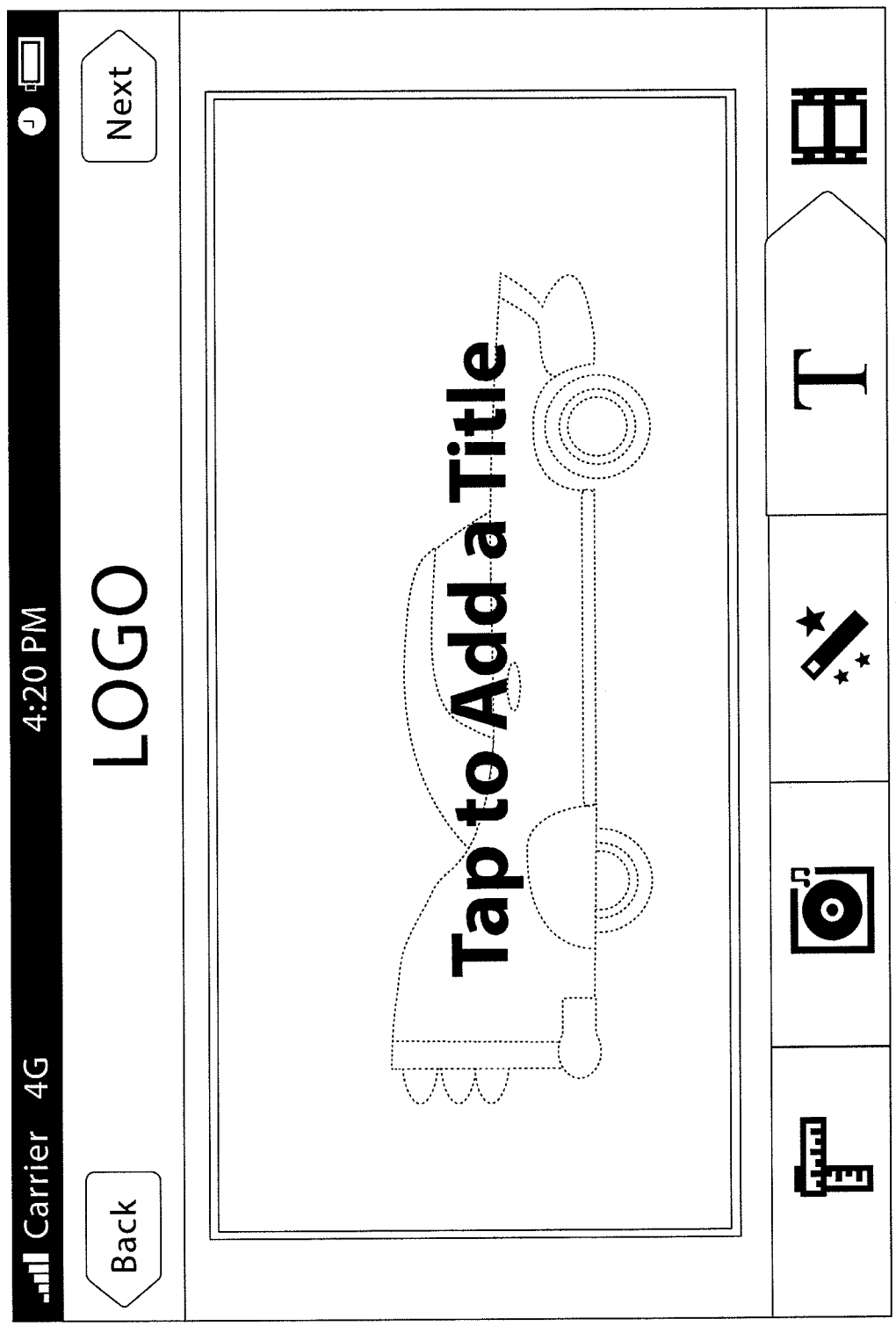
Figure 20:
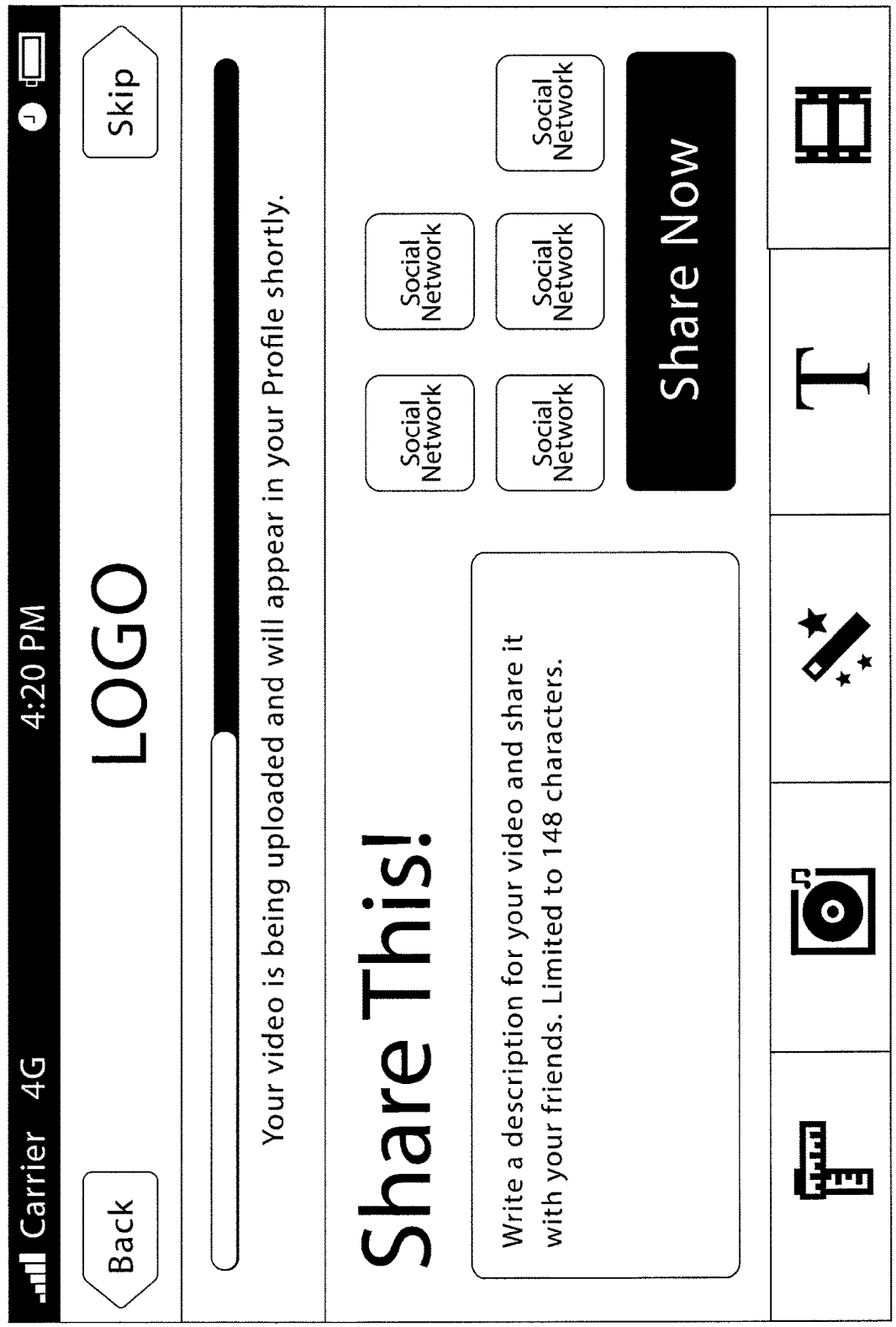

FIG. 3 shows a block diagram illustrating an exemplary VHP coordinator in one example of a VHP. A VHP coordinator facilitates the operation of a VHP via a computer system (e.g., one or more cloud computing systems, grid computing systems, virtualized computer systems, mainframe computers, servers, clients, nodes, desktops, mobile devices such as smart phones, cellular phones, tablets, personal digital assistants (PDAs), and/or the like, embedded computers, dedicated computers, a system on a chip (SOC)). For example, a VHP coordinator may receive, obtain, aggregate, process, generate, store, retrieve, send, delete, input, output, and/or the like data (including program data and program instructions); may execute program instructions; may communicate with computer systems, with nodes, with users, and/or the like. In various examples, a VHP coordinator may comprise a standalone computer system, a distributed computer system, a node in a computer network (i.e., a network of computer systems organized in a topology), a network of VHP coordinators, and/or the like. It is to be understood that a VHP coordinator and/or various VHP coordinator elements (e.g., processor, system bus, memory, input/output devices) may be organized in any number of ways (i.e., using any number and configuration of computer systems, computer networks, nodes, VHP coordinator elements, and/or the like) to facilitate VHP operation. Furthermore, it is to be understood that various VHP coordinator computer systems, VHP coordinator computer networks, VHP coordinator nodes, VHP coordinator elements, and/or the like may communicate among each other in any number of ways to facilitate VHP operation. As used in this disclosure, the term "user" refers generally to people and/or computer systems that interact with a VHP; the term "server" refers generally to a computer system, a program, and/or a combination thereof that handles requests and/or responds to requests from clients via a computer network; the term "client" refers generally to a computer system, a program, a user, and/or a combination thereof that generates requests and/or handles responses from servers via a computer network; the term "node" refers generally to a server, to a client, and/or to an intermediary computer system, program, and/or a combination thereof that facilitates transmission of and/or handling of requests and/or responses.

A VHP coordinator includes a processor 301 that executes program instructions (e.g., VHP program instructions). In various examples, the processor may be a general purpose microprocessor (e.g., a central processing unit (CPU)), a dedicated microprocessor (e.g., a graphics processing unit (GPU), a physics processing unit (PPU), a digital signal processor (DSP), a network processor, and/or the like), an external processor, a plurality of processors (e.g., working in parallel, distributed, and/or the like), a microcontroller (e.g., for an embedded system), and/or the like. The processor may be implemented using integrated circuits (ICs), application-specific integrated circuits (ASICs), field-programmable gate arrays (FPGAs), and/or the like. In various implementations, the processor may comprise one or more cores, may include embedded elements (e.g., a coprocessor such as a math coprocessor, a cryptographic coprocessor, a physics coprocessor, and/or the like, registers, cache memory, software), may be synchronous (e.g., using a clock signal) or asynchronous (e.g., without a central clock), and/or the like. For example, the processor may be an AMD FX processor, an AMD Opteron processor, an AMD Geode LX processor, an Intel Core i7 processor, an Intel Xeon processor, an Intel Atom processor, an ARM Cortex processor, an IBM PowerPC processor, and/or the like.

The processor may be connected to system memory 305 via a system bus 303. The system bus may interconnect these and/or other elements of a VHP coordinator via electrical, electronic, optical, wireless, and/or the like communication links (e.g., the system bus may be integrated into a motherboard that interconnects VHP coordinator elements and provides power from a power supply). In various examples, the system bus may comprise one or more control buses, address buses, data buses, memory buses, peripheral buses, and/or the like. In various implementations, a system bus may be a parallel bus, a serial bus, a daisy chain design, a hub design, and/or the like. For example, a system bus may comprise a front-side bus, a back-side bus, AMD's Hyper-Transport, Intel's QuickPath Interconnect, a peripheral component interconnect (PCI) bus, an accelerated graphics port (AGP) bus, a PCI Express bus, a low pin count (LPC) bus, a universal serial bus (USB), and/or the like. The system memory, in various examples, may comprise registers, cache memory (e.g., level one, level two, level three), read only memory (ROM) (e.g., BIOS, flash memory), random access memory (RAM) (e.g., static RAM (SRAM), dynamic RAM (DRAM), error-correcting code (ECC) memory), and/or the like. The system memory may be discreet, external, embedded, integrated into a CPU, and/or the like. The processor may access, read from, write to, store in, erase, modify, and/or the like, the system memory in accordance with program instructions (e.g., VHP program instructions) executed by the processor. The system memory may facilitate accessing, storing, retrieving, modifying, deleting, and/or the like data (e.g., VHP data) by the processor.

In various examples, input/output devices 310 may be connected to the processor and/or to the system memory, and/or to one another via the system bus.

In some examples, the input/output devices may include one or more graphics devices 311. The processor may make use of the one or more graphic devices in accordance with program instructions (e.g., VHP program instructions) executed by the processor. In one implementation, a graphics device may be a video card that may obtain (e.g., via a connected video camera), process (e.g., render a frame), output (e.g., via a connected monitor, television, and/or the like), and/or the like graphical (e.g., multimedia, video, image, text) data (e.g., VHP data). A video card may be connected to the system bus via an interface such as PCI, AGP, PCI Express, USB, PC Card, ExpressCard, and/or the like. A video card may use one or more graphics processing units (GPUs), for example, by utilizing AMD's CrossFireX and/or NVIDIA's SLI technologies. A video card may be connected via an interface (e.g., video graphics array (VGA), digital video interface (DVI), Mini-DVI, Micro-DVI, high-definition multimedia interface (HDMI), DisplayPort, Thunderbolt, composite video, S-Video, component video, and/or the like) to one or more displays (e.g., cathode ray tube (CRT), liquid crystal display (LCD), touchscreen, and/or the like) that display graphics. For example, a video card may be an AMD Radeon HD 6990, an ATI Mobility Radeon HD 5870, an AMD FirePro V9800P, an AMD Radeon E6760 MXM V3.0 Module, an NVIDIA GeForce GTX 590, an NVIDIA GeForce GTX 580M, an Intel HD Graphics 3000, and/or the like. In another implementation, a graphics device may be a video capture board that may obtain (e.g., via coaxial cable), process (e.g., overlay with other graphical data), capture, convert (e.g., between different formats, such as MPEG2 to H.264), and/or the like graphical data. A video capture board may be and/or include a TV tuner, may be compatible with a variety of broadcast signals (e.g., NTSC, PAL, ATSC, QAM) may be a part of a video card, and/or the like. For example, a video capture board may be an ATI All-in-Wonder HD, a Hauppauge ImpactVBR 01381, a Hauppauge WinTV-HVR-2250, a Hauppauge Colossus 01414, and/or the like. A graphics device may be discreet, external, embedded, integrated into a CPU, and/or the like. A graphics device may operate in combination with other graphics devices (e.g., in parallel) to provide improved capabilities, data throughput, color depth, and/or the like.

In some examples, input/output devices may include one or more audio devices 313. The processor may make use of the one or more audio devices in accordance with program instructions (e.g., VHP program instructions) executed by the processor. In one implementation, an audio device may be a sound card that may obtain (e.g., via a connected microphone), process, output (e.g., via connected speakers), and/or the like audio data (e.g., VHP data). A sound card may be connected to the system bus via an interface such as PCI, PCI Express, USB, PC Card, ExpressCard, and/or the like. A sound card may be connected via an interface (e.g., tip sleeve (TS), tip ring sleeve (TRS), RCA, TOSLINK, optical) to one or more amplifiers, speakers (e.g., mono, stereo, surround sound), subwoofers, digital musical instruments, and/or the like. For example, a sound card may be an Intel AC'97 integrated codec chip, an Intel HD Audio integrated codec chip, a Creative Sound Blaster X-Fi Titanium HD, a Creative Sound Blaster X-Fi Go! Pro, a Creative Sound Blaster Recon 3D, a Turtle Beach Riviera, a Turtle Beach Amigo II, and/or the like. An audio device may be discreet, external, embedded, integrated into a motherboard, and/or the like. An audio device may operate in combination with other audio devices (e.g., in parallel) to provide improved capabilities, data throughput, audio quality, and/or the like.

In some examples, input/output devices may include one or more network devices 315. The processor may make use of the one or more network devices in accordance with program instructions (e.g., VHP program instructions) executed by the processor. In one implementation, a network device may be a network card that may obtain (e.g., via a Category 5 Ethernet cable), process, output (e.g., via a wireless antenna), and/or the like network data (e.g., VHP data). A network card may be connected to the system bus via an interface such as PCI, PCI Express, USB, FireWire, PC Card, ExpressCard, and/or the like. A network card may be a wired network card (e.g., 10/100/1000, optical fiber), a wireless network card (e.g., Wi-Fi 802.11a/b/g/n/ac/ad, Bluetooth, Near Field Communication (NFC), TransferJet), a modem (e.g., dialup telephone-based, asymmetric digital subscriber line (ADSL), cable modem, power line modem, wireless modem based on cellular protocols such as high speed packet access (HSPA), evolution-data optimized (EV-DO), global system for mobile communications (GSM), worldwide interoperability for microwave access (WiMax), long term evolution (LTE), and/or the like, satellite modem, FM radio modem, radio-frequency identification (RFID) modem, infrared (IR) modem), and/or the like. For example, a network card may be an Intel EXPI9301CT, an Intel EXPI9402PT, a LINKSYS USB300M, a BUFFALO WLI-UC-G450, a Rosewill RNX-MiniN1, a TRENDnet TEW-623PI, a Rosewill RNX-N180UBE, an ASUS USB-BT211, a MOTOROLA SB6120, a U.S. Robotics USR5686G, a Zoom 5697-00-00F, a TRENDnet TPL-401E2K, a D-Link DHP-W306AV, a StarTech ET91000SC, a Broadcom BCM20791, a Broadcom InConcert BCM4330, a Broadcom BCM4360, an LG VL600, a Qualcomm MDM9600, a Toshiba TC35420 TransferJet device, and/or the like. A network device may be discreet, external, embedded, integrated into a motherboard, and/or the like. A network device may operate in combination with other network devices (e.g., in parallel) to provide improved data throughput, redundancy, and/or the like. For example, protocols such as link aggregation control protocol (LACP) based on IEEE 802.3AD-2000 or IEEE 802.1AX-2008 standards may be used. A network device may be used to connect to a local area network (LAN), a wide area network (WAN), a metropolitan area network (MAN), a personal area network, the Internet, an intranet, a Bluetooth network, an NFC network, a Wi-Fi network, a cellular network, and/or the like.

In some examples, the input/output devices may include one or more peripheral devices 317. The processor may make use of the one or more peripheral devices in accordance with program instructions (e.g., VHP program instructions) executed by the processor. In various implementations, a peripheral device may be a digital camera, a video camera, a webcam, an electronically moveable pan tilt zoom (PTZ) camera, a monitor, a touchscreen display, active shutter 3D glasses, head-tracking 3D glasses, a remote control, an audio line-in, an audio line-out, a microphone, headphones, speakers, a subwoofer, a router, a hub, a switch, a firewall, an antenna, a keyboard, a mouse, a trackpad, a trackball, a digitizing tablet, a stylus, a joystick, a gamepad, a game controller, a force-feedback device, a laser, sensors (e.g., proximity sensor, rangefinder, ambient temperature sensor, ambient light sensor, humidity sensor, an accelerometer, a gyroscope, a motion sensor, an olfaction sensor, a biosensor, a chemical sensor, a magnetometer, a radar, a sonar, a location sensor such as global positioning system (GPS), Galileo, GLONASS, and/or the like), a printer, a fax, a scanner, a copier, a card reader, and/or the like. A peripheral device may be connected to the system bus via an interface such as PCI, PCI Express, USB, FireWire, VGA, DVI, Mini-DVI, Micro-DVI, HDMI, DisplayPort, Thunderbolt, composite video, S-Video, component video, PC Card, ExpressCard, serial port, parallel port, PS/2, TS, TRS, RCA, TOSLINK, network connection (e.g., wired such as Ethernet, optical fiber, and/or the like, wireless such as Wi-Fi, Bluetooth, NFC, cellular, and/or the like), a connector of another input/output device, and/or the like. A peripheral device may be discreet, external, embedded, integrated (e.g., into a processor, into a motherboard), and/or the like. A peripheral device may operate in combination with other peripheral devices (e.g., in parallel) to provide a VHP coordinator with a variety of input, output and processing capabilities.

In some examples, input/output devices may include one or more storage devices 319. The processor may access, read from, write to, store in, erase, modify, and/or the like a storage device in accordance with program instructions (e.g., VHP program instructions) executed by the processor. A storage device may facilitate accessing, storing, retrieving, modifying, deleting, and/or the like data (e.g., VHP data) by the processor. In one implementation, the processor may access data from the storage device directly via the system bus. In another implementation, the processor may access data from the storage device by instructing the storage device to transfer the data to the system memory and accessing the data from the system memory. In various examples, a storage device may be a hard disk drive (HDD), a solid-state drive (SSD), a floppy drive using diskettes, an optical disk drive (e.g., compact disk (CD-ROM) drive, CD-Recordable (CD-R) drive, CD-Rewriteable (CD-RW) drive, digital versatile disc (DVD-ROM) drive, DVD-R drive, DVD-RW drive, Blu-ray disk (BD) drive) using an optical medium, a magnetic tape drive using a magnetic tape, a memory card (e.g., a USB flash drive, a compact flash (CF) card, a secure digital extended capacity (SDXC) card), a network attached storage (NAS), a direct-attached storage (DAS), a storage area network (SAN), other processor-readable physical mediums, and/or the like. A storage device may be connected to the system bus via an interface such as PCI, PCI Express, USB, FireWire, PC Card, ExpressCard, integrated drive electronics (IDE), serial advanced technology attachment (SATA), external SATA (eSATA), small computer system interface (SCSI), serial attached SCSI (SAS), fibre channel (FC), network connection (e.g., wired such as Ethernet, optical fiber, and/or the like; wireless such as Wi-Fi, Bluetooth, NFC, cellular, and/or the like), and/or the like. A storage device may be discreet, external, embedded, integrated (e.g., into a motherboard, into another storage device), and/or the like. A storage device may operate in combination with other storage devices to provide improved capacity, data throughput, data redundancy, and/or the like. For example, protocols such as redundant array of independent disks (RAID) (e.g., RAID 0 (striping), RAID 1 (mirroring), RAID 5 (striping with distributed parity), hybrid RAID), just a bunch of drives JBOD), and/or the like may be used. In another example, virtual and/or physical drives may be pooled to create a storage pool. In yet another example, an SSD cache may be used with a HDD to improve speed.

Together and/or separately the system memory 305 and the one or more storage devices 319 may be referred to as memory 320 (i.e., physical memory).

VHP memory 320 contains processor-operable (e.g., accessible) VHP data stores 330. Data stores 330 comprise data that may be used (e.g., by a VHP) via a VHP coordinator. Such data may be organized using one or more data formats such as a database (e.g., a relational database with database tables, an object-oriented database, a graph database, a hierarchical database), a flat file (e.g., organized into a tabular format), a binary file (e.g., a GIF file, an MPEG-4 file), a structured file (e.g., an HTML file, an XML file), a text file, and/or the like. Furthermore, data may be organized using one or more data structures such as an array, a queue, a stack, a set, a linked list, a map, a tree, a hash, a record, an object, a directed graph, and/or the like. In various examples, data stores may be organized in any number of ways (i.e., using any number and configuration of data formats, data structures, VHP coordinator elements, and/or the like) to facilitate VHP operation. For example, VHP data stores may comprise data stores 330a-d implemented as one or more databases. A users data store 330a may be a collection of database tables that include fields such as UserID, UserName, UserPreferences, UserVideos, UserSocialNetworks, and/or the like. A clients data store 330b may be a collection of database tables that include fields such as ClientID, ClientName, ClientDeviceType, ClientScreenResolution, and/or the like. An audio data store 330c may be a collection of database tables that include fields such as AudioID, AudioAlbum, AudioPlaylist, AudioFormat, AudioQuality, AudioPrice, and/or the like. A videos data store 330d may be a collection of database tables that include fields such as VideoID, VideoTitle, VideoDescription, VideoResolution, VideoEffects, VideoSharingSettings, and/or the like. A VHP coordinator may use data stores 330 to keep track of inputs, parameters, settings, variables, records, outputs, and/or the like.

VHP memory 320 contains processor-operable (e.g., executable) VHP components 340. Components 340 comprise program components (including program instructions and any associated data stores) that are executed (e.g., by a VHP) via a VHP coordinator (i.e., via the processor) to transform VHP inputs into VHP outputs. It is to be understood that the various components and their subcomponents, capabilities, applications, and/or the like may be organized in any number of ways (i.e., using any number and configuration of components, subcomponents, capabilities, applications, VHP coordinator elements, and/or the like) to facilitate VHP operation. Furthermore, it is to be understood that the various components and their subcomponents, capabilities, applications, and/or the like may communicate among each other in any number of ways to facilitate VHP operation. For example, the various components and their subcomponents, capabilities, applications, and/or the like may be combined, integrated, consolidated, split up, distributed, and/or the like in any number of ways to facilitate VHP operation. In another example, a single or multiple instances of the various components and their subcomponents, capabilities, applications, and/or the like may be instantiated on each of a single VHP coordinator node, across multiple VHP coordinator nodes, and/or the like.

In various examples, program components may be developed using one or more programming languages, techniques, tools, and/or the like such as an assembly language, Ada, BASIC, C, C++, C#, COBOL, Fortran, Java, LabVIEW, Lisp, Mathematica, MATLAB, OCaml, PL/I, Smalltalk, Visual Basic for Applications (VBA), HTML, XML, CSS, JavaScript, JavaScript Object Notation JSON), PHP, Perl, Ruby, Python, Asynchronous JavaScript and XML (AJAX), Simple Object Access Protocol (SOAP), SSL, ColdFusion, Microsoft .NET, Apache modules, Adobe Flash, Adobe AIR, Microsoft Silverlight, Windows PowerShell, batch files, Tcl, graphical user interface (GUI) toolkits, SQL, database adapters, web application programming interfaces (APIs), application server extensions, integrated development environments (IDEs), libraries (e.g., object libraries, class libraries, remote libraries), remote procedure calls (RPCs), Common Object Request Broker Architecture (COBRA), and/or the like.

In some examples, components 340 may include an operating environment component 340a. The operating environment component may facilitate operation of a VHP via various subcomponents.

In some implementations, an operating environment component may include an operating system subcomponent. An operating system subcomponent may provide an abstraction layer that facilitates the use of, communication among, common services for, interaction with, security of and/or the like of various VHP coordinator elements, components, data stores, and/or the like.

In some examples, an operating system subcomponent may facilitate execution of program instructions (e.g., VHP program instructions) by the processor by providing process management capabilities. For example, an operating system subcomponent may facilitate the use of multiple processors, the execution of multiple processes, multitasking, and/or the like.

In some examples, an operating system subcomponent may facilitate the use of memory by a VHP. For example, an operating system subcomponent may allocate and/or free memory, facilitate memory addressing, provide memory segmentation and/or protection, provide virtual memory capability, facilitate caching, and/or the like. In another example, an operating system subcomponent may include a file system (e.g., File Allocation Table (FAT), New Technology File System (NTFS), Hierarchical File System Plus (HFS+), Universal Disk Format (UDF), Linear Tape File System (LTFS)) to facilitate storage, retrieval, deletion, aggregation, processing, generation, and/or the like of data.

In some examples, an operating system subcomponent may facilitate operation of and/or processing of data for and/or from input/output devices. For example, an operating system subcomponent may include one or more device drivers, interrupt handlers, file systems, and/or the like that allow interaction with input/output devices.

In some examples, an operating system subcomponent may facilitate operation of a VHP coordinator as a node in a computer network by providing support for one or more communications protocols. For example, an operating system subcomponent may include support for an internet protocol suite (i.e., Transmission Control Protocol/Internet Protocol (TCP/IP)) of network protocols such as TCP, IP, User Datagram Protocol (UDP), Mobile IP, and/or the like. In another example, an operating system subcomponent may include support for security protocols (e.g., Wired Equivalent Privacy (WEP), Wi-Fi Protected Access (WPA), WPA2) for wireless computer networks. In yet another example, an operating system subcomponent may include support for virtual private networks (VPNs).

In some examples, an operating system subcomponent may facilitate security of a VHP coordinator. For example, an operating system subcomponent may provide services such as authentication, authorization, audit, network intrusion-detection capabilities, firewall capabilities, antivirus capabilities, and/or the like.

In some examples, an operating system subcomponent may facilitate user interaction with a VHP by providing user interface elements that may be used by a VHP to generate a user interface. In one implementation, such user interface elements may include widgets (e.g., windows, dialog boxes, scrollbars, menu bars, tabs, ribbons, menus, buttons, text boxes, checkboxes, combo boxes, drop-down lists, list boxes, radio buttons, sliders, spinners, grids, labels, progress indicators, icons, tooltips, and/or the like) that may be used to obtain input from and/or provide output to the user. For example, such widgets may be used via a widget toolkit such as Microsoft Foundation Classes (MFC), Apple Cocoa Touch, Java Swing, GTK+, Qt, Yahoo! User Interface Library (YUI), and/or the like. In another implementation, such user interface elements may include sounds (e.g., event notification sounds stored in MP3 file format), animations, vibrations, and/or the like that may be used to inform the user regarding occurrence of various events. For example, an operating system subcomponent may include a user interface such as Windows Aero, Mac OS X Aqua, GNOME Shell, KDE Plasma Workspaces (e.g., Plasma Desktop, Plasma Netbook, Plasma Contour, Plasma Mobile), and/or the like.

In various examples an operating system subcomponent may comprise a single-user operating system, a multi-user operating system, a single-tasking operating system, a multitasking operating system, a single-processor operating system, a multiprocessor operating system, a distributed operating system, an embedded operating system, a real-time operating system, and/or the like. For example, an operating system subcomponent may comprise an operating system such as UNIX, LINUX, IBM i, Sun Solaris, Microsoft Windows Server, Microsoft DOS, Microsoft Windows 7, Apple Mac OS X, Apple iOS, Android, Symbian, Windows Phone 7, Blackberry QNX, and/or the like.

In some implementations, an operating environment component may include a database subcomponent. A database subcomponent may facilitate VHP capabilities such as storage, analysis, retrieval, access, modification, deletion, aggregation, generation, and/or the like of data (e.g., the use of data stores 330). A database subcomponent may make use of database languages (e.g., Structured Query Language (SQL), XQuery), stored procedures, triggers, APIs, and/or the like to provide these capabilities. In various examples a database subcomponent may comprise a cloud database, a data warehouse, a distributed database, an embedded database, a parallel database, a real-time database, and/or the like. For example, a database subcomponent may comprise a database such as Microsoft SQL Server, Microsoft Access, MySQL, IBM DB2, Oracle Database, and/or the like.

In some implementations, an operating environment component may include an information handling subcomponent. An information handling subcomponent may provide a VHP with capabilities to serve, deliver, upload, obtain, present, download, and/or the like a variety of information. An information handling subcomponent may use protocols such as Hypertext Transfer Protocol (HTTP), Hypertext Transfer Protocol Secure (HTTPS), File Transfer Protocol (FTP), Telnet, Secure Shell (SSH), Transport Layer Security (TLS), Secure Sockets Layer (SSL), peer-to-peer (P2P) protocols (e.g., BitTorrent), and/or the like to handle communication of information such as web pages, files, multimedia content (e.g., streaming media), applications, and/or the like.

In some examples, an information handling subcomponent may facilitate the serving of information to users, VHP components, nodes in a computer network, web browsers, and/or the like. For example, an information handling subcomponent may comprise a web server such as Apache HTTP Server, Microsoft Internet Information Services (IIS), Oracle WebLogic Server, Adobe Flash Media Server, Adobe Content Server, and/or the like. Furthermore, a web server may include extensions, plug-ins, add-ons, servlets, and/or the like. For example, these may include Apache modules, IIS extensions, Java servlets, and/or the like. In some implementations, an information handling subcomponent may communicate with a database subcomponent via standards such as Open Database Connectivity (ODBC), Java Database Connectivity (JDBC), ActiveX Data Objects for .NET (ADO.NET), and/or the like. For example, an information handling subcomponent may use such standards to store, analyze, retrieve, access, modify, delete, aggregate, generate, and/or the like data (e.g., data from data stores 330) via the database subcomponent.

In some examples, an information handling subcomponent may facilitate presentation of information obtained from users, VHP components, nodes in a computer network, web servers, and/or the like. For example, an information handling subcomponent may comprise a web browser such as Microsoft Internet Explorer, Mozilla Firefox, Apple Safari, Google Chrome, Opera Mobile, Amazon Silk, Nintendo 3DS Internet Browser, and/or the like. Furthermore, a web browser may include extensions, plug-ins, add-ons, applets, and/or the like. For example, these may include Adobe Flash Player, Adobe Acrobat plug-in, Microsoft Silverlight plug-in, Microsoft Office plug-in, Java plug-in, and/or the like.

In some implementations, an operating environment component may include a messaging subcomponent. The messaging subcomponent may facilitate VHP message communications capabilities. The messaging subcomponent may use protocols such as Simple Mail Transfer Protocol (SMTP), Internet Message Access Protocol (IMAP), Post Office Protocol (POP), Extensible Messaging and Presence Protocol (XMPP), Realtime Transport Protocol (RTP), Internet Relay Chat (IRC), Skype protocol, AOL's Open System for Communication in Realtime (OSCAR), Messaging Application Programming Interface (MAPI), Facebook API, and/or the like to facilitate VHP message communications. The messaging subcomponent may facilitate message communications such as email, instant messaging, Voice over IP (VoIP), video conferencing, Short Message Service (SMS), web chat, and/or the like. For example, the messaging subcomponent may comprise Microsoft Exchange Server, Microsoft Outlook, Sendmail, IBM Lotus Domino, Gmail, AOL Instant Messenger (AIM), Yahoo Messenger, ICQ, Trillian, Skype, Google Talk, Apple FaceTime, Apple iChat, Facebook Chat, and/or the like.

In some implementations, an operating environment component may include a security subcomponent that facilitates VHP security. In some examples, a security subcomponent may restrict access to a VHP, to one or more services provided by a VHP, to data associated with a VHP (e.g., stored in data stores 330), to communication messages associated with a VHP, and/or the like to authorized users. Access may be granted via a login screen, via an API that obtains authentication information, via an authentication token, and/or the like. For example, the user may obtain access by providing a username and/or a password (e.g., a string of characters, a picture password), a personal identification number (PIN), an identification card, a magnetic stripe card, a smart card, a biometric identifier (e.g., a finger print, a voice print, a retina scan, a face scan), a gesture (e.g., a swipe), a media access control (MAC) address, an IP address, and/or the like. Various security models such as access-control lists (ACLs), capability-based security, hierarchical protection domains, and/or the like may be used to control access. For example, the security subcomponent may facilitate digital rights management (DRM), network intrusion detection, firewall capabilities, and/or the like.

In some examples, the security subcomponent may use cryptographic techniques to secure information (e.g., by storing encrypted data), verify message authentication (e.g., via a digital signature), provide integrity checking (e.g., a checksum), and/or the like by facilitating encryption and/or decryption of data. Furthermore, stenographic techniques may be used instead of or in combination with cryptographic techniques. Cryptographic techniques used by a VHP may include symmetric key cryptography using shared keys (e.g., using one or more block ciphers such as triple Data Encryption Standard (DES), Advanced Encryption Standard (AES); stream ciphers such as Rivest Cipher 4 (RC4), Rabbit), asymmetric key cryptography using a public key/private key pair (e.g., using algorithms such as Rivest-Shamir-Adleman (RSA), Digital Signature Algorithm (DSA)), cryptographic hash functions (e.g., using algorithms such as Message-Digest 5 (MD5), Secure Hash Algorithm 2 (SHA-2)), and/or the like. For example, a security subcomponent may comprise a cryptographic system such as Pretty Good Privacy (PGP).

In some implementations, an operating environment component may include a virtualization subcomponent that facilitates VHP virtualization capabilities. In some examples, a virtualization subcomponent may provide support for platform virtualization (e.g., via a virtual machine). Platform virtualization types may include full virtualization, partial virtualization, paravirtualization, and/or the like. In some implementations, platform virtualization may be hardware-assisted (e.g., via support from the processor using technologies such as AMD-V, Intel VT-x, and/or the like). In some examples, a virtualization subcomponent may provide support for various other virtualized environments such as via operating-system level virtualization, desktop virtualization, workspace virtualization, mobile virtualization, application virtualization, database virtualization, and/or the like. In some examples, a virtualization subcomponent may provide support for various virtualized resources such as via memory virtualization, storage virtualization, data virtualization, network virtualization, and/or the like. For example, a virtualization subcomponent may comprise VMware software suite (e.g., VMware Server, VMware Workstation, VMware Player, VMware ESX, VMware ESXi, VMware ThinApp, VMware Infrastructure), Parallels software suite (e.g., Parallels Server, Parallels Workstation, Parallels Desktop, Parallels Mobile, Parallels Virtuozzo Containers), Oracle software suite (e.g., Oracle VM Server for SPARC, Oracle VM Server for x86, Oracle VM VirtualBox, Oracle Solaris 10, Oracle Solaris 11), Informatica Data Services, Wine, and/or the like.

In some examples, components 340 may include a user interface component 340*b*. A user interface component may facilitate user interaction with a VHP by providing a user interface. In various implementations, a user interface component may include programmatic instructions to obtain input from and/or provide output to the user via physical controls (e.g., physical buttons, switches, knobs, wheels, dials), textual user interface, audio user interface, GUI, voice recognition, gesture recognition, touch and/or multi-touch user interface, messages, APIs, and/or the like. In some implementations, the user interface component may make use of the user interface elements provided by an operating system subcomponent of the operating environment component. For example, the user interface component may make use of an operating system subcomponent's user interface elements via a widget toolkit. In some implementations, the user interface component may make use of information presentation capabilities provided by the information handling subcomponent of the operating environment component. For example, a user interface component may make use of a web browser to provide a user interface via HTML5, Adobe Flash, Microsoft Silverlight, and/or the like.

In some examples, components 340 may include any of the components WVS 340*c* described in more detail in preceding figures.

Video Headphones Including at Least One Camera

Figure 21:
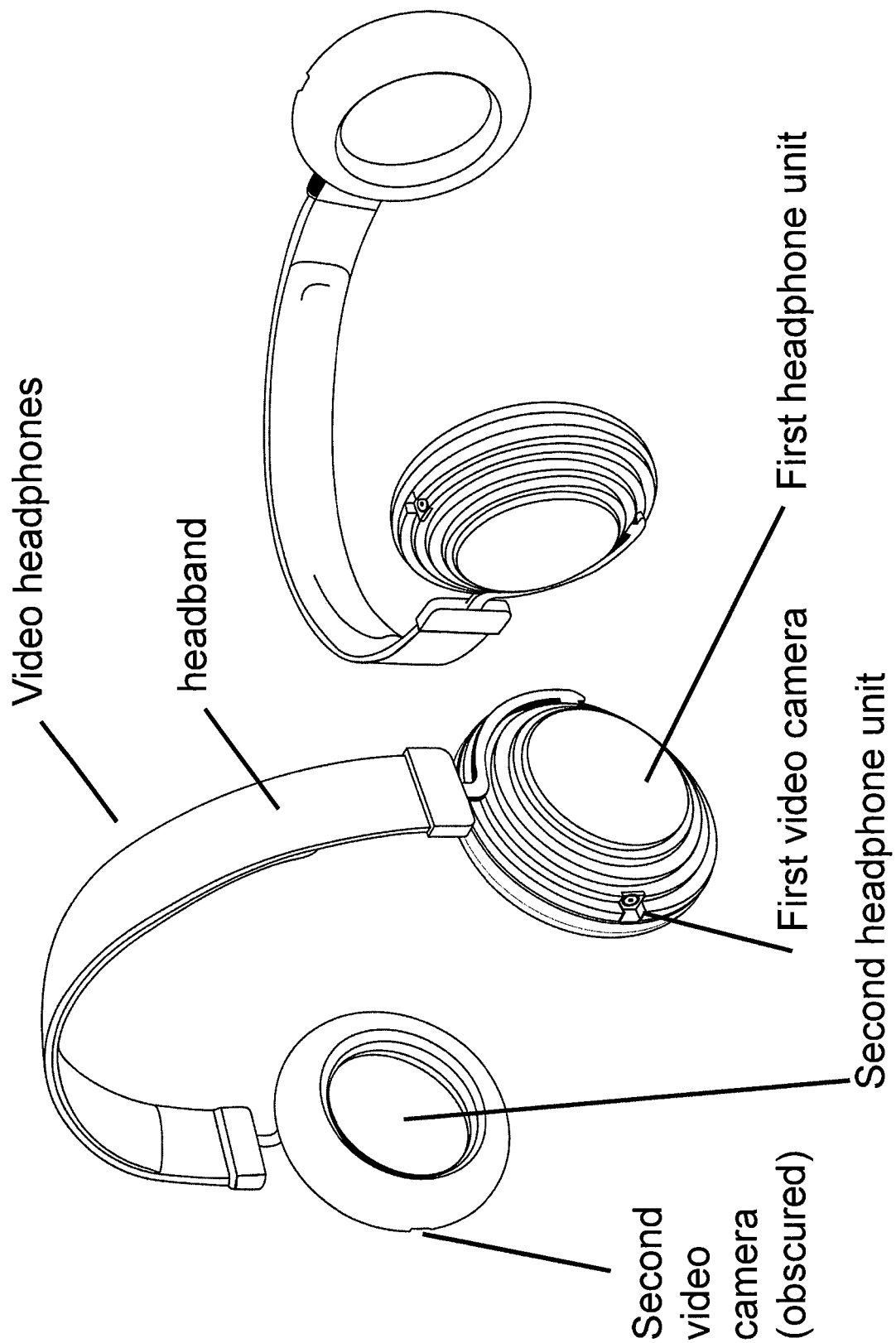
FIG. 21 shows an example of two different perspective views of video headphones.
Figure 30:
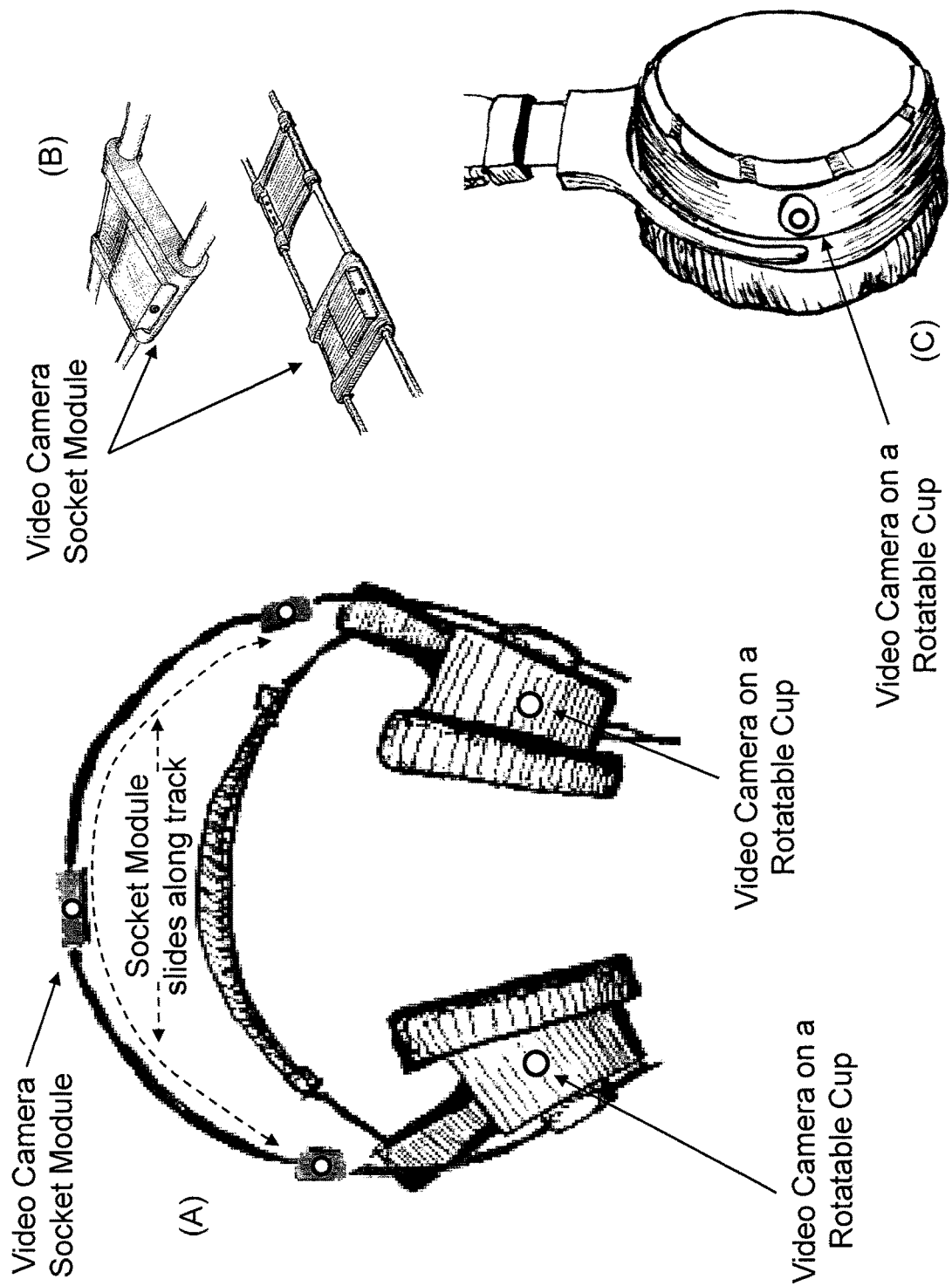
FIG. 30(A) shows an example of video headphones in which each of two headphone units includes a video camera on a rotatable cup.
FIG. 30(B) shows an example of a video camera socket module.
FIG. 30(C) shows an example of a video camera provided on a rotatable cup.
Figure 70:
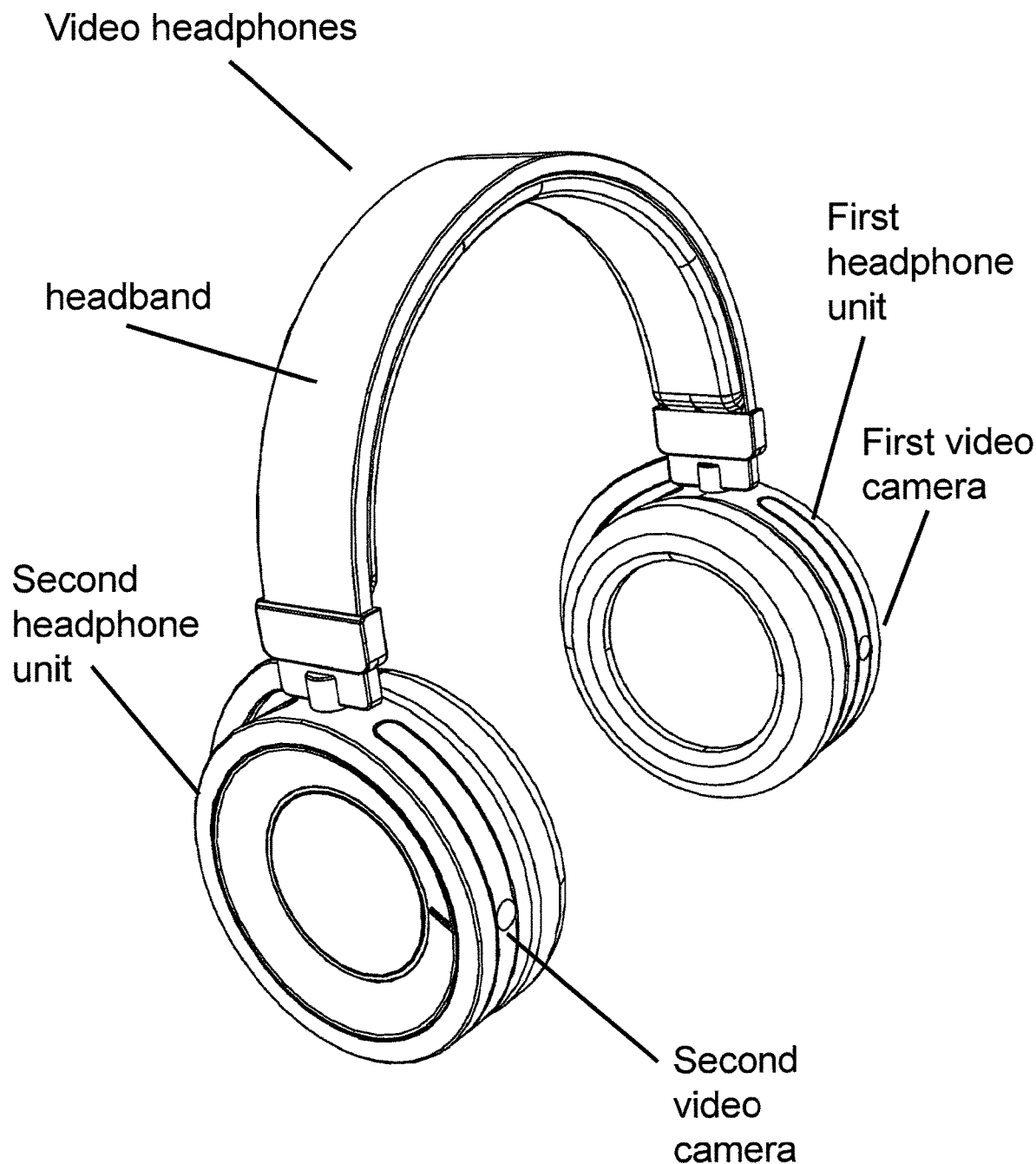
FIG. 70 shows a perspective view of an example of video headphones.

There are provided video headphones including a first video camera in or forming part of a first headphone unit, and a second video camera in or forming part of a second headphone unit, in which the first headphone unit and the second headphone unit are connected by a headband. The headphone units may include organic material e.g. wood. The headband may be mostly metal. The video cameras may be independently rotatable on their respective headphone unit. The video cameras may be independently rotatable on their respective headphone unit about a common axis of rotation. The videos cameras may be rotatable but they may stiffly resist rotation. The headphone units may be coloured. The headphone units may be brightly coloured. FIG. 21 shows an example of two different perspective views of video headphones. FIG. 70 shows an example of video headphones. FIG. 30(A) shows an example of video headphones in which each of two headphone units includes a video camera on a rotatable cup.

Figure 69:
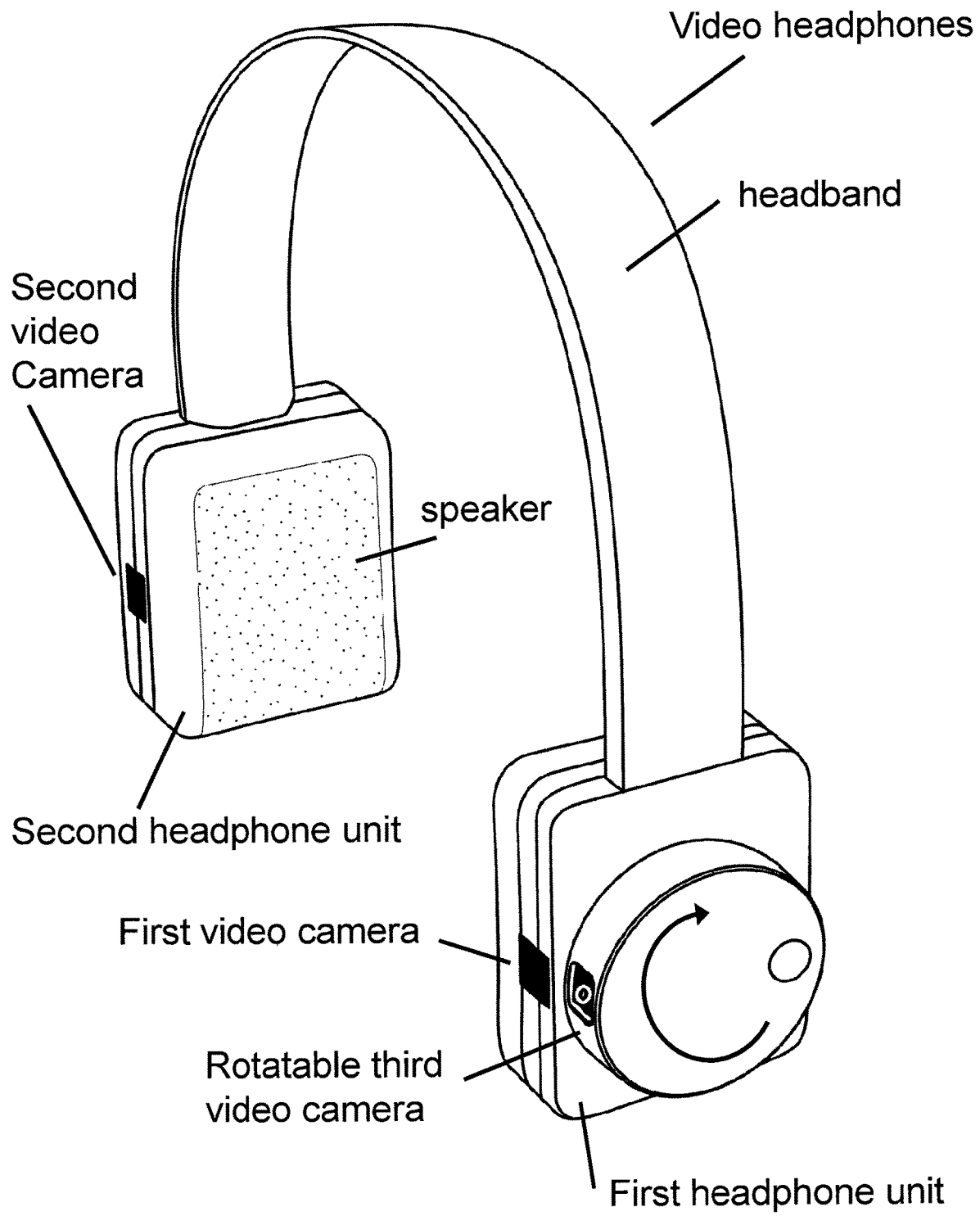
FIG. 69 shows a perspective view of an example of video headphones.

There are provided video headphones including a first video camera in or forming part of a first headphone unit, and a second video camera in or forming part of a second headphone unit, in which the first headphone unit and the second headphone unit are connected by a headband, in which the first headphone unit includes a third camera that is rotatable relative to the first camera. The third camera may be rotatable around an axis between the first headphone unit and the second headphone unit. The headphone units may include organic material e.g. wood. The headband may be mostly metal. The video cameras may be independently rotatable on their respective headphone unit. The first and second video cameras may be fixed on their respective headphone unit. The video cameras may be independently rotatable on their respective headphone unit about a common axis of rotation. The videos cameras may be rotatable but they may stiffly resist rotation. The headphone units may be coloured. The headphone units may be brightly coloured. FIG. 69 shows an example of a perspective view of video headphones.

There are provided headphones with three cameras (e.g. at 9 o'clock, 3 o'clock and rotating only) which can capture the panoramic video/picture. FIG. 69 shows an example of a perspective view of video headphones.

Figure 22:
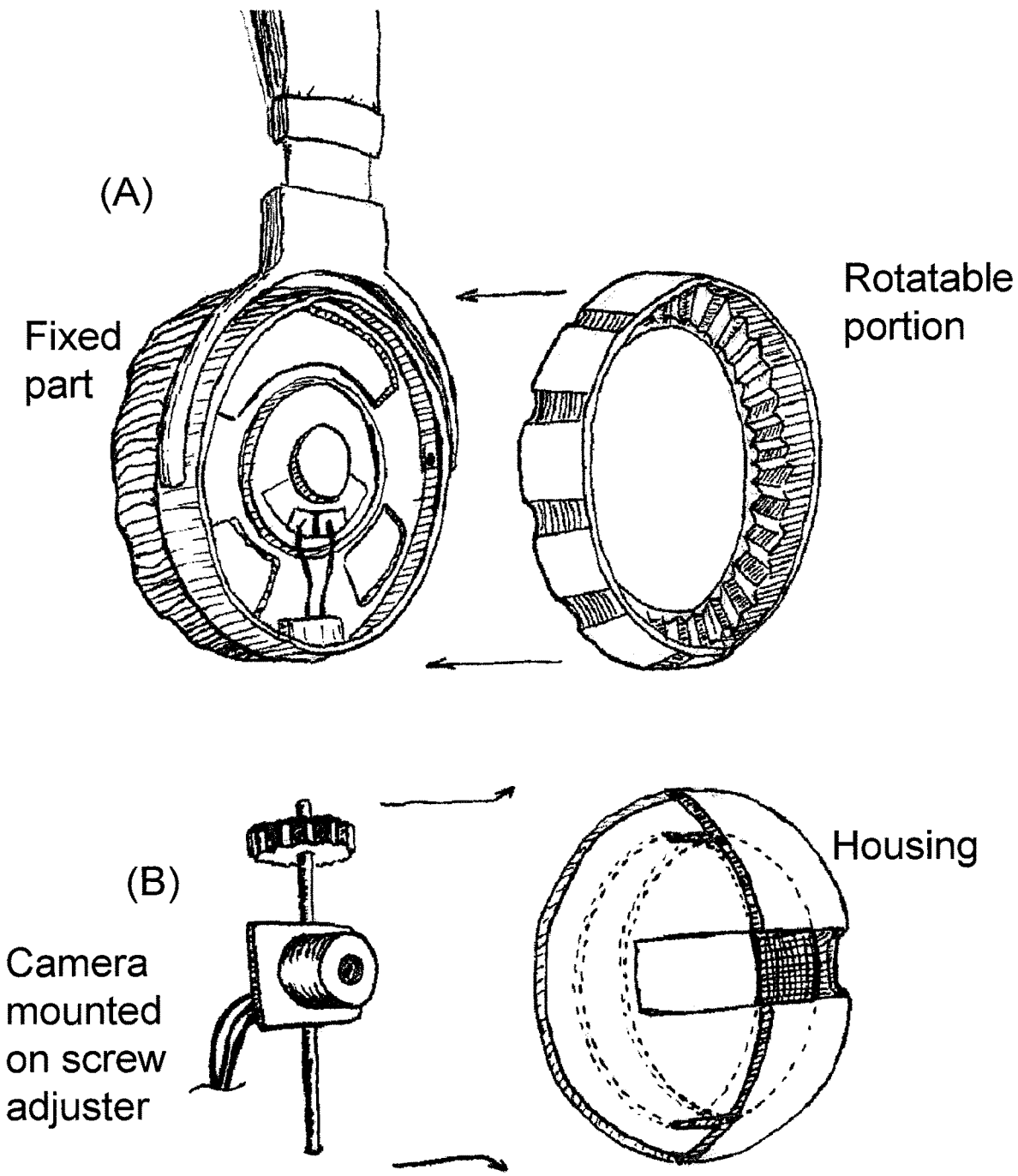
FIG. 22(A) shows an exploded image of a rotatable portion of a headphone unit, and a fixed part of a headphone unit.
FIG. 22(B) shows an exploded image of a camera mounted on a screw adjuster, and a housing within which turning the screw linearly translates the camera within a range of adjustment.

A headphone unit of video headphones may include a rotatable portion. The axis of rotation may be from a first headphone unit to a second headphone unit of video headphones. FIG. 22(A) shows an exploded image of a rotatable portion of a headphone unit, and a fixed part of a headphone unit. A sub-assembly portion of a headphone unit may include a camera and a housing for the camera. The camera may be attached to a screw adjuster so that turning the screw linearly translates the camera within a range of adjustment. FIG. 22(B) shows an exploded image of a camera mounted on a screw adjuster, and a housing within which turning the screw linearly translates the camera within a range of adjustment.

Figure 23:
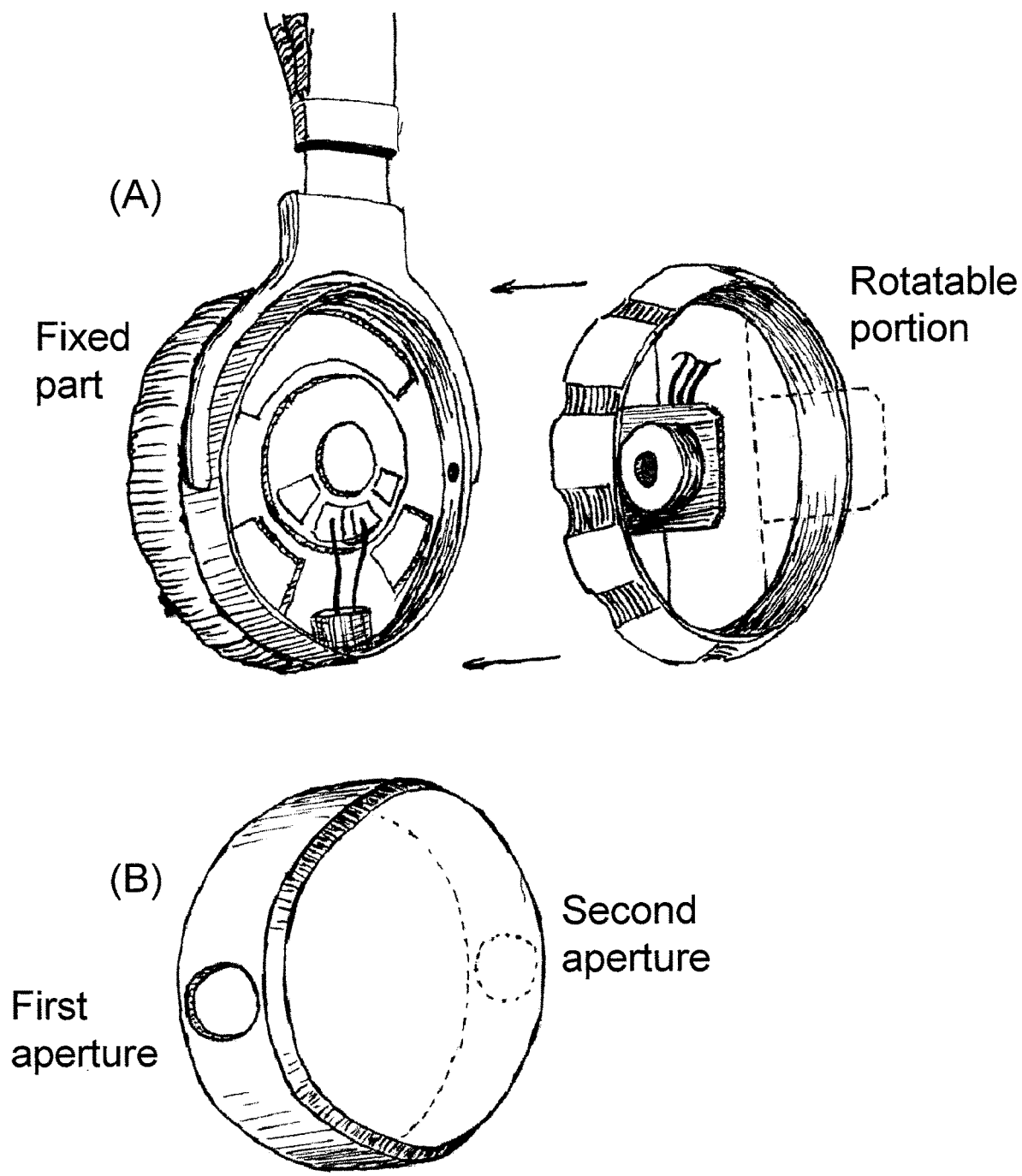
FIG. 23(A) shows an exploded image of a rotatable portion including an integrally mounted camera of a headphone unit, and a fixed part of a headphone unit.
FIG. 23(B) shows an example of an aperture portion.

A headphone unit of video headphones may include a rotatable portion including an integrally mounted camera. The axis of rotation may be from a first headphone unit to a second headphone unit of video headphones. FIG. 23(A) shows an exploded image of a rotatable portion including an integrally mounted camera of a headphone unit, and a fixed part of a headphone unit. A headphone unit may include an aperture portion which provides fixed apertures through which the rotatable camera may view in preselected directions. For example, there may be a first aperture for viewing in a forwards direction and a second aperture for viewing in a backwards direction. If a camera is rotated to a direction in which it cannot view through an aperture, such a direction is suitable for storing the camera when it is not in use, because it prevents scratching to the camera lens surface. FIG. 23(B) shows an example of an aperture portion.

Figure 24:
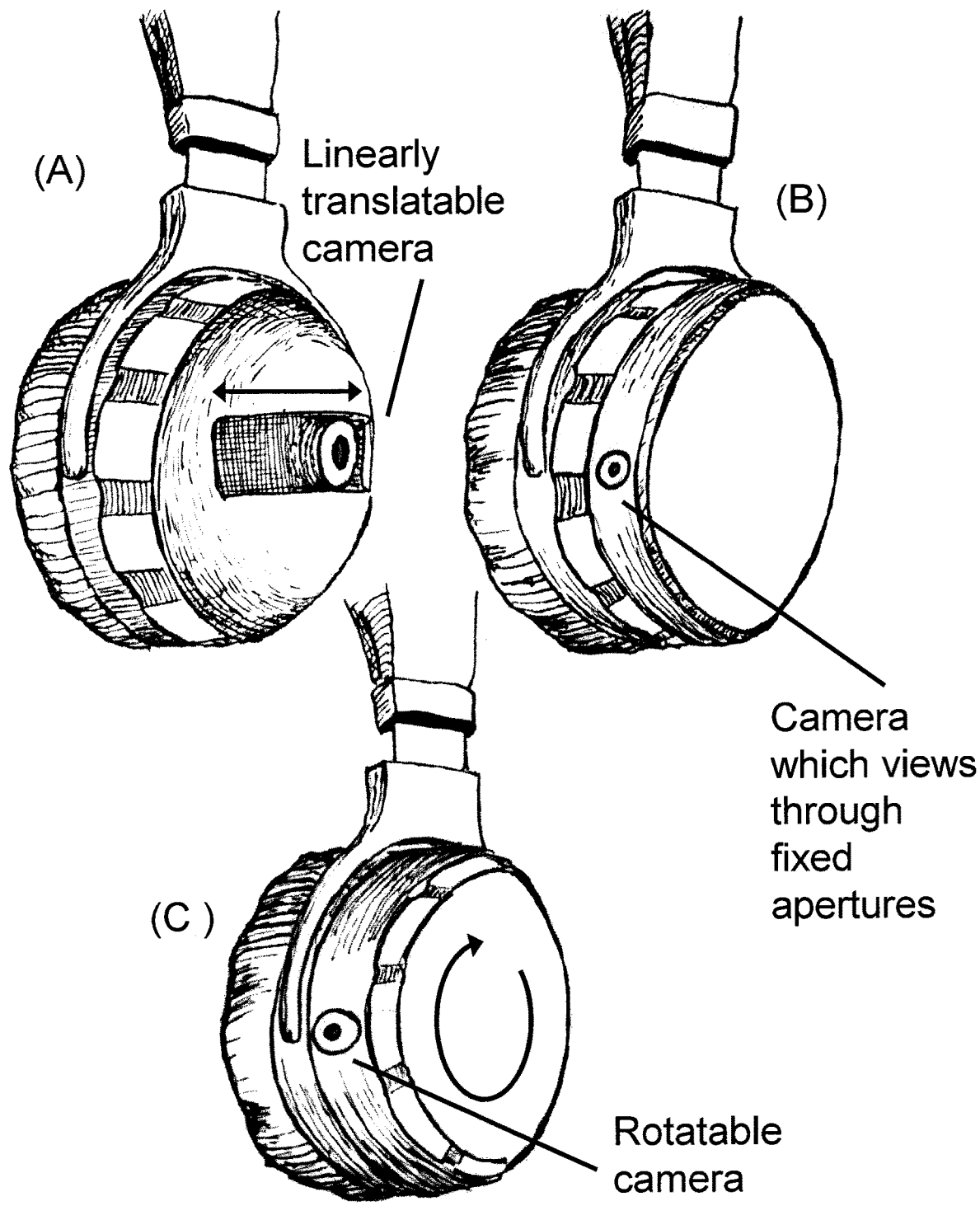
FIG. 24(A) shows an example of a headphone unit of video headphones including a linearly translatable camera.
FIG. 24(B) shows a headphone unit of video headphones including a rotatable camera.
FIG. 24(C) shows a headphone unit of video headphones including a rotatable camera.

A headphone unit of video headphones may include a linearly translatable camera. An example is shown in FIG. 24(A). A headphone unit of video headphones may include a rotatable camera, wherein that camera can only view through fixed apertures in the headphone unit. An example is shown in FIG. 24(B). A headphone unit of video headphones may include a rotatable camera, wherein that camera can view in any direction in a 360 degree range of rotation. An example is shown in FIG. 24(C).

Figure 25:
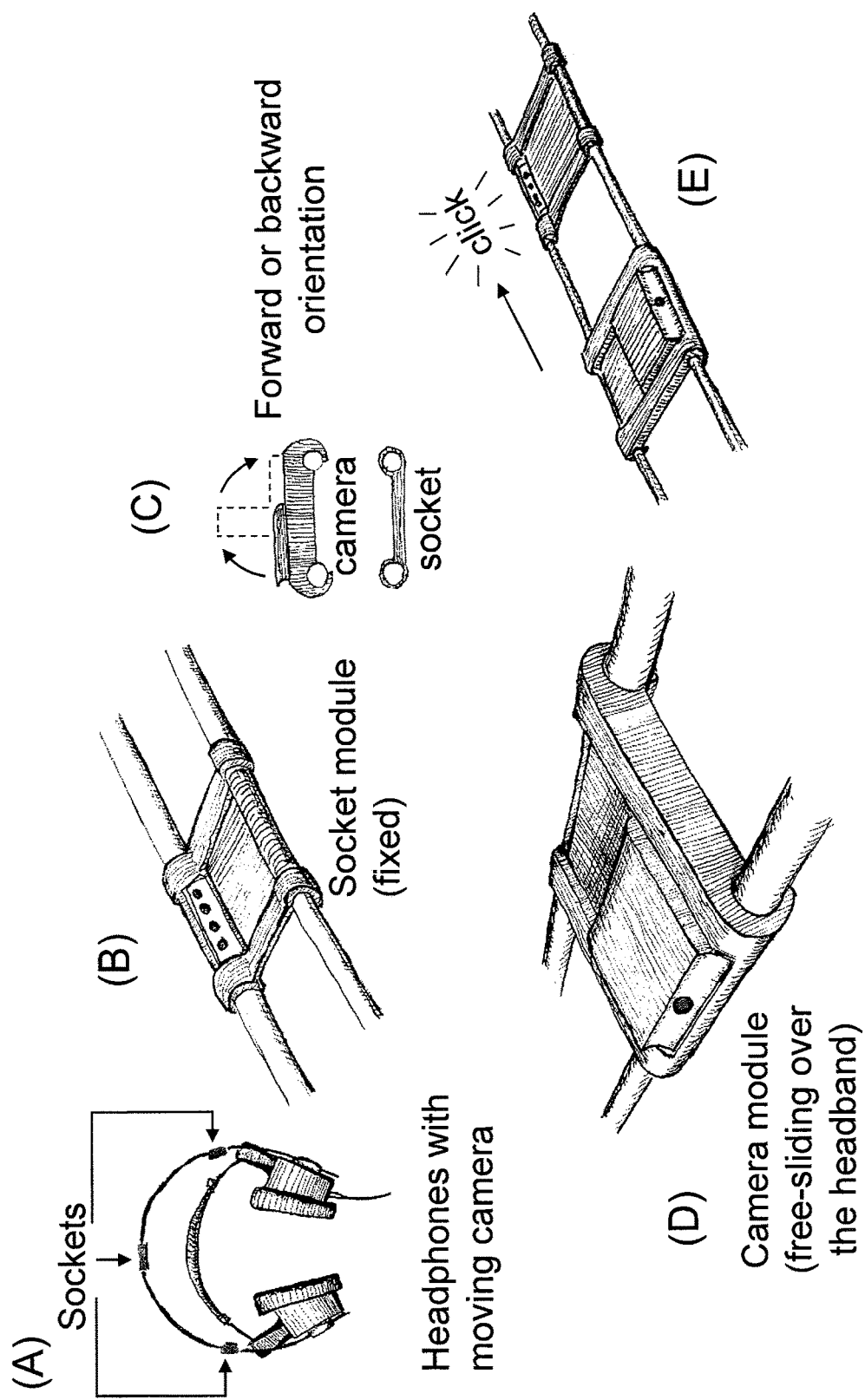
FIG. 25(A) shows an example of video headphones including a headband on which there is provided a slideable camera module and a plurality of socket modules configured to receive the slideable camera.
FIG. 25(B) shows an example of a fixed socket module.
FIG. 25(C) shows an example of a camera module permitting rotation of the camera so that it may face in a forwards or in a backwards orientation.
FIG. 25(D) shows an example of a camera module which is freely slidable over the headband.
FIG. 25(E) shows an example of a camera module which is clickably attachable to a socket module.

Video headphones may be provided in which the video headphones include a headband on which there is provided a slideable camera module and a plurality of socket modules configured to receive the slideable camera. An example is shown in FIG. 25(A). An example of a fixed socket module is shown in FIG. 25(B). A camera module may permit rotation of the camera so that it may face in a forwards or in a backwards orientation. An example is shown in FIG. 25(C). A camera module may be freely slidable over the headband, or it may stiffly resist sliding over the headband, but nevertheless still be slidable over the headband. An example is shown in FIG. 25(D). A camera module may be clickably attachable to a socket module. An example is shown in FIG. 25(E).

Figure 31:
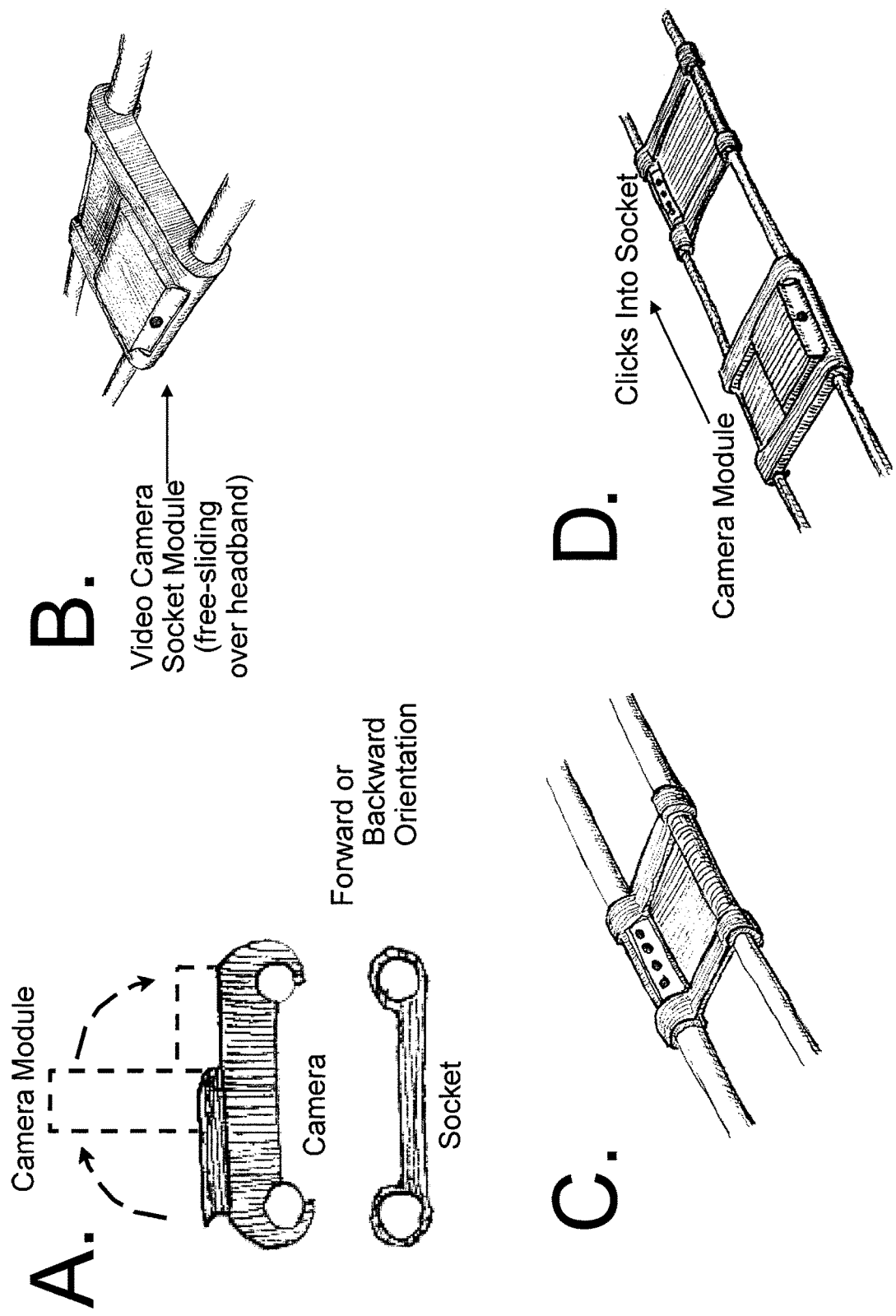
FIG. 31(A) shows an example of camera module permitting rotation of the camera so that it may face in a forwards or in a backwards orientation.
FIG. 31(B) shows an example of a camera module which is freely slidable over a headband.
FIG. 31(C) shows an example of a fixed socket module.
FIG. 31(D) shows a camera module which is clickably attachable to a socket module.

Video headphones may be provided in which the video headphones include a headband on which there is provided a slideable camera module and a plurality of socket modules configured to receive the slideable camera. A camera module may permit rotation of the camera so that it may face in a forwards or in a backwards orientation. An example is shown in FIG. 31(A). A camera module may be freely slidable over the headband, or it may stiffly resist sliding over the headband, but nevertheless still be slidable over the headband. An example is shown in FIG. 31(B). An example of a fixed socket module is shown in FIG. 31(C). A camera module may be clickably attachable to a socket module. An example is shown in FIG. 31(D).

Figure 26A:
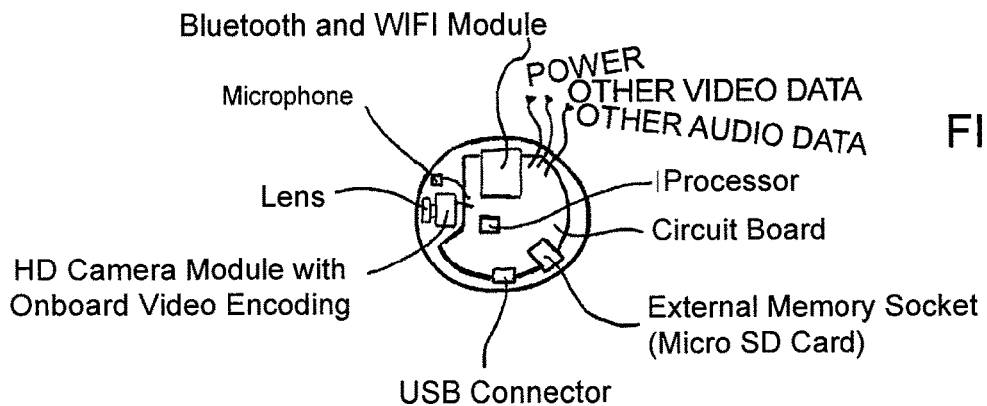
FIG. 26(A) shows an example of a left headphone cup.
Figure 26B:
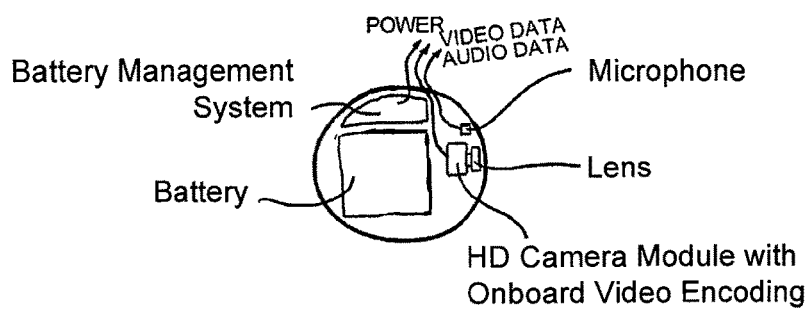
FIG. 26(B) shows an example of a right headphone cup.

Video headphones may be provided in which a left headphone cup and a right headphone cup are not mirror images of each other. For example, this may be because a particular function of the video headphones is performed in one cup, and is not duplicated in the other cup. A left headphone cup may include a Bluetooth and Wifi module, a processor, a circuit board, a microphone, a camera lens, a HD camera module with on board video encoding, an external memory socket (e.g. for a micro SD card), a power source, a separate video data source, a separate audio source and a USB connector socket. An example is shown in FIG. 26(A). A right headphone cup may include a microphone, a camera lens, a HD camera module with on board video encoding, a power source, a battery, a battery management system, a video data output line, and an audio data output line. An example is shown in FIG. 26(B).

Figure 26C:
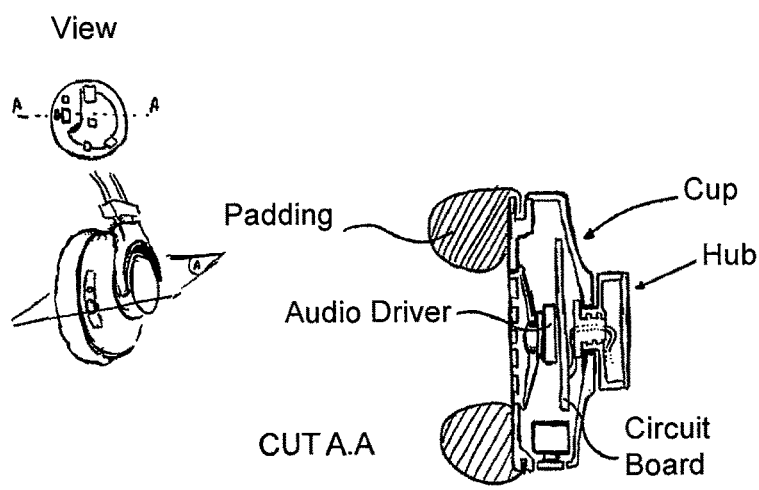
FIG. 26(C) shows an example of a left rotating cup assembly.

Video headphones may be provided in which each headphone cup includes a rotating cup assembly. A rotating cup assembly may include a cup, a hub, a circuit board, an audio driver, and padding suitable for contact to an ear of a wearer of the video headphones. The cup may rotate round its principal axis relative to the hub. The cable may pass through a center of the rotation axis. An example is shown in FIG. 26(C).

Figure 28:
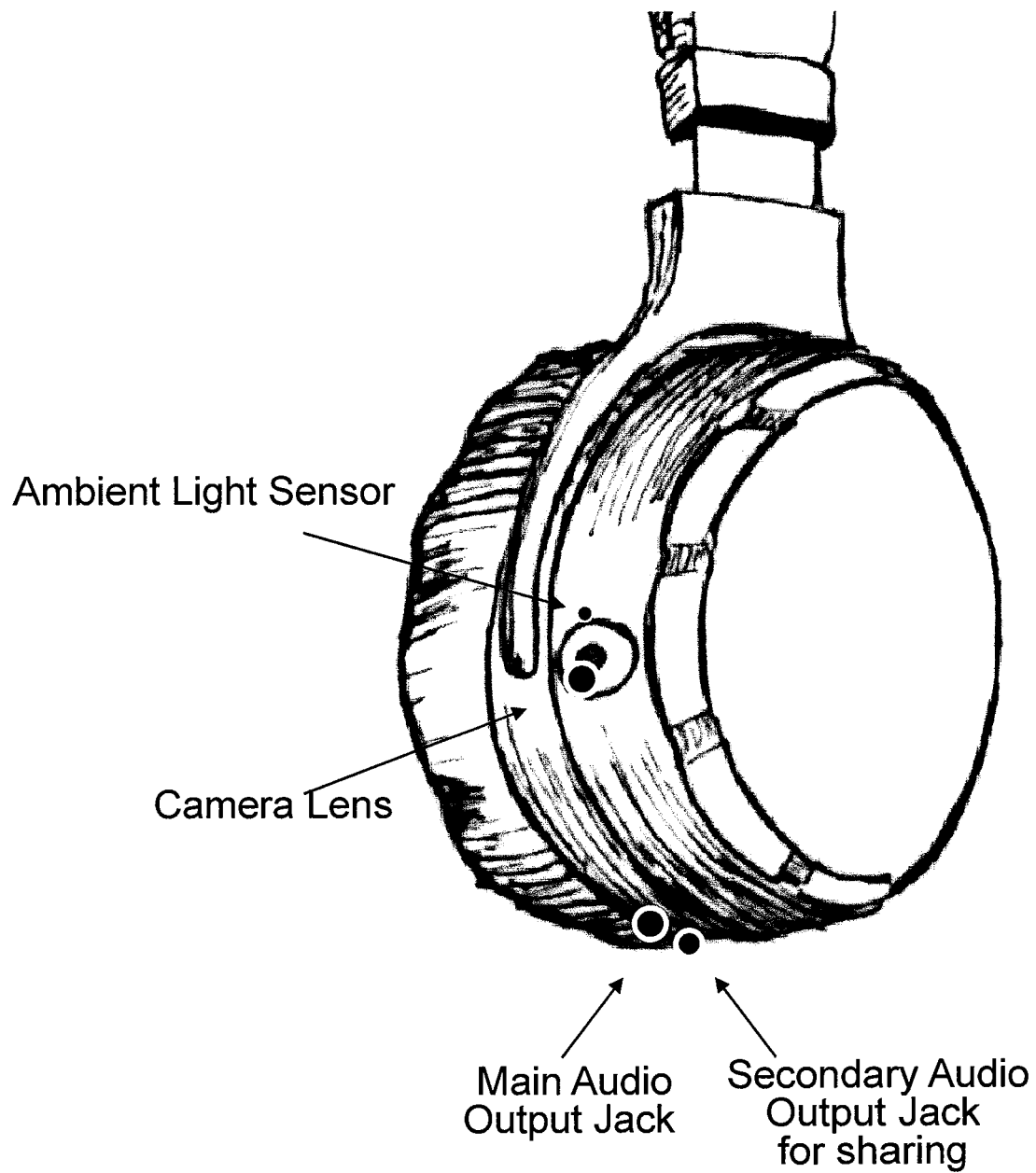
FIG. 28 shows an example of a headphone unit including an ambient light sensor.

A headphone unit may include an ambient light sensor. A headphone unit may include a camera. A headphone unit may include a main audio output jack. A headphone unit may include a secondary audio output jack for sharing. An example is shown in FIG. 28.

Video headphones may be provided in which the video headphones include a headband on which there is provided a slideable video camera socket module and a plurality of socket modules configured to receive the slideable camera, and the video headphones include headphone units each with a video camera on a rotatable cup. An example is shown in FIG. 30(A). Examples of a video camera socket module are shown in FIG. 30(B). A video camera may be provided on a rotatable cup. An example is shown in FIG. 30(C).

Figure 27:
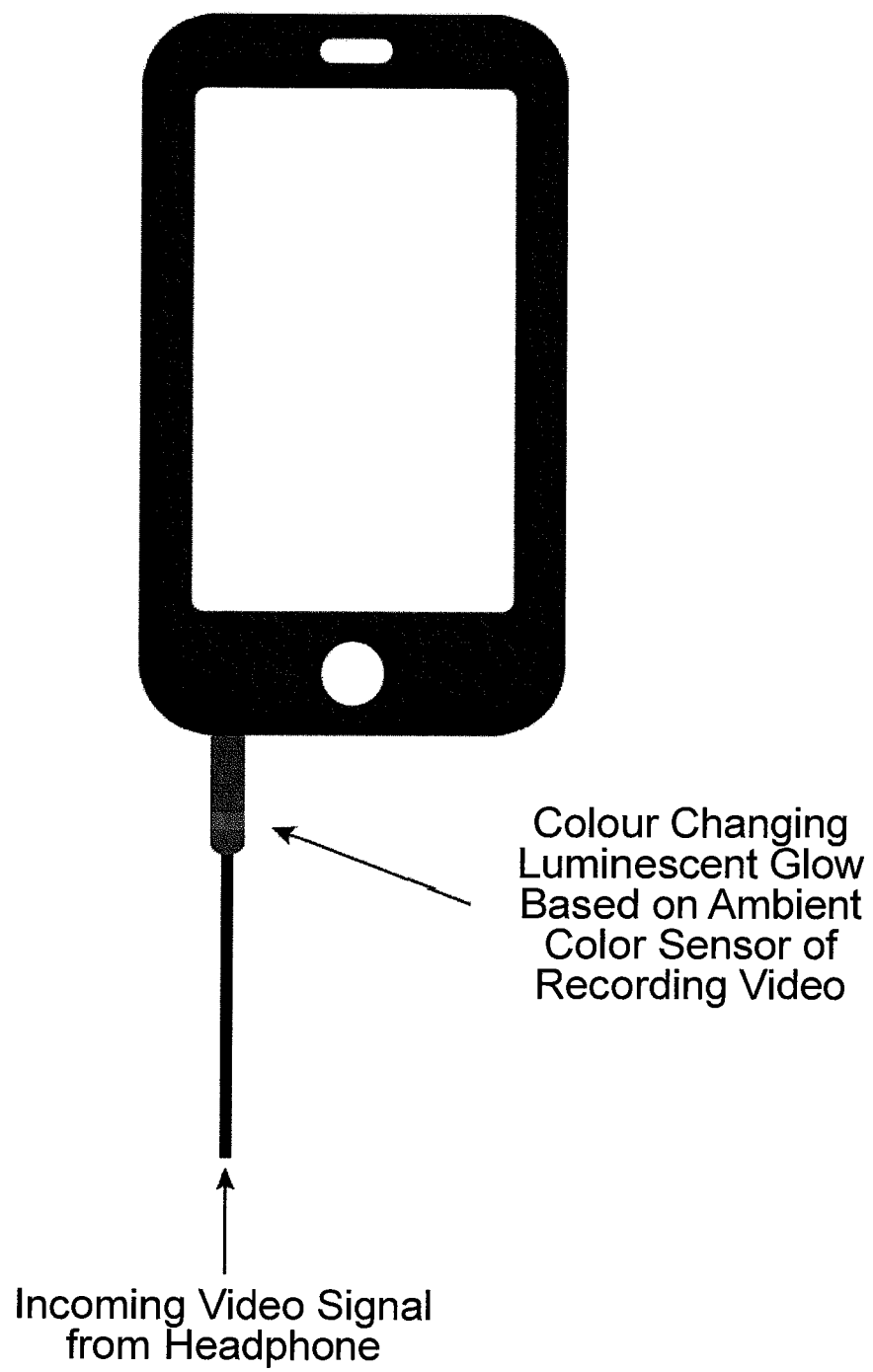
FIG. 27 shows an example of a mobile phone which is connectable to video headphones, wherein there is further provided a luminescent recording indicator.

There is provided a mobile device (e.g. mobile phone) which is connectable to video headphones, wherein there is further provided a luminescent recording indicator which is insertable into a socket of the mobile device, wherein the luminescent recording indicator and the mobile device are configured to illuminate the luminescent recording indicator when the mobile device is recording video data. The luminescent recording indicator may change its colour based on a sensed ambient colour of the recorded video. The luminescent recording indicator may form part of a lead or antenna through which a video signal is received by the mobile device from the video headphones. A mobile device may be an iPhone. An example is shown in FIG. 27.

Video headphones are provided which may be wired, lightning, Bluetooth and Near Field Communication (NFC) video transfer capable. A mobile device in communication with video headphones is provided wherein the mobile device may be in connection with a luminescent wire connector that glows when recording to alert anyone in the area that recording is on. The wire connector may have Universal Serial Bus (USB) on-the-go (OTG), 9 pin and lightning connector ends for both iPhone and android. An example of a luminescent wire connector is shown in FIG. 27.

Figure 29:
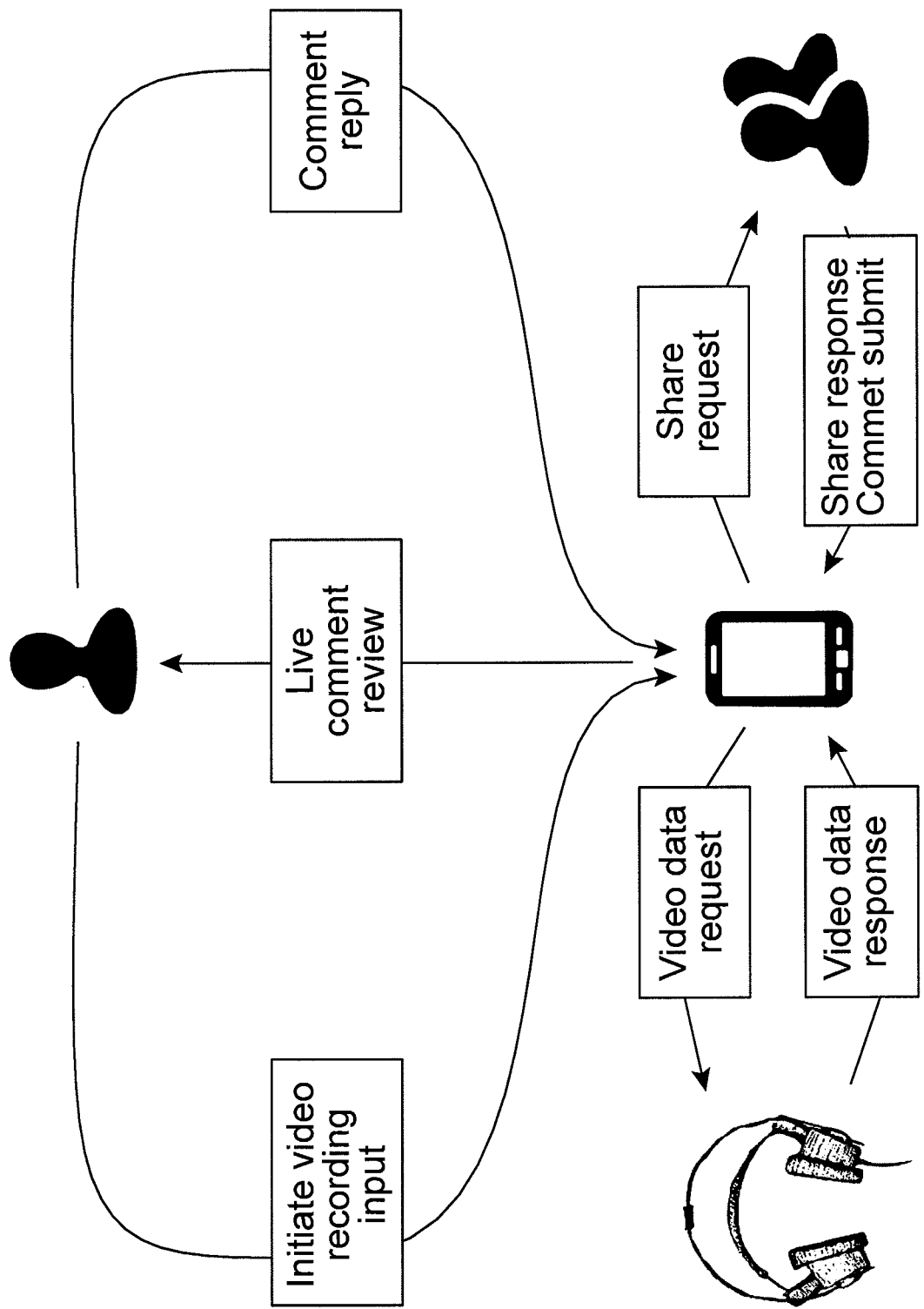
FIG. 29 shows an example of a Live Video Feed Process.

There is provided a system including video headphones connectable to a mobile device (e.g. smartphone). The mobile device may be operable to make a video data request to the video headphones via the connection, which may be wired or wireless. The video headphones may be configured to respond to the request to provide video data to the mobile device. The mobile device may be configured to request a third party device to share video content on the mobile device with the third party device. The mobile device may be configured to receive a response and/or a comment relating to video content shared with the third party device. The mobile device may be configured to receive a request to initiate video recording, for example via a user interface of the mobile device, or from a third party device in connection with the mobile device, which initiates video recording on the video headphones. The mobile device may be configured to provide output of live comments received on video data, for example to a user interface of the device, or to a third party device connected to the mobile device. The mobile device may be configured to receive comments in reply to provided output of live comments received on video data, where for example the replies are received via a user interface of the device, or from third party devices connected to the mobile device. An example is shown in FIG. 29.

Figure 37:
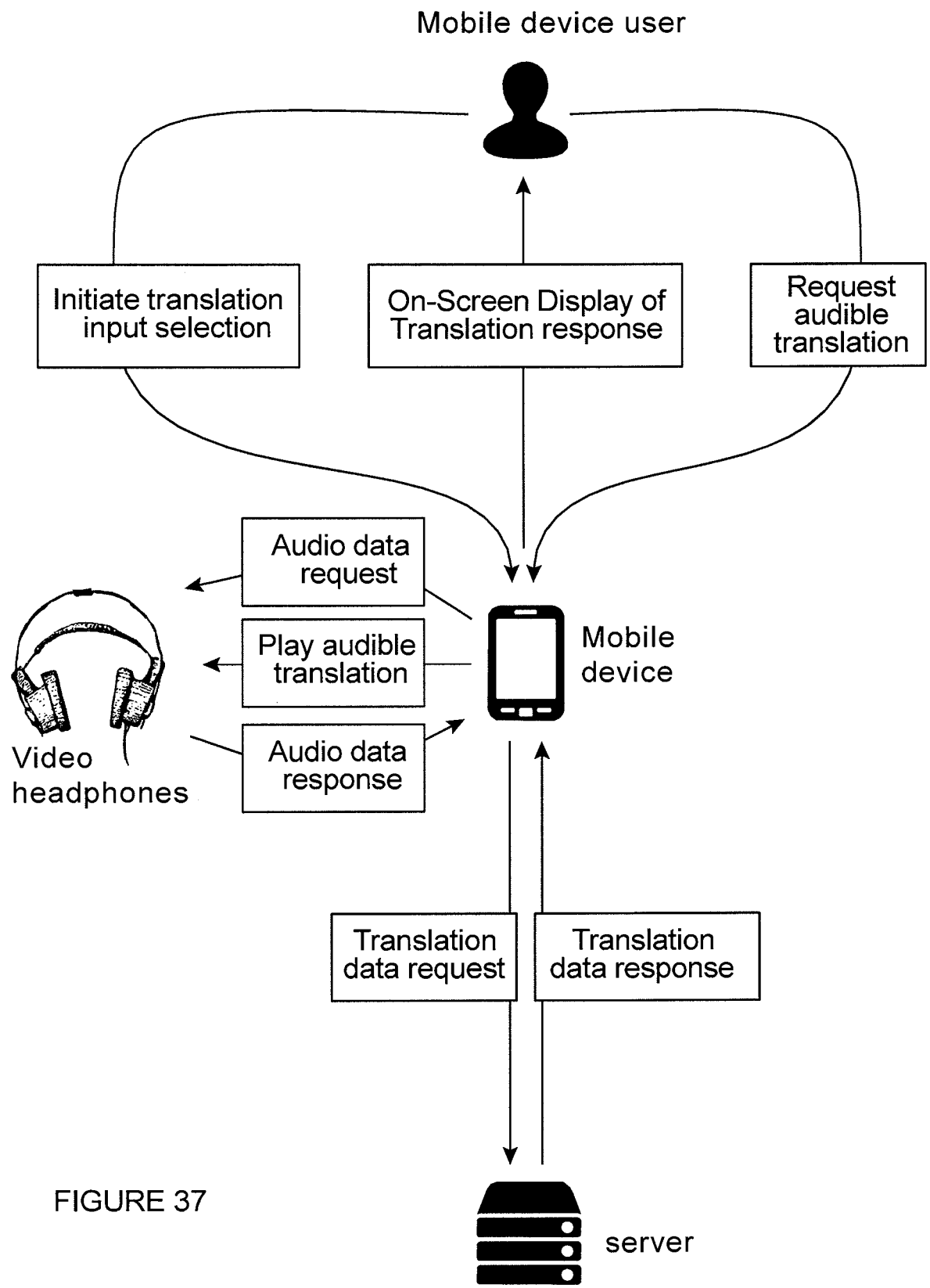
FIG. 37 shows an example of a Translation process.

There is provided a system including video headphones connectable to a mobile device (e.g. smartphone). The mobile device may be operable to make an audio data request to the video headphones via the connection, which may be wired or wireless. The video headphones may be configured to respond to the request to provide audio data to the mobile device. The mobile device may be configured to play an audible translation for reproduction on the headphones of the video headphones. The mobile device may be configured to receive a request for an audible translation, for example via a user interface of the mobile device, or from a third party device in connection with the mobile device, which initiates translation of an audio file on the mobile device. The mobile device may be configured to receive an initiate translation input selection, for example via a user interface of the mobile device, or from a third party device in connection with the mobile device, which initiates translation of a selected audio file on the mobile device. The mobile device may be configured to provide an on-screen display of a response to the translation request, for example to a user interface of the device, or to a third party device connected to the mobile device. The mobile device may be configured to send a translation data request, including for example an audio file to be translated, and a designated output language, to a server in connection with the mobile device. The mobile device may be configured to receive a translation data response from the server in response to the request. An example is shown in FIG. 37.

There may be a mobile device (e.g. mobile phone) interface which allows a user to select normal frame (for example, a 3:4 aspect ratio) from a panoramic video. There may be an automatic panoramic video framing based on a moving object. For example, a person is passing by from left to the right and it is possible to frame the panoramic video with her to make a standard 3:4 aspect ratio video, which looks like a camera turning from left to the right.

Figure 35:
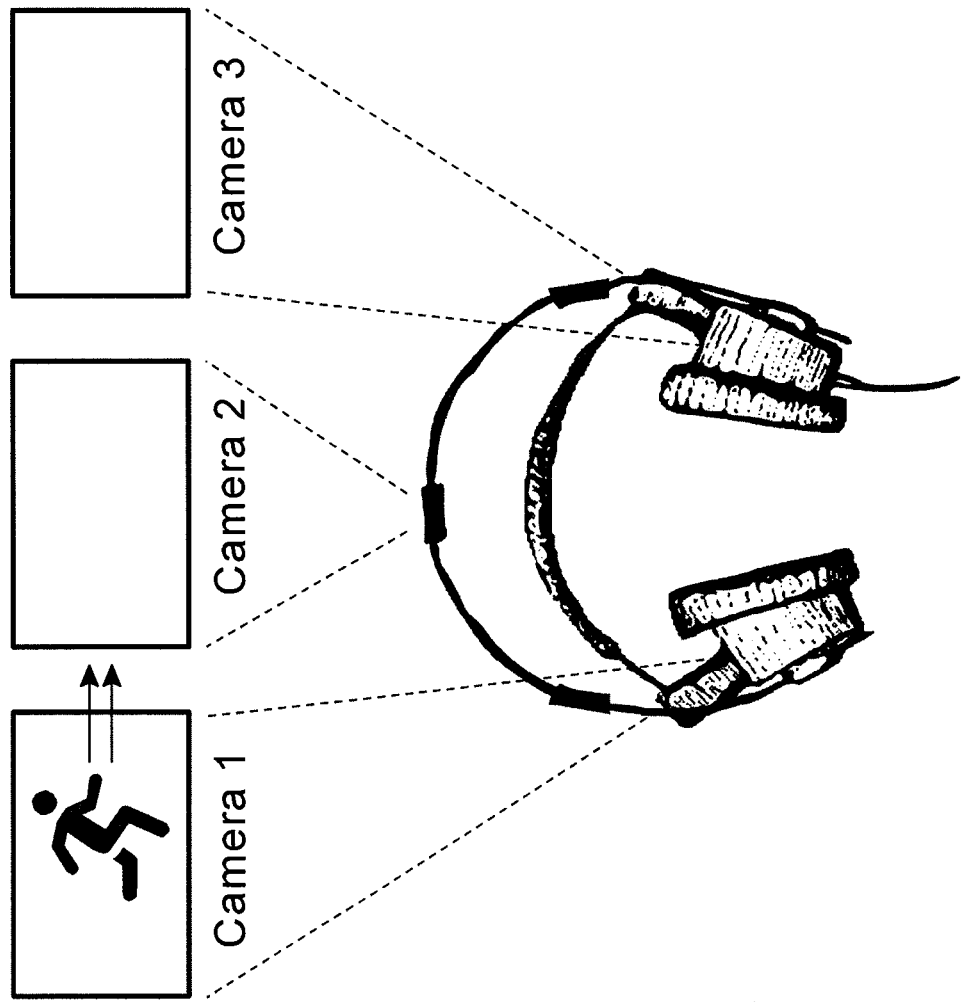
FIG. 35 shows an example of a Panorama Image Capture.

In an example, there are provided three well-separated cameras of video headphones, in which a first camera is on a first headphone unit, a second video camera is on a second headphone unit, and a third video camera is on a headband of the video headphones. The video images from the three cameras may be stitched together, or edited. The stitched together or edited images may provide a constant radius image, for example, or a variable radius image, for example. The cameras may detect the movement of a subject. An example is shown in FIG. 35.

Figure 36:
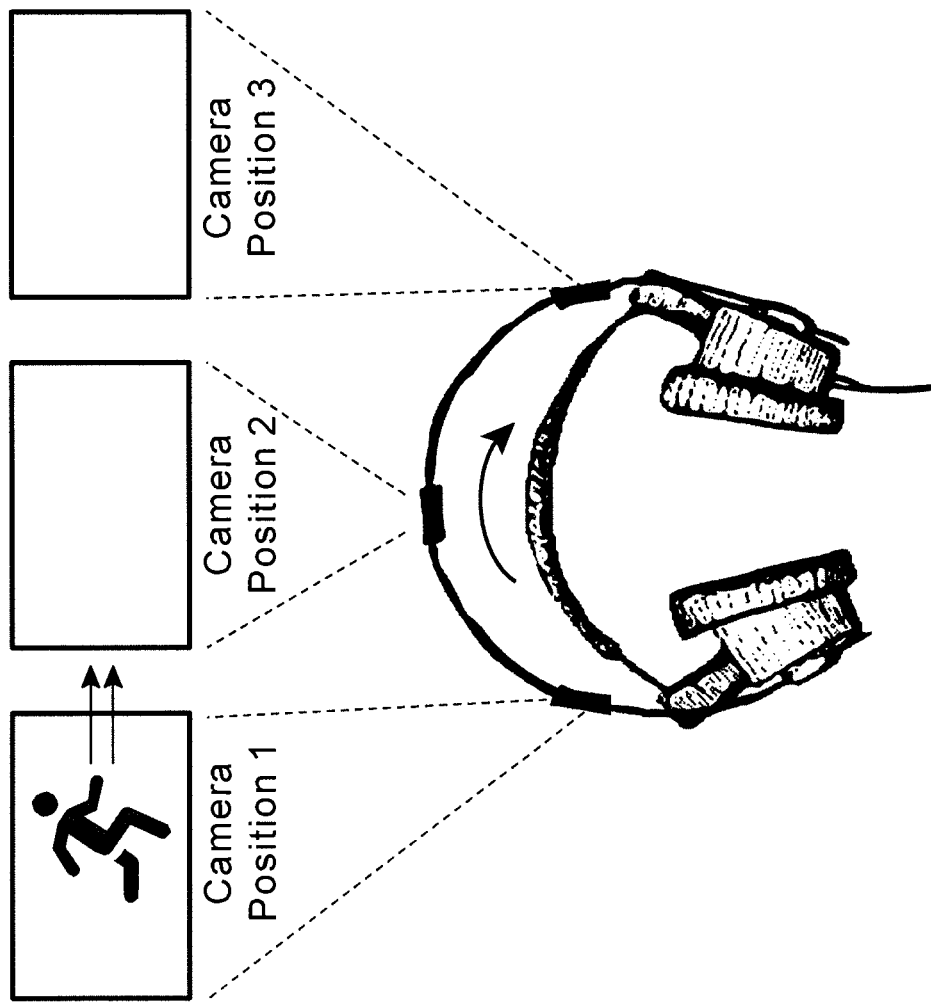
FIG. 36 shows an example of a Panorama Image Capture.

In an example, there are provided three well-separated cameras on a headband of video headphones. The video images from the three cameras may be stitched together, or edited. The stitched together or edited images may provide a constant radius image, for example, or a variable radius image, for example. The cameras may detect the movement of a subject. An example is shown in FIG. 36.

In an example, there are provided headphones with accelerometer/gyro sensors to determine camera movement for video stabilization.

In an example, there are provided headphones with an ambient light/color sensor (we can use the camera for this, in an example) to determine median ambient color and make music suggestion better corresponding to contextual info. An example of a headphone unit including an ambient light sensor is shown in FIG. 28.

In an example, there are provided headphones with several microphones which may select spatial sound sources in the environment for music recognition/sound recording. In an example, there are provided headphones with an accessory to capture an electroencephalogram to make music suggestion better and/or to control the recording.

In an example, there are provided headphones with wireless video transmission over Bluetooth (this is preferable to WiFi, because for example a user doesn't lose internet connectivity). The video may be compressed into h.264 format on the headphones and transmitted to the phone. There are two example cases: in one example, Bluetooth bandwidth is enough; so the video is transmitted on the fly. In another example, the bandwidth is not enough. If the bandwidth is not enough, a real-time low-resolution viewfinder video may be transmitted and after recording is done; a hi-resolution video may be transmitted asynchronically in the background to the phone.

In an example, there are provided headphones with an audio jack which could be used for audio input in case of empty batteries or audio output to share the music with another person. An example of a headphone unit including a secondary audio output jack for sharing is shown in FIG. 28.

In an example, there are provided headphones with sensors, which detect if the headphones are on the head or not, so as to stop/resume the music playback according to if the headphones are on a user's head or not.

In an example, there are provided headphones with a loudspeaker option to share music e.g. at a party.

In an example, there are provided headphones that record a video image and that automatically use the music you're listening to on the headphones as the video soundtrack. Regarding the video headphones, there is the added function of automatically using the music the user is actually listening to as the video soundtrack.

To provide high quality video in a video recording in which the sound track is a pre-recorded sound file, the following may be performed. A real-time viewfinder may be provided with low-resolution image output and with a high-frame rate output. Super-sampling may be provided on a connected mobile device (e.g. mobile-phone) to increase (e.g. to double) the frame rate. Asynchronous full-resolution video transfer from the camera-containing device may be provided after video capturing is done. When a user presses the record button, only viewfinder data is transferred from the camera-containing device to the wirelessly connected mobile device (e.g. mobile-phone) due to wireless (e.g. Bluetooth) bandwidth limitations.

When a user presses a stop recording button, transfer may be started of captured full-resolution video. During the full-resolution-video transfer a user may edit the video using preview quality image output. An advantage is that it's much faster to edit the video using preview quality image output, rather than waiting for final video transfer. A user should not necessarily have to wait for final video transfer. As soon as a user has finished the editing and while full-resolution video is being transferred to a mobile device (e.g. mobile-phone), the editing software will apply the same actions (the actions implied by the editing) to the full-resolution video. Motion sensor information may be used to improve the video recorded on the headphones side by applying precise video-stabilization either on a connected mobile device (e.g. mobile-phone) or on a cloud side or server side to save the battery power on the headphones and/or on the mobile device (e.g. mobile-phone). More than one camera on headphones may be used to capture a panoramic video. A user can select a non-panoramic frame from a panorama. Software (e.g. on a mobile device or on a mobile phone connected to the headphones) can track moving objects in the panorama automatically and crop the panorama to a standard frame.

High quality stereo music reproduction is characterized by reproducing audio frequencies in the human audio frequency range of about 20 Hz to about 20 kHz. In particular, lower quality stereo music reproduction often characterized by the inability to reproduce lower frequencies, particularly in the frequency range from about 20 Hz to about 50 Hz. Small loudspeakers are loudspeakers suitable for use on headphones.

There is provided a system including video headphones, and a mobile device (e.g. a smartphone) in connection with the video headphones and running an application, that allows a user to record video, edit, and mix their music to share with their community. A user may for example record video, edit their music playlist, alter their video effects, add a video title, and share with their community using the headphones and mobile application running on the mobile device. The headphones may provide disc jockey (DJ) audio quality. The headphones may allow a user to record life from their own Point of view (POV) and swivel each video camera equipped headphone cup for front & rear POV viewing while the mobile app may allow a user to edit video and audio like a Pro! A user may edit their own music soundtrack & share on the social media platform of their choice. The system is premium headphone innovation, which offers deeper levels of engagement and connection for consumers through video capture and sharing capabilities. The system opens the door for first timers to join a headphone revolution in an easily adoptable, sleek and stylish way. The system takes the singular experience of the video headphone consumer and provides access to share the love of music and video with their Social Network.

There is provided a head-mountable device comprising: a first earphone assembly that includes a first housing defining a first interior space and a first loudspeaker disposed at least partially within the first interior space and integrated with the first housing; a second earphone assembly that includes a second housing defining a second interior space and a second loudspeaker disposed at least partially within the second interior space and integrated with the second housing; an image capturing apparatus that includes a camera integrated with the first earphone assembly; audio input connections each configured to receive audio signals from at least one of two independent audio sources; and an audio output configured to supply audio signals from the audio input connections to the first and second loudspeakers; wherein the head mountable device is configured to permit switching between the first one of the audio sources and the second one of the audio sources, and wherein the image capturing apparatus is configured to operate concurrently with either one of the audio sources. An on/off switch to begin and end recording of video concurrent with a selected audio source may be provided. A multi-mode switching feature is useful in a device because the device may have at least two audio sources (a microphone and a music player). An on/off switch and a switch for changing the audio source residing on the headphone may be useful for a wireless version.

Video headphones may be provided with at least three modes: no audio, mic as audio source concurrently played with video, and player as audio source concurrently played with video recording. A fourth mode may be mic and player as audio sources concurrently played with video as it is captured. A user may be able to switch between these modes.

User Interface Aspects

There is provided a mobile device (e.g. mobile phone) which is connectable to video headphones.

Figure 32:
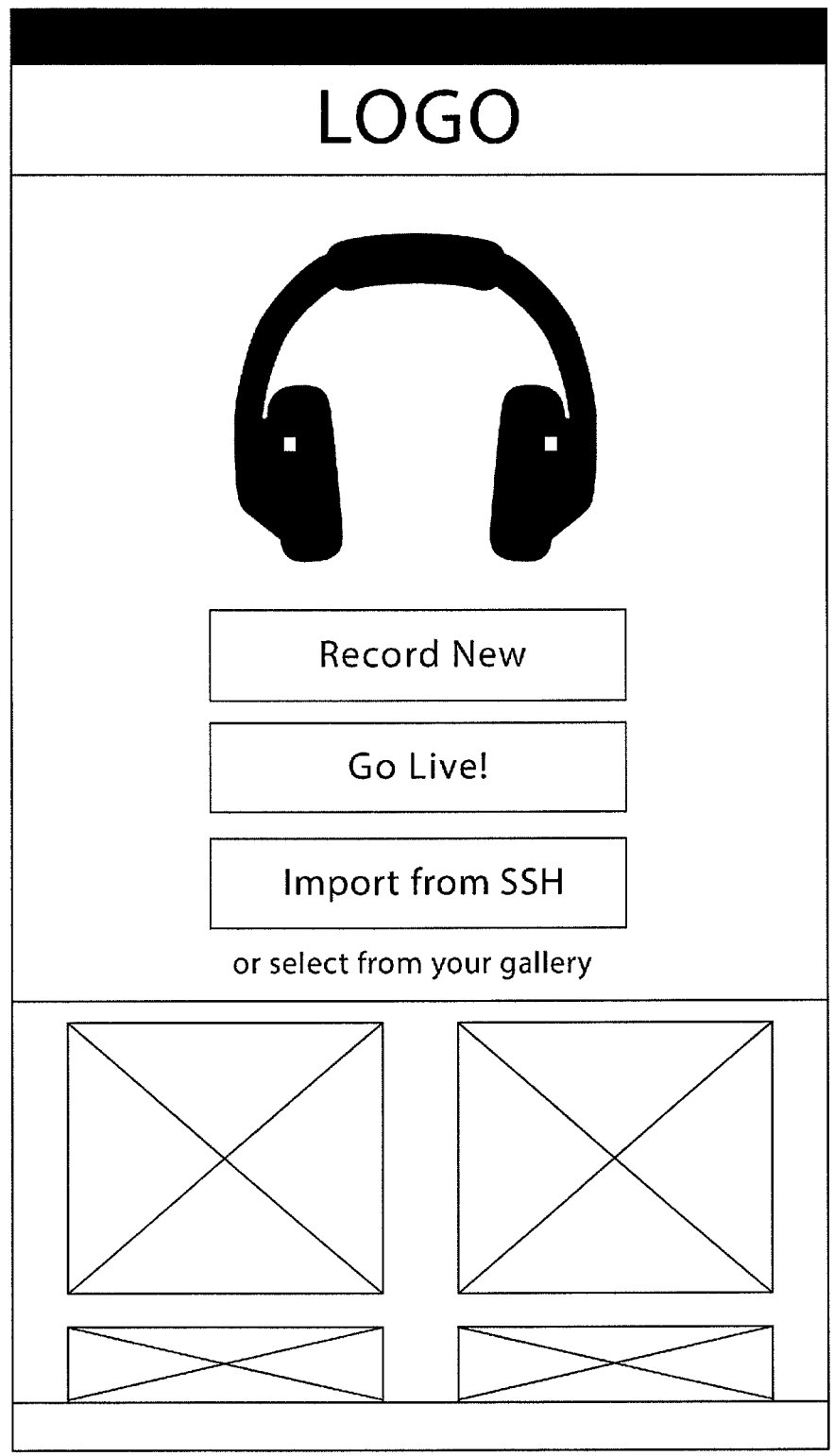
FIG. 32 shows an example of a Create—Video Selection user interface screen.

A user interface may be provided on a screen (e.g. a touch screen) of the mobile device through which a user may control actions of the video headphones when the video headphones are in connection with the mobile device. A connection may be a wired connection. A connection may be a wireless connection. A user interface screen of the mobile device may provide a selectable (e.g. touch screen selectable) option, which when selected by a user initiates a video recording on the video headphones. A user interface screen of the mobile device may provide a selectable (e.g. touch screen selectable) option, which when selected by a user provides live video from the video headphones. A user interface screen of the mobile device may provide a selectable (e.g. touch screen selectable) option, which when selected by a user provides for import of a video file from the video headphones. An example user interface screen is shown in FIG. 32.

Figure 33:
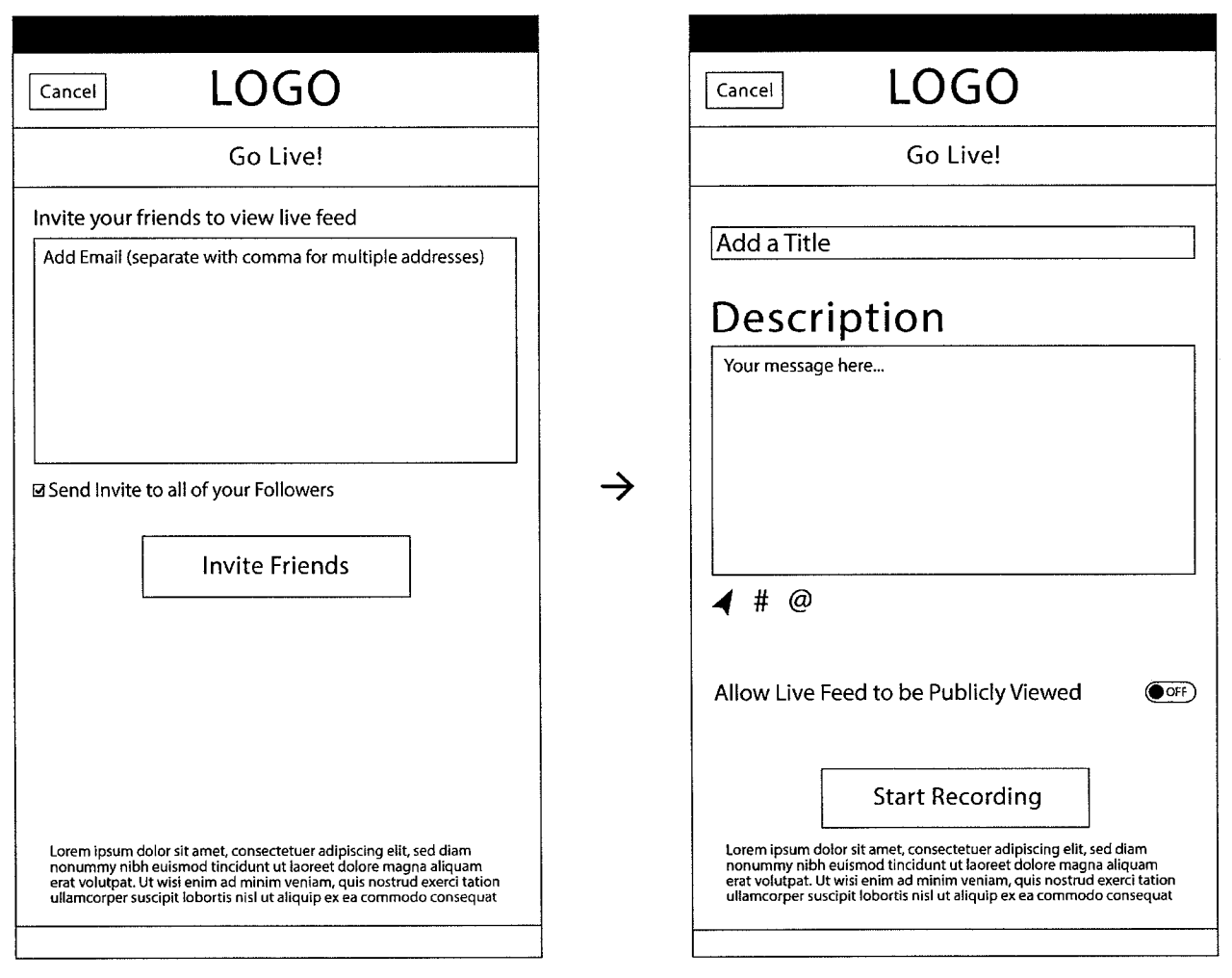

A user interface may be provided on a screen (e.g. a touch screen) of the mobile device through which a user may invite friends to view a live video feed from the video headphones. Email addresses of friends to whom the invitation should be sent may be entered in a window on the screen. A selectable option may be provided for an invite to be sent to all Followers of a user of the mobile device, which is a personal mobile device. A selectable option may be provided for an invite to be sent to all Friends of a user of the mobile device, which is a personal mobile device. The invite may include an inputted title. The invite may include an inputted description. A selectable option may be provided to allow public viewing of a live feed. A selectable option may be provided to start recording of a live feed. An example of related user interface screens is shown in FIG. 33.

Figure 34:
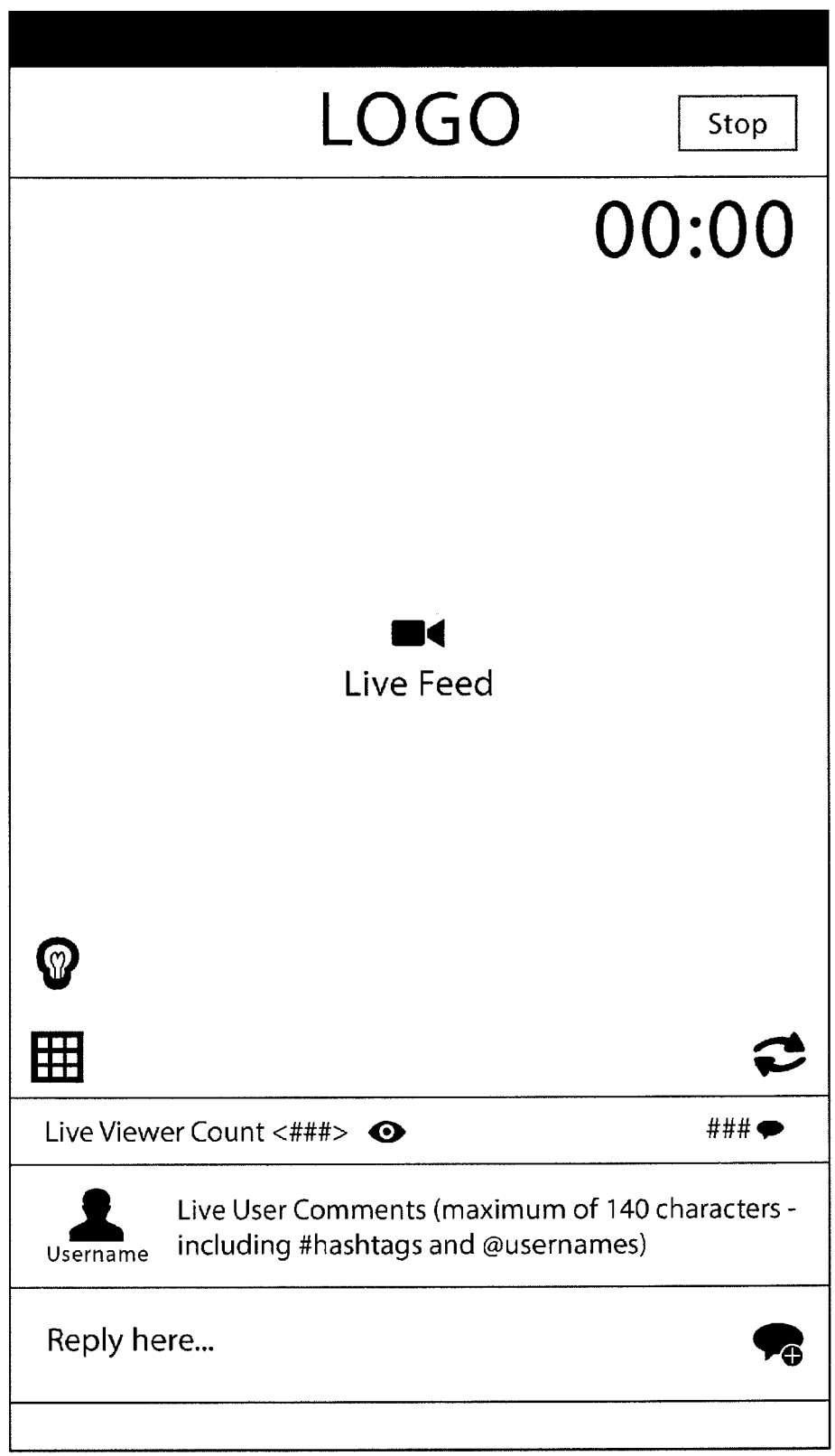
FIG. 34 shows an example of a user interface screen.

A user interface may be provided on a screen (e.g. a touch screen) of the mobile device through which a user may invite friends to view a live video feed from the video headphones. A configured screen may be provided when a live video feed is active. The screen may be configured to indicate the duration so far of the live video feed. The screen may be configured to indicate the number of live viewers of the live video feed. The screen may be configured to provide live user comments relating to the live video feed. The live user comments may include hashtags and usernames. The screen may be configured to provide an area for composing replies to comments received relating to the live video feed. The screen may be configured to provide a selectable option to stop the live video feed. An example user interface screen is shown in FIG. 34.

Figure 38:
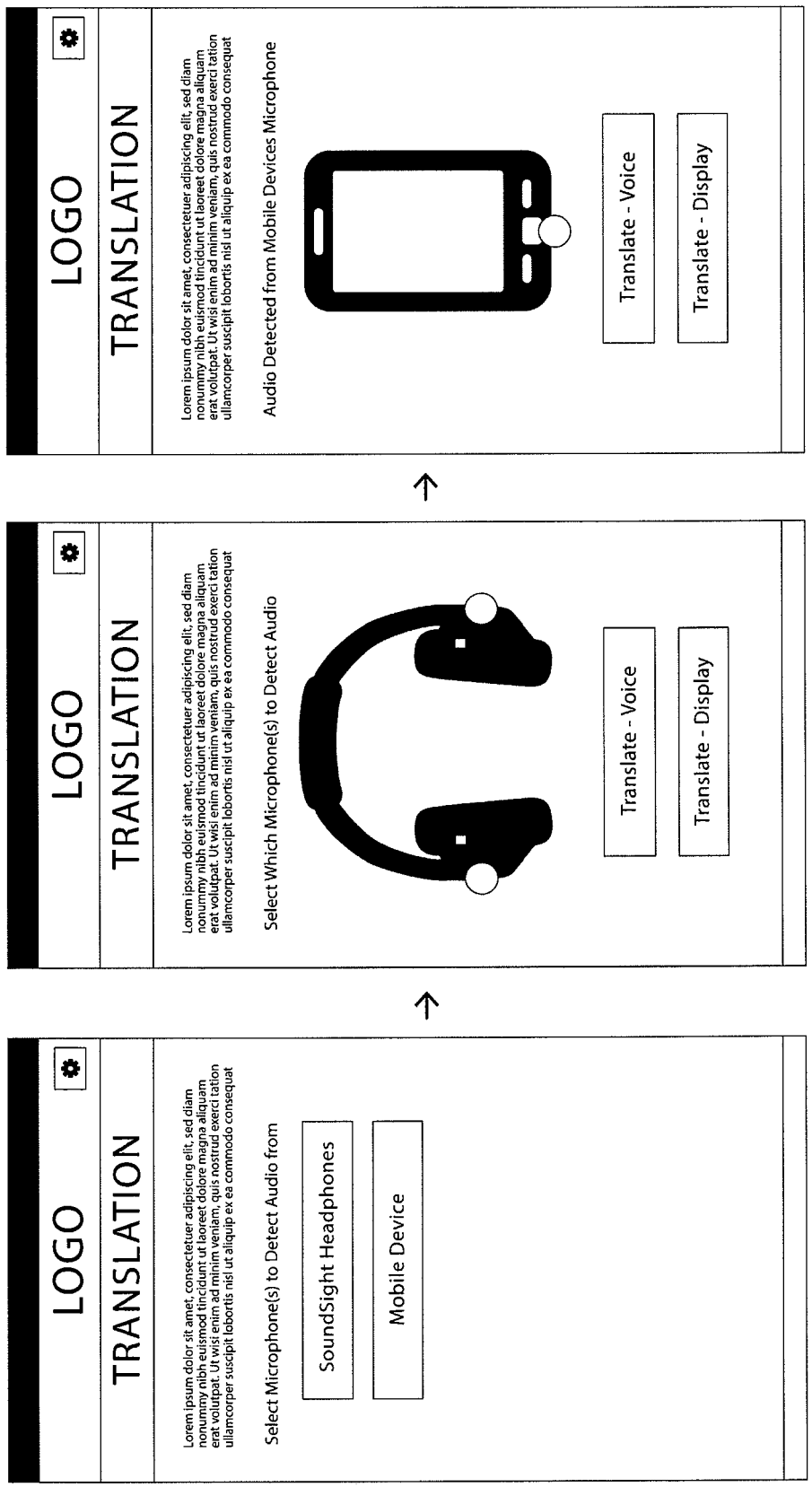
FIG. 38 shows examples of Translation—Microphone Selection user interface screens.

There is provided a system including video headphones connectable to a mobile device (e.g. smartphone). The mobile device may be operable to make an audio data request to the video headphones via the connection, which may be wired or wireless. The video headphones may be configured to respond to the request to provide audio data to the mobile device. A user interface screen on the mobile device may provide for selection of a selectable microphone to detect audio from. A selectable microphone may be on the video headphones. A selectable microphone may be on the mobile device. A user interface screen on the mobile device may provide for selection of which medium to translate. A selectable medium may be audio, for translation. A selectable medium may be video, for example so that writing in the video feed may be translated. A user interface screen on the mobile device may provide that an input medium has been detected, and offer related translation options. For example, a translation option for translating audio may be provided. For example, a translation option for translating video may be provided, for example so that writing in the video feed may be translated. An example of related user interface screens is shown in FIG. 38.

Figure 39:
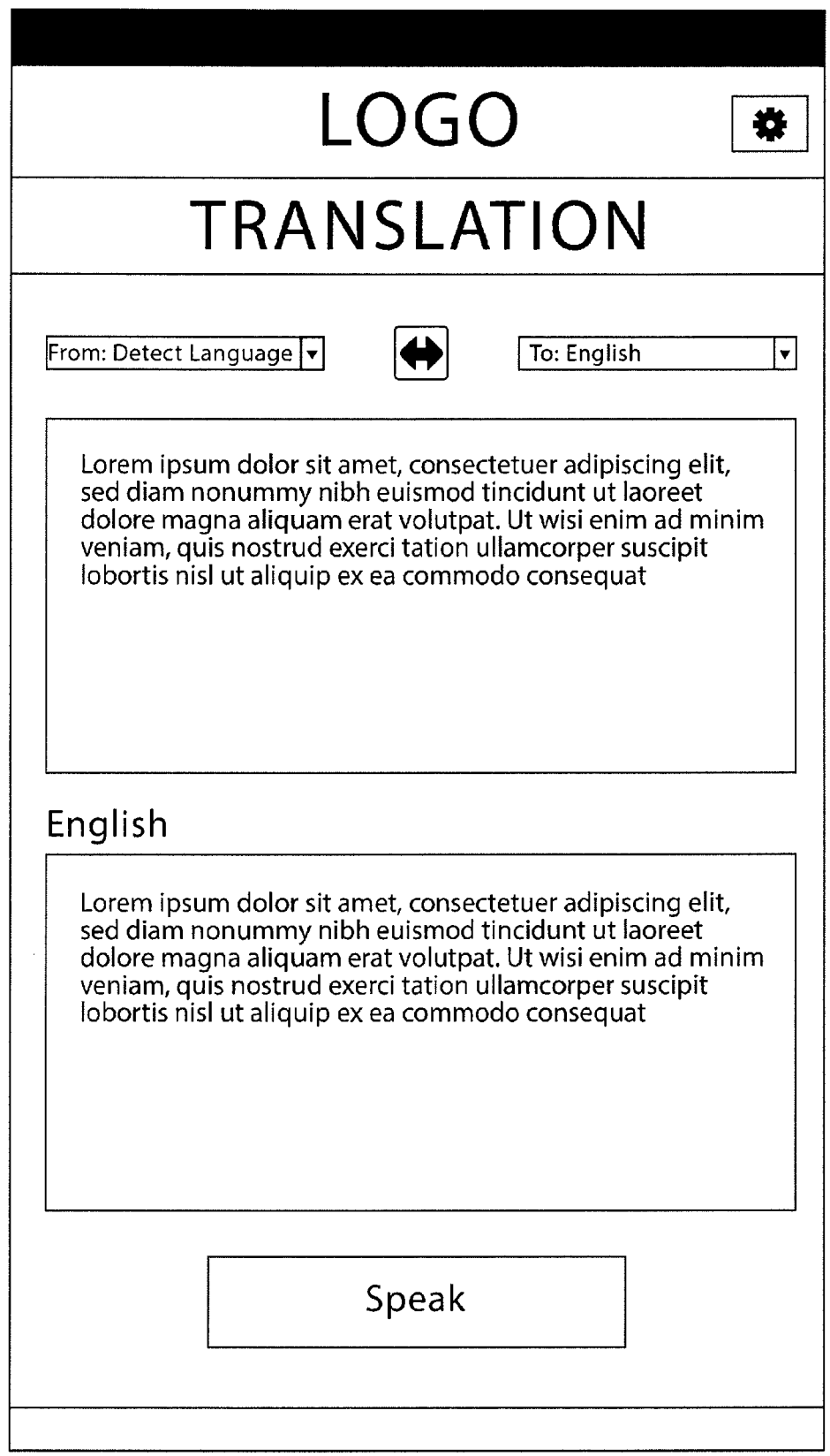
FIG. 39 shows an example of a user interface screen.

There is provided a system including video headphones connectable to a mobile device (e.g. smartphone). The mobile device may be operable to make an audio data request to the video headphones via the connection, which may be wired or wireless. The video headphones may be configured to respond to the request to provide audio data to the mobile device, such as from an audio file, or from audio input obtained from a microphone of the video headphones. A user interface screen on the mobile device may provide for translation of text from a selectable or detected language to a selectable language. The text to be translated may be obtained by speech recognition from an input audio source, or by text recognition from a video image or a video stream. Translated text may be displayed on the screen. The screen may include a selectable option such that translated text is provided as audio output, for example on the mobile device, or on the video headphones. An example user interface screen is shown in FIG. 39.

Figure 40:
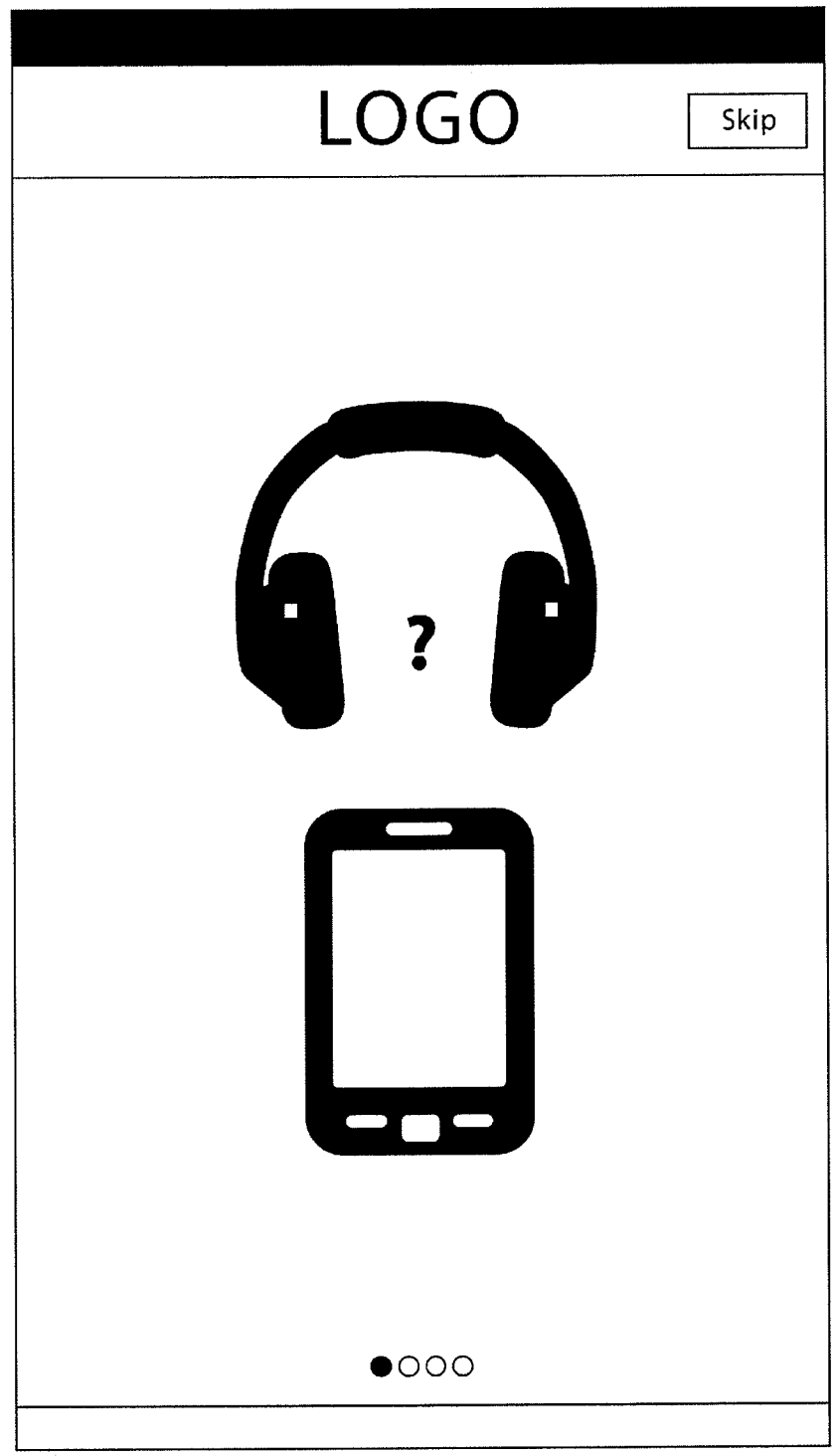
FIG. 40 shows an example of a user interface screen.

There is provided a system including video headphones connectable to a mobile device (e.g. a smartphone). A mobile device screen may indicate when the mobile device is not in connection with video headphones. An example user interface screen is shown in FIG. 40.

Figure 41:
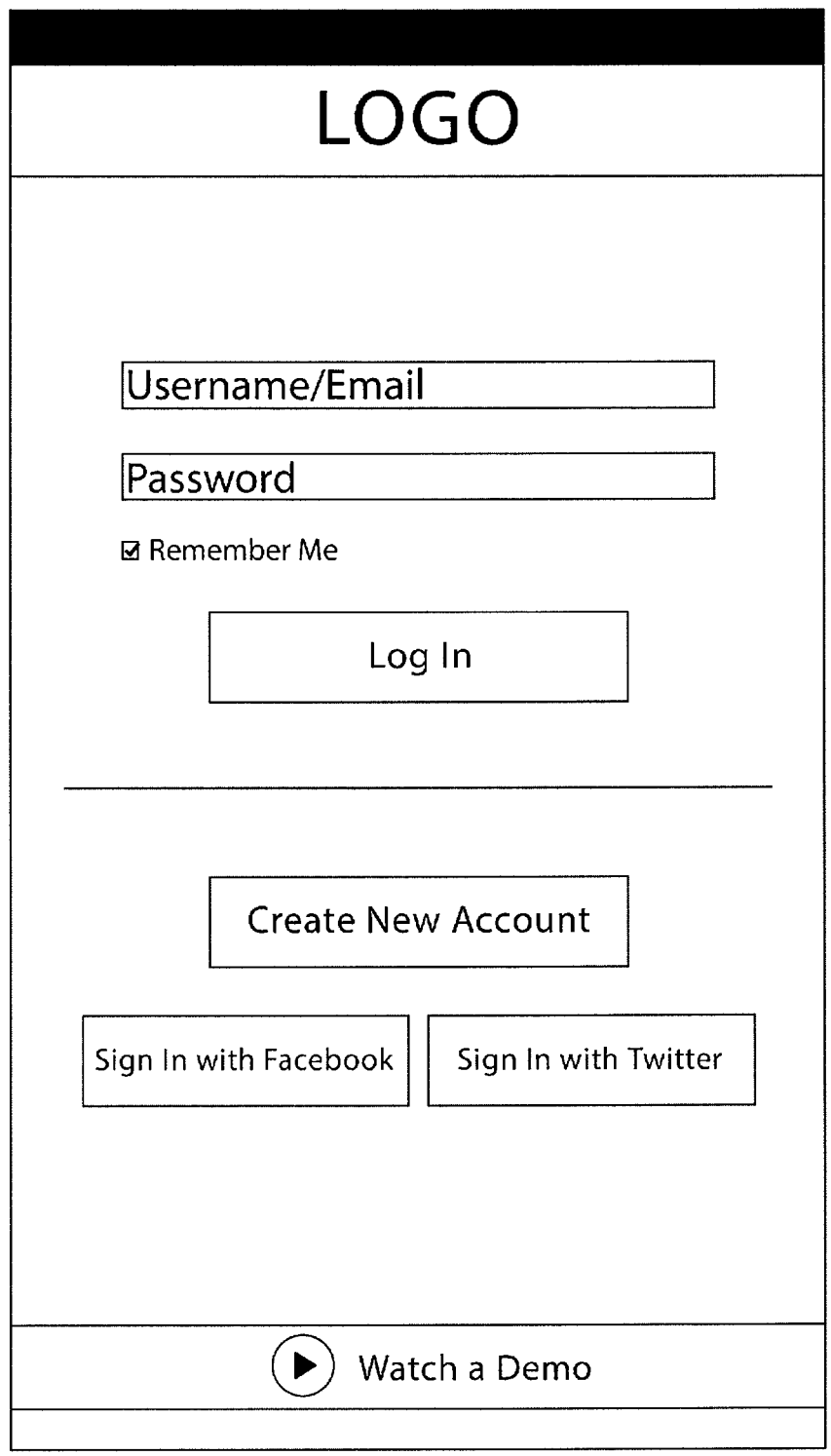
FIG. 41 shows an example of a Sign Up/Log In user interface screen.

There is provided a system including video headphones connectable to a mobile device (e.g. a smartphone), wherein the mobile device is connectable to a server which may be real or virtual. A mobile device screen may be provided for entering a username and password for an account hosted on the server, wherein the account provides for storing on the server media recorded on the video headphones and transmitted via the mobile device to the server. A user interface screen on the mobile device may provide for user input of a username or email address which functions as a username, and a password, for use with the account. A Remember Me selectable option may be provided. A login selectable icon may be provided. A Create New Account selectable icon may be provided. A selectable icon for signing in with Facebook may be provided. A selectable icon for signing in with Twitter may be provided. A selectable icon for watching a Demo may be provided. An example user interface screen is shown in FIG. 41.

Figure 42:
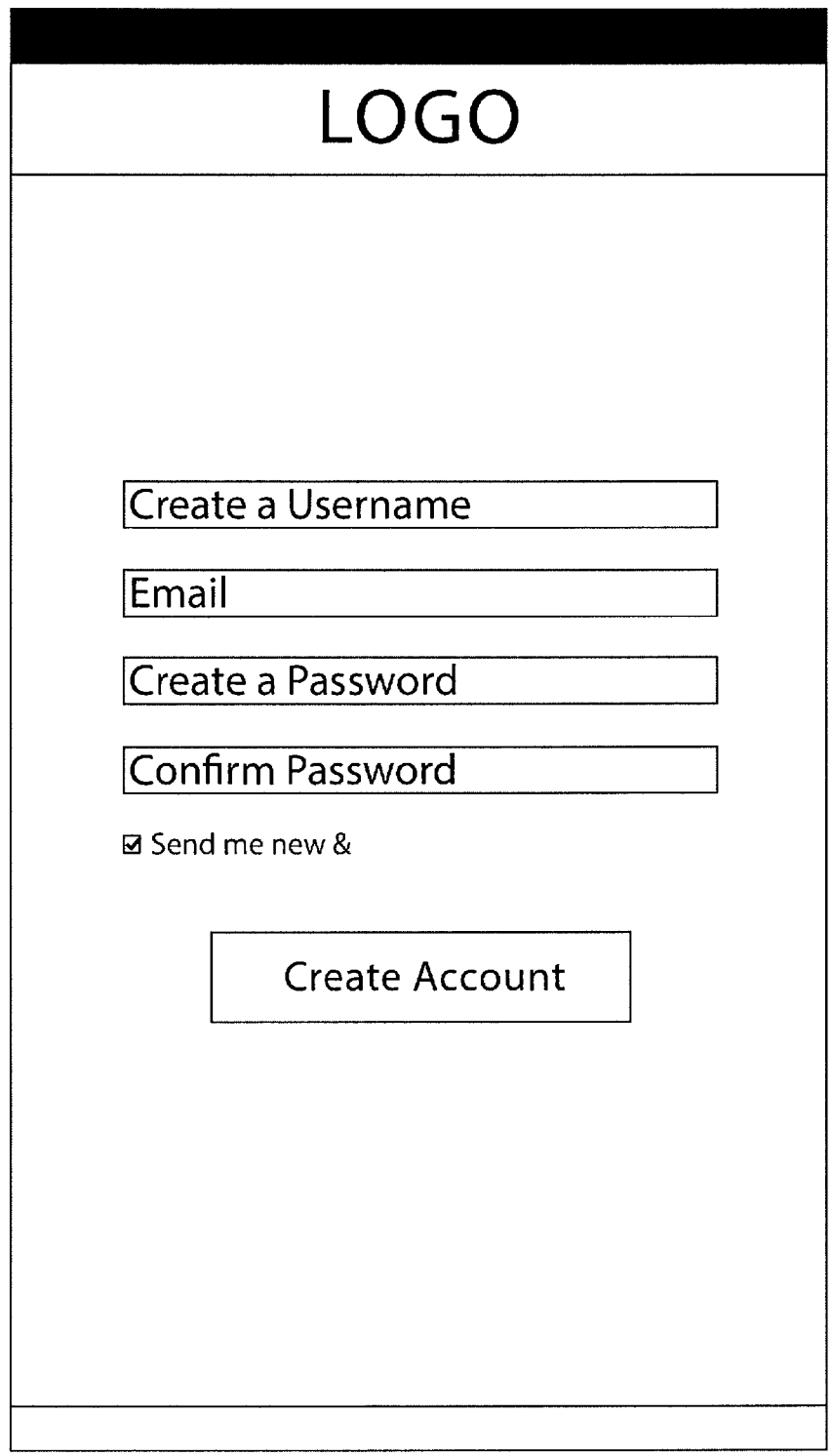
FIG. 42 shows an example of a Create New Account user interface screen.

There is provided a system including video headphones connectable to a mobile device (e.g. a smartphone), wherein the mobile device is connectable to a server which may be real or virtual. A mobile device screen may be provided for entering a username and password for creating a new account hosted on the server, wherein the account provides for storing on the server media recorded on the video headphones and transmitted via the mobile device to the server. A user interface screen on the mobile device may provide for user input of a username, an email address, and a password for use with the account. A selectable icon may be provided for the user to confirm the username, email address and password are as desired by the user e.g. a "Create Account" icon. A selectable option may be provided for the user email address to receive notifications from the server. An example user interface screen is shown in FIG. 42.

Figure 43:
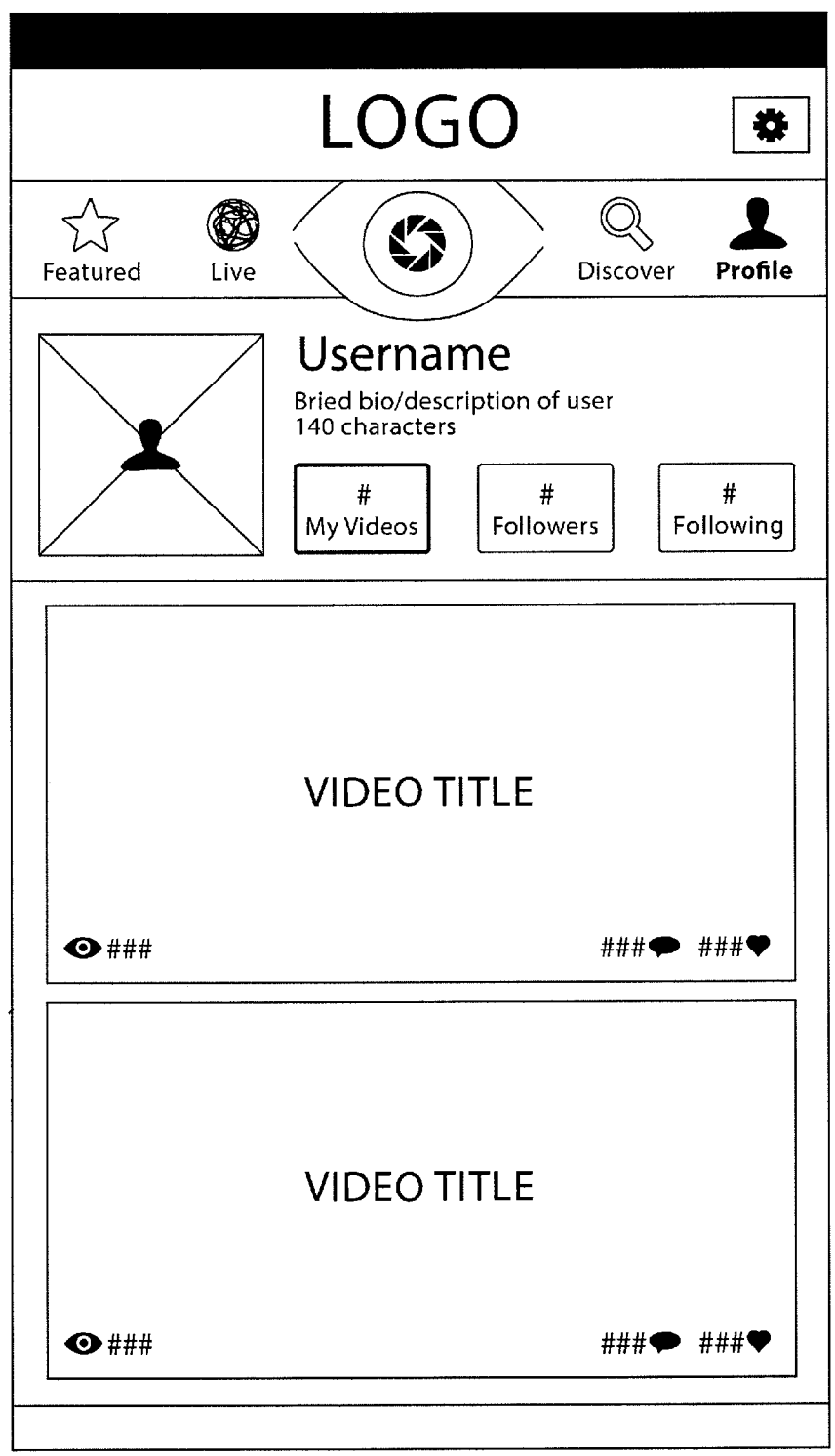
FIG. 43 shows an example of a Profile—My Videos user interface screen.

There is provided a system including video headphones connectable to a mobile device (e.g. a smartphone), wherein the mobile device is connectable to a server which may be real or virtual. A mobile device screen may be provided for managing videos associated with a user account on the server. The mobile device screen may indicate the user's username. A brief bio/description of the user may be displayed, e.g. one limited to 140 characters. The mobile device screen may indicate the number of videos associated with the account. The mobile device screen may indicate the number of accounts being followed by the user account. The mobile device screen may display a screenshot and title associated with a single video of the user account, which is selectable for playback on the mobile device. The mobile device screen may display a screenshot and title associated with each of a plurality of videos of the user account, which are selectable for playback on the mobile device. The screen may provide a selectable icon for displaying a list of featured videos. The screen may provide a selectable icon for providing a live video feed. The screen may provide a selectable icon for discovering new videos. The screen may provide a selectable icon for displaying a detailed profile of a user. A selectable settings icon may be provided. An example user interface screen is shown in FIG. 43.

Figure 44:
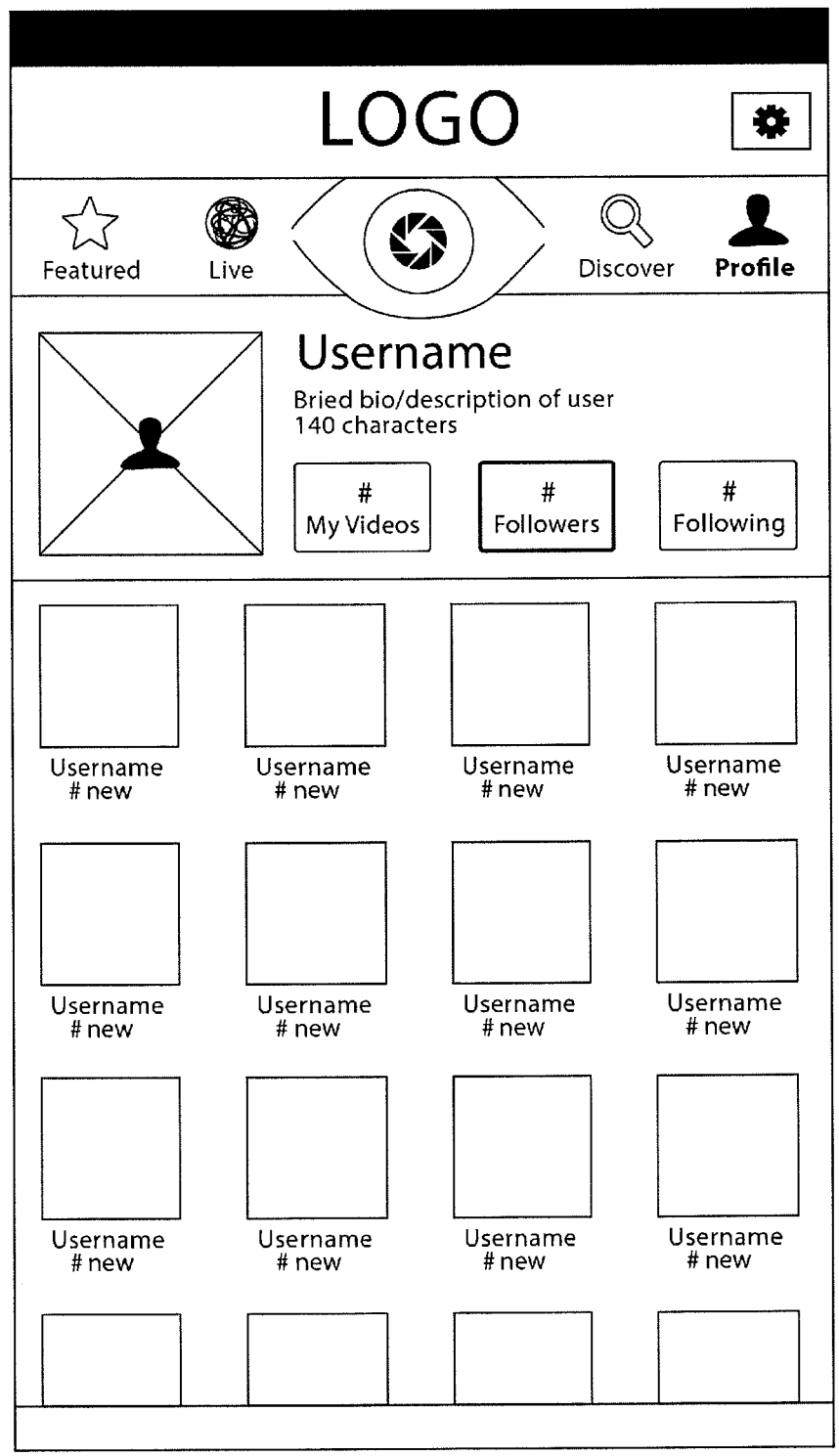
FIG. 44 shows an example of a Profile—Followers user interface screen.

There is provided a system including video headphones connectable to a mobile device (e.g. a smartphone), wherein the mobile device is connectable to a server which may be real or virtual. A mobile device screen may be provided for viewing Followers associated with a user account on the server. The mobile device screen may indicate the user's username. A brief bio/description of the user may be displayed, e.g. one limited to 140 characters. The mobile device screen may indicate the number of videos associated with the account. The mobile device screen may indicate the number of accounts being followed by the user account. The mobile device screen may provide a plurality of usernames and their associated icons for Followers of the user account. The screen may provide a selectable icon for displaying a list of featured videos. The screen may provide a selectable icon for providing a live video feed. The screen may provide a selectable icon for discovering new videos. The screen may provide a selectable icon for displaying a detailed profile of a user. A selectable settings icon may be provided. An example user interface screen is shown in FIG. 44.

Figure 45:
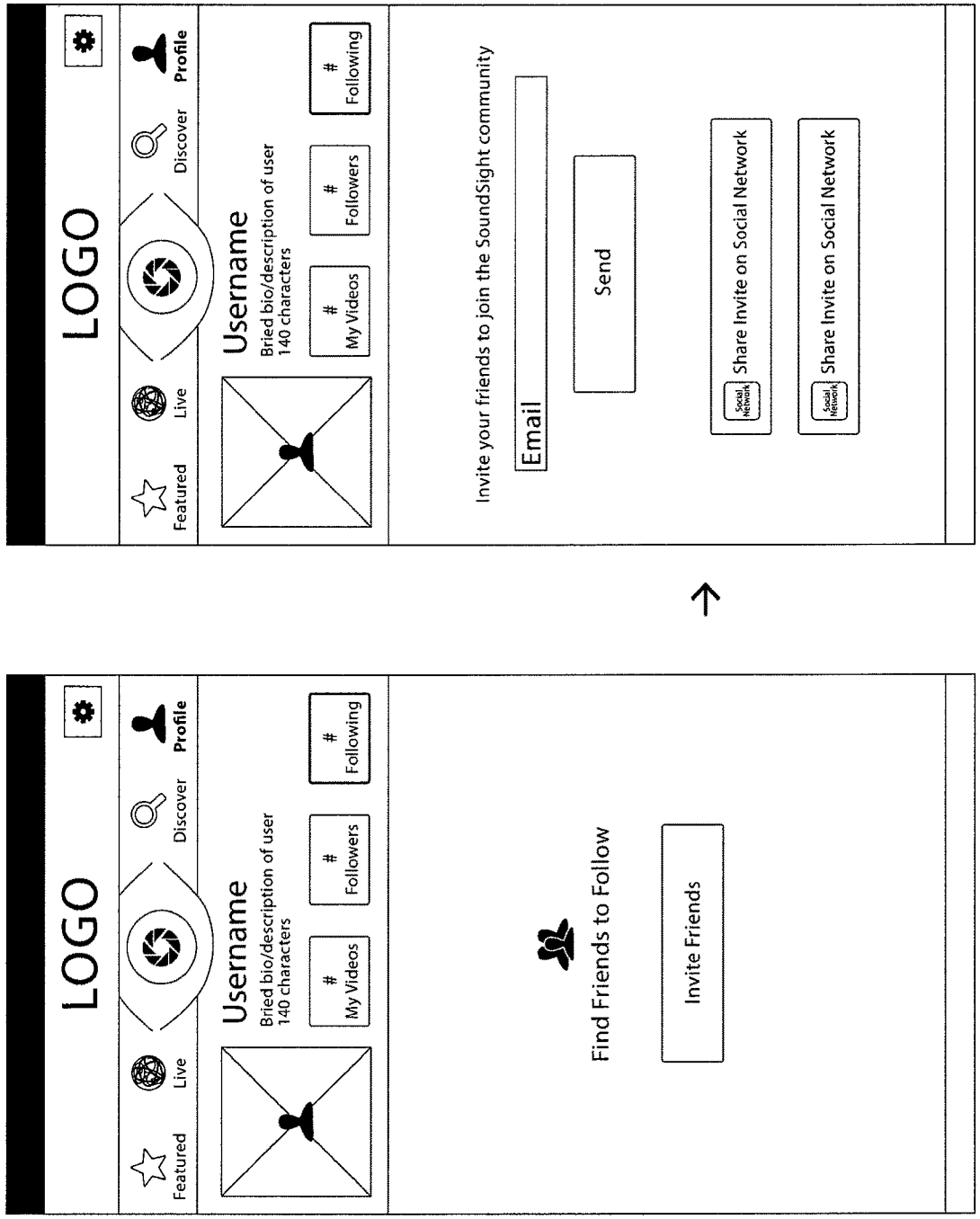
FIG. 45 shows examples of Profile—Following user interface screens.

There is provided a system including video headphones connectable to a mobile device (e.g. a smartphone), wherein the mobile device is connectable to a server which may be real or virtual. A mobile device screen may be provided for viewing potential Friends to be associated with a user account on the server. The mobile device screen may indicate the user's username. A brief bio/description of the user may be displayed, e.g. one limited to 140 characters. The mobile device screen may indicate the number of videos associated with the account. The mobile device screen may indicate the number of accounts being followed by the user account. The screen may provide a selectable icon for displaying a list of featured videos. The screen may provide a selectable icon for providing a live video feed. The screen may provide a selectable icon for discovering new videos. The screen may provide a selectable icon for displaying a detailed profile of a user. A selectable settings icon may be provided. The mobile device screen may provide a selectable icon to Invite Friends to be associated with the user account. Upon selection of an icon to Invite Friends, an input screen may be provided to specify an email address to which to send an invitation to join a community of users who are "friends" of the account. A send invitation selectable icon may be provided on the email input screen. A selectable icon may be provided to share the invite on a social network. A selectable icon may be provided to share the invite on a predefined social network. Examples of related user interface screens are shown in FIG. 45.

Figure 46:
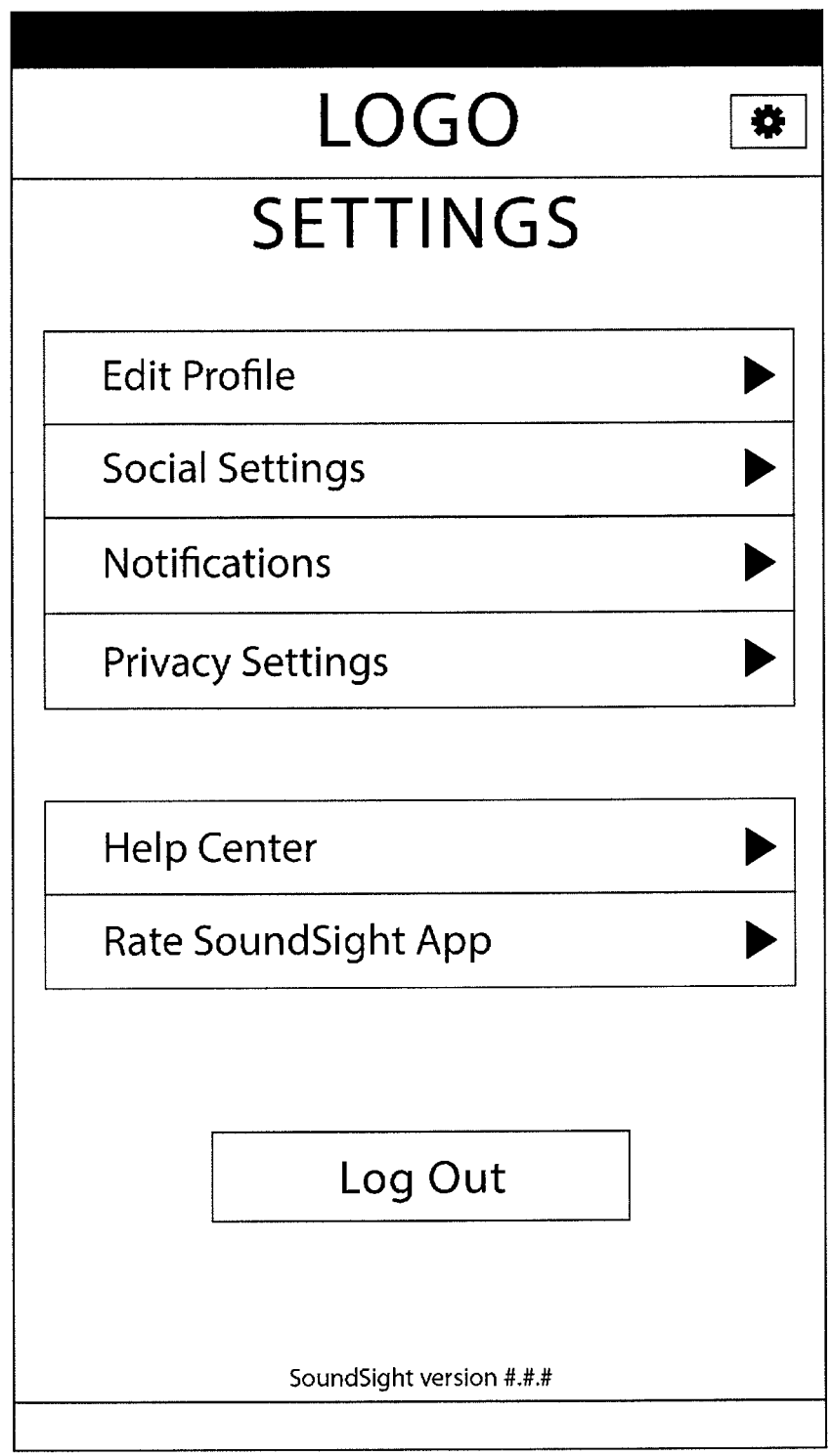
FIG. 46 shows an example of a Profile—Settings user interface screen.

There is provided a system including video headphones connectable to a mobile device (e.g. a smartphone), wherein the mobile device is connectable to a server which may be real or virtual. A mobile device screen may be provided for selecting settings associated with a user account on the server. A selectable setting may be to edit a user profile. A selectable setting may be to select social settings. A selectable setting may be to select notifications. A selectable setting may be to select privacy settings. A selectable setting may be to select settings relating to a Help Center. A selectable setting may be to provide a rating for an application running on the mobile device which provides the user interface screen and associated functionality. A Log Out button may be provided. An example user interface screen is shown in FIG. 46.

Figure 47:
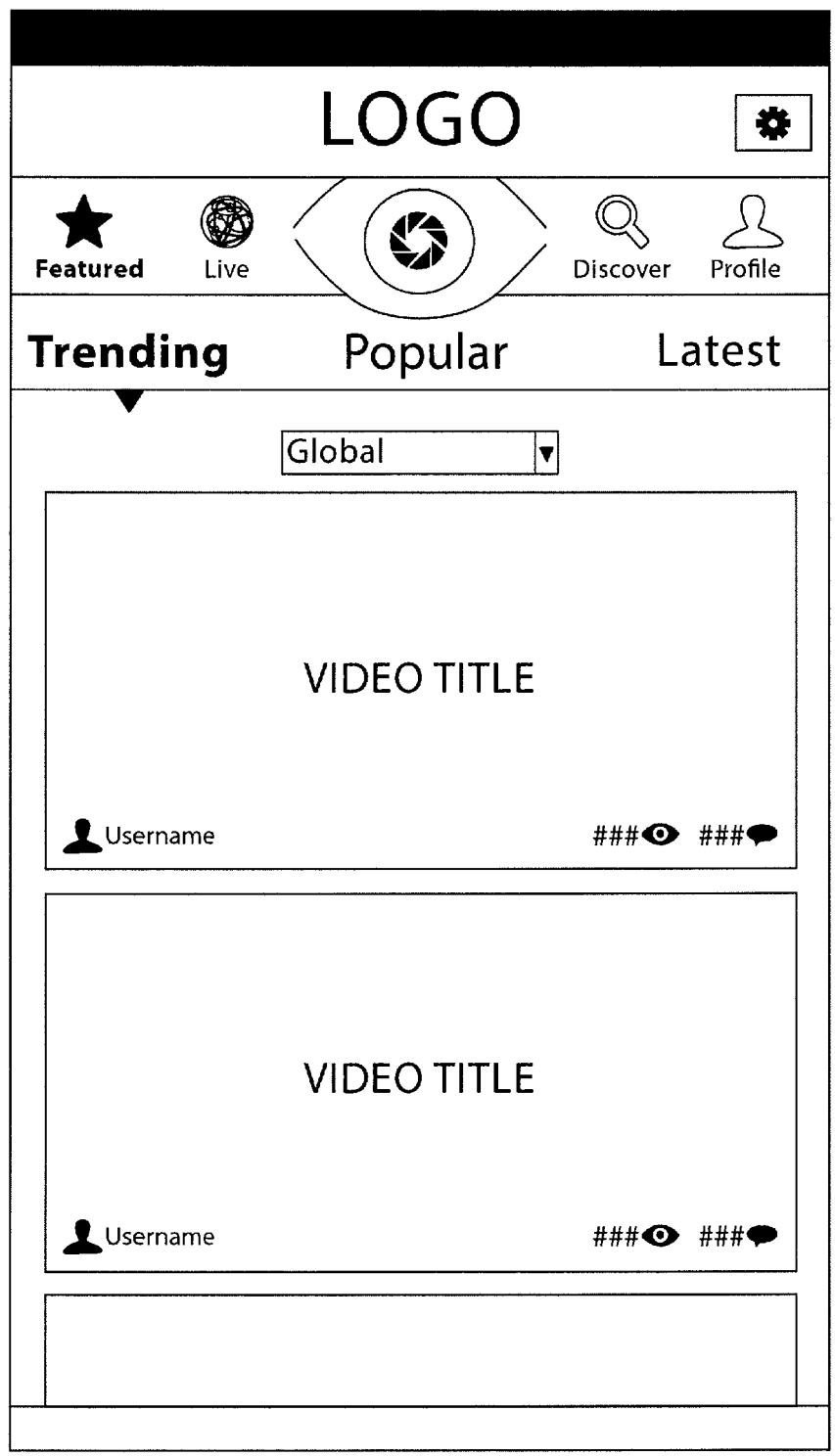
FIG. 47 shows an example of a Feed—Trending user interface screen.

There is provided a system including video headphones connectable to a mobile device (e.g. a smartphone), wherein the mobile device is connectable to a server which may be real or virtual. A mobile device screen may be provided for viewing trending of videos on the server. The mobile device screen may display a screenshot, username and title associated with each of a plurality of videos which are trending on the server, which are selectable for playback on the mobile device. The trending may be filterable using a selectable option on the screen. For example, trending videos may be filterable by geographic region, by age group (e.g. child, teen, adult), or by selectable category. The screen may provide a selectable icon for displaying a list of featured videos. The screen may provide a selectable icon for providing a live video feed. The screen may provide a selectable icon for discovering new videos. The screen may provide a selectable icon for displaying a detailed profile of a user. A selectable settings icon may be provided. An example user interface screen is shown in FIG. 47.

Figure 48:
FIG. 48 shows an example of a Feed—Popular user interface screen.

There is provided a system including video headphones connectable to a mobile device (e.g. a smartphone), wherein the mobile device is connectable to a server which may be real or virtual. A mobile device screen may be provided for viewing popular videos on the server. The mobile device screen may display a screenshot, username and title associated with each of a plurality of videos on the server which are popular, which are selectable for playback on the mobile device. The popular videos may be filterable using a selectable option on the screen. For example, popular videos may be filterable by geographic region, by age group (e.g. child, teen, adult), or by selectable category. The screen may provide a selectable icon for displaying a list of featured videos. The screen may provide a selectable icon for providing a live video feed. The screen may provide a selectable icon for discovering new videos. The screen may provide a selectable icon for displaying a detailed profile of a user. A selectable settings icon may be provided. An example user interface screen is shown in FIG. 48.

Figure 49:
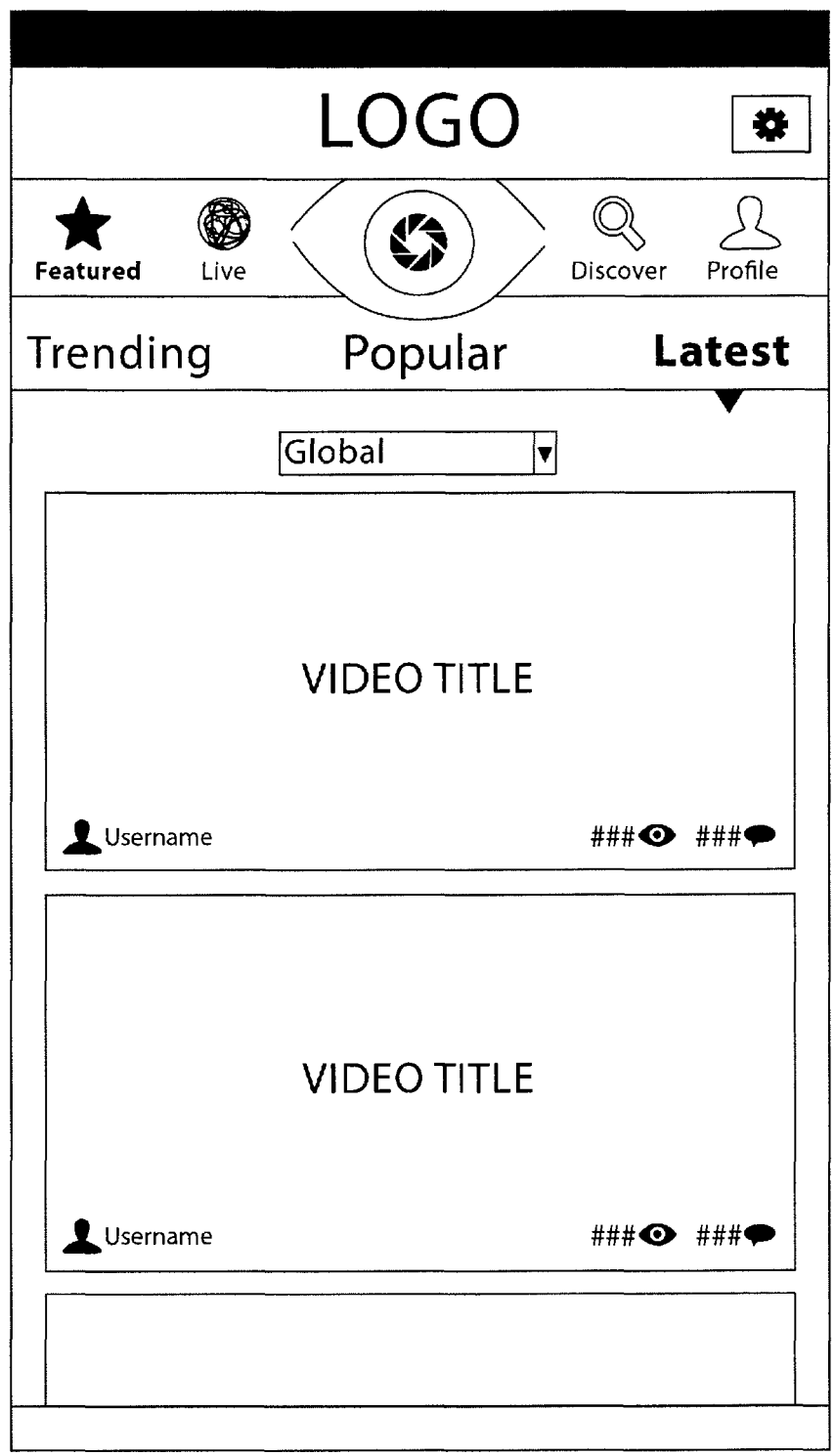
FIG. 49 shows an example of a Feed—Latest user interface screen.

There is provided a system including video headphones connectable to a mobile device (e.g. a smartphone), wherein the mobile device is connectable to a server which may be real or virtual. A mobile device screen may be provided for viewing the latest videos on the server. The mobile device screen may display a screenshot, username and title associated with each of a plurality of videos of which are the latest videos on the server, which are selectable for playback on the mobile device. The latest videos may be filterable using a selectable option on the screen. For example, the latest videos may be filterable by geographic region, by age group (e.g. child, teen, adult), or by selectable category. The screen may provide a selectable icon for displaying a list of featured videos. The screen may provide a selectable icon for providing a live video feed. The screen may provide a selectable icon for discovering new videos. The screen may provide a selectable icon for displaying a detailed profile of a user. A selectable settings icon may be provided. An example user interface screen is shown in FIG. 49.

Figure 50:
FIG. 50 shows an example of a Feed—Video Detail Page user interface screen.

There is provided a system including video headphones connectable to a mobile device (e.g. a smartphone), wherein the mobile device is connectable to a server which may be real or virtual. A mobile device screen may be provided for viewing featured videos stored on the server. The mobile device screen may display a screenshot, username and title associated with a featured video on the server, which is selectable for playback on the mobile device. The mobile device screen may display a description associated with a featured video on the server. The mobile device screen may display a selectable option for input of comments relating to the featured video. The mobile device screen may display a selectable option for indicating a strong liking of the featured video. The mobile device screen may display a selectable option for viewing or joining a community of users associated with the featured video. One or more user reviews of the featured video may be displayed on the screen. The screen may provide a selectable icon for displaying a list of featured videos. The screen may provide a selectable icon for providing a live video feed. The screen may provide a selectable icon for discovering new videos. The screen may provide a selectable icon for displaying a detailed profile of a user. A selectable settings icon may be provided. An example user interface screen is shown in FIG. 50.

Figure 51:
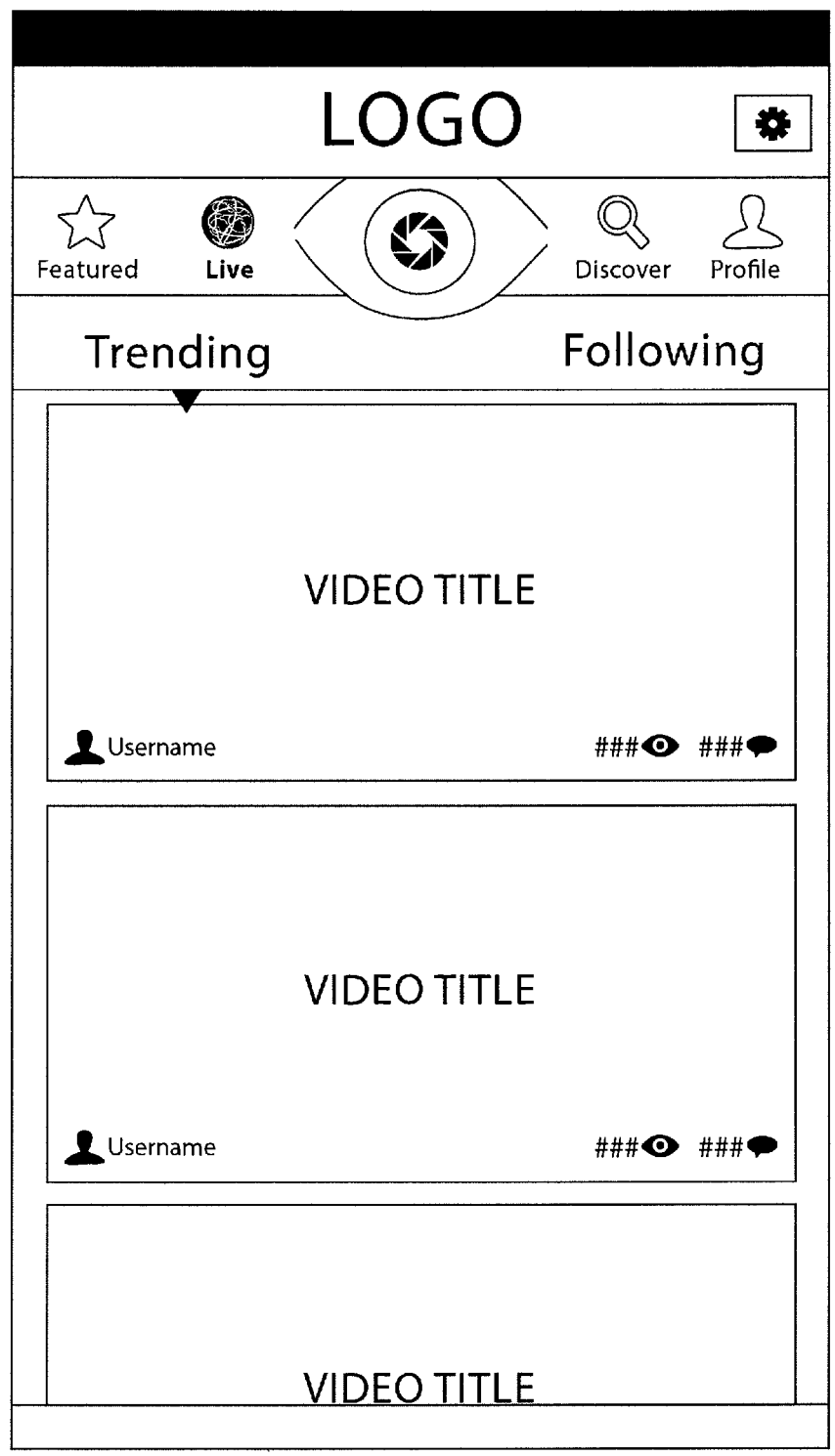
FIG. 51 shows an example of a Live—Trending user interface screen.

There is provided a system including video headphones connectable to a mobile device (e.g. a smartphone), wherein the mobile device is connectable to a server which may be real or virtual. A mobile device screen may be provided for viewing trending of live videos stored on the server. The mobile device screen may display a screenshot, username and title associated with each of a plurality of videos which are live and trending on the server, which are selectable for viewing on the mobile device. The trending may be filterable using a selectable option on the screen. For example, trending videos may be filterable by geographic region, by age group (e.g. child, teen, adult), or by selectable category. The screen may provide a selectable icon for displaying a list of featured videos. The screen may provide a selectable icon for providing a live video feed. The screen may provide a selectable icon for discovering new videos. The screen may provide a selectable icon for displaying a detailed profile of a user. A selectable settings icon may be provided. An example user interface screen is shown in FIG. 51.

Figure 52:
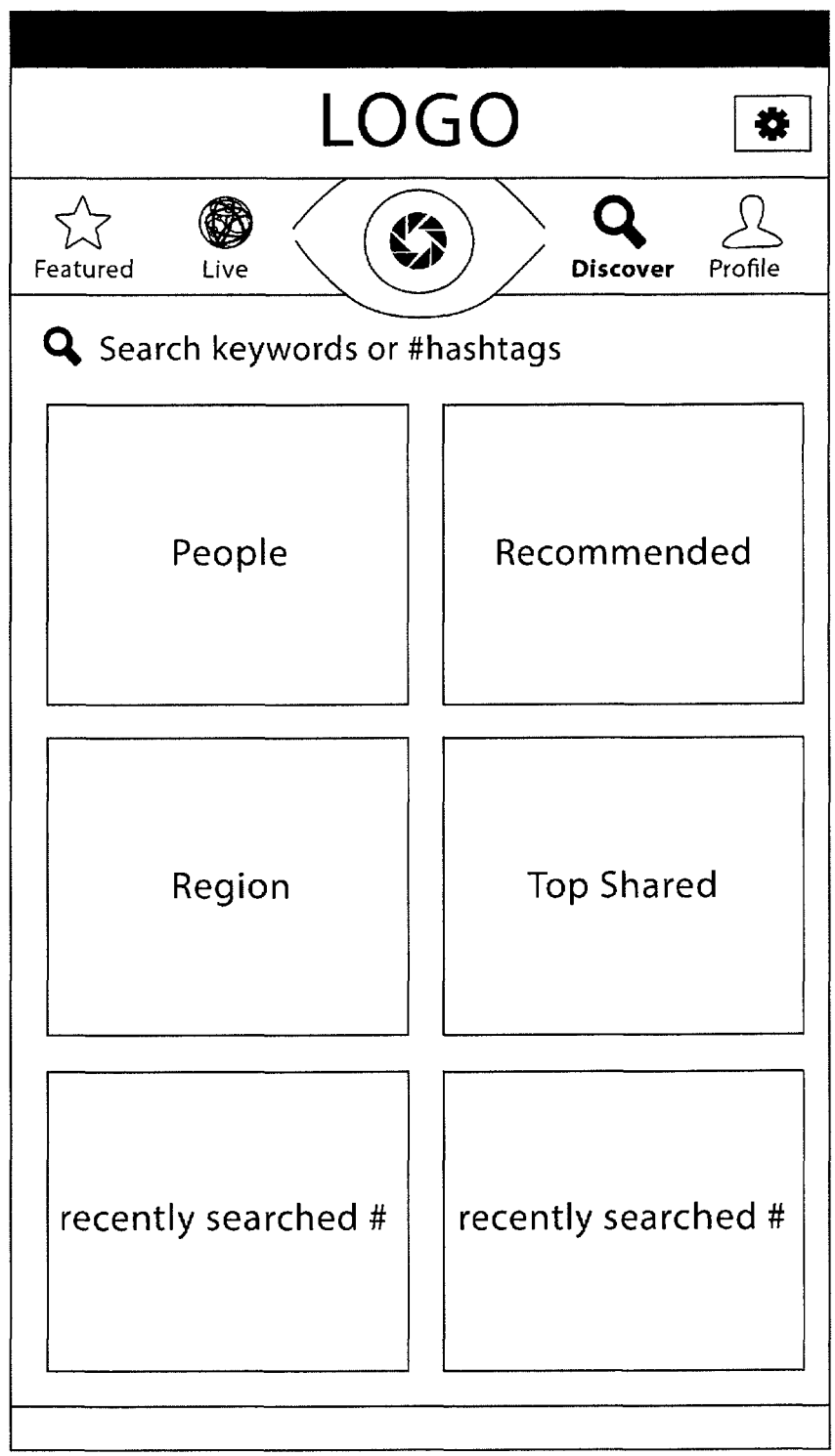
FIG. 52 shows an example of an Explore user interface screen.

There is provided a system including video headphones connectable to a mobile device (e.g. a smartphone), wherein the mobile device is connectable to a server which may be real or virtual. A mobile device screen may be provided for discovering videos stored on the server. The mobile device screen may display selectable options for discovering videos on the server, such as for categories such as People, Recommended, Region, Top Shared, or for recently searched hashtags. The screen may provide a selectable icon for displaying a list of featured videos. The screen may provide a selectable icon for providing a live video feed. The screen may provide a selectable icon for discovering new videos. The screen may provide a selectable icon for displaying a detailed profile of a user. A selectable settings icon may be provided. An example user interface screen is shown in FIG. 52.

Figure 53:
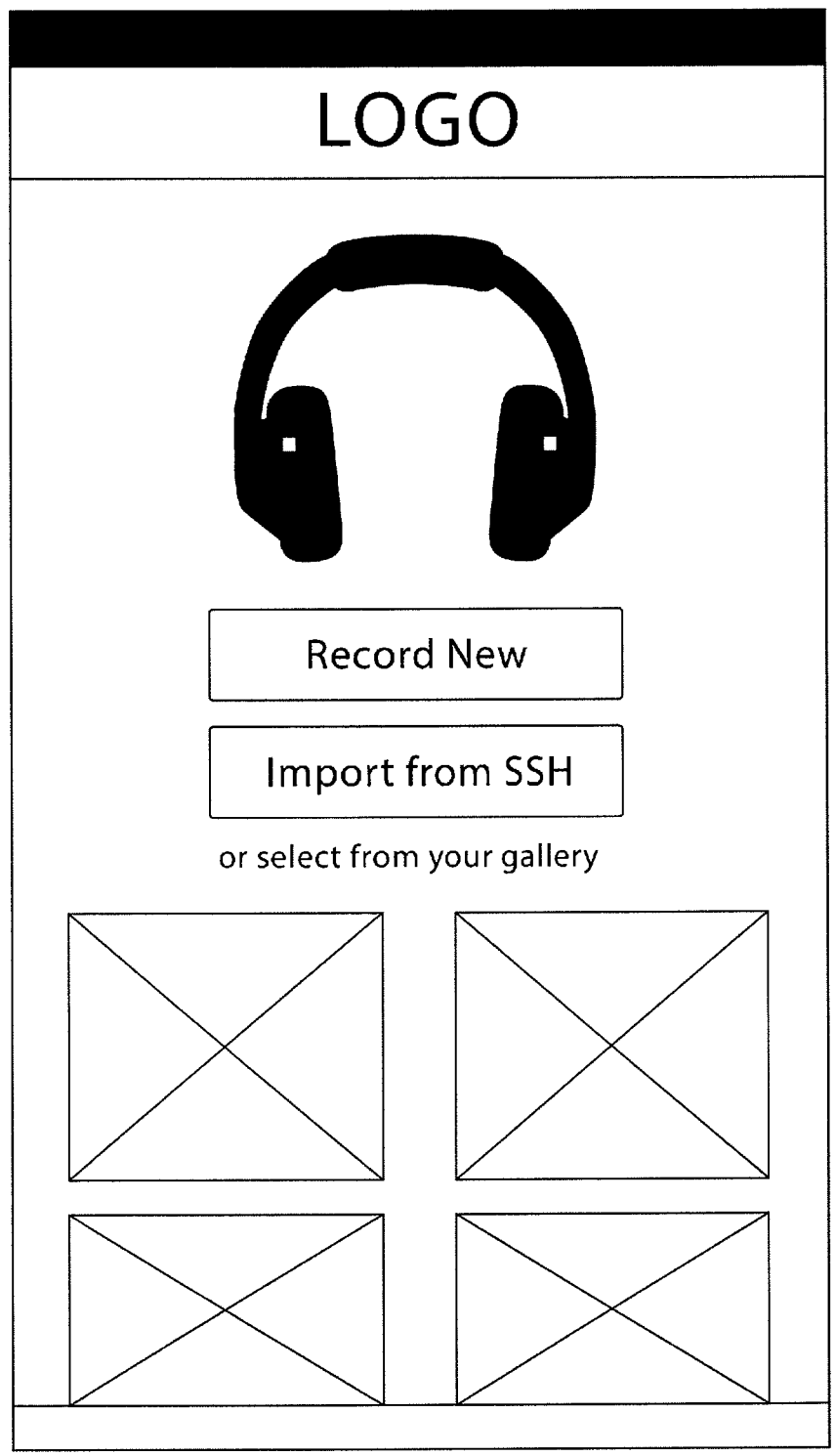
FIG. 53 shows an example of a Create—Video Selection user interface screen.

A user interface may be provided on a screen (e.g. a touch screen) of the mobile device (e.g. a smartphone) through which a user may control actions of the video headphones when the video headphones are in connection with the mobile device. A connection may be a wired connection. A connection may be a wireless connection. A user interface screen of the mobile device may provide a selectable (e.g. touch screen selectable) option, which when selected by a user initiates a video recording on the video headphones. A user interface screen of the mobile device may provide a selectable (e.g. touch screen selectable) option, which when selected by a user provides for import of a video file from the video headphones. A user interface screen of the mobile device may provide a selectable (e.g. touch screen selectable) option, which when selected by a user provides playback of a video from a gallery of videos stored on the mobile device. An example user interface screen is shown in FIG. 53.

Figure 54:
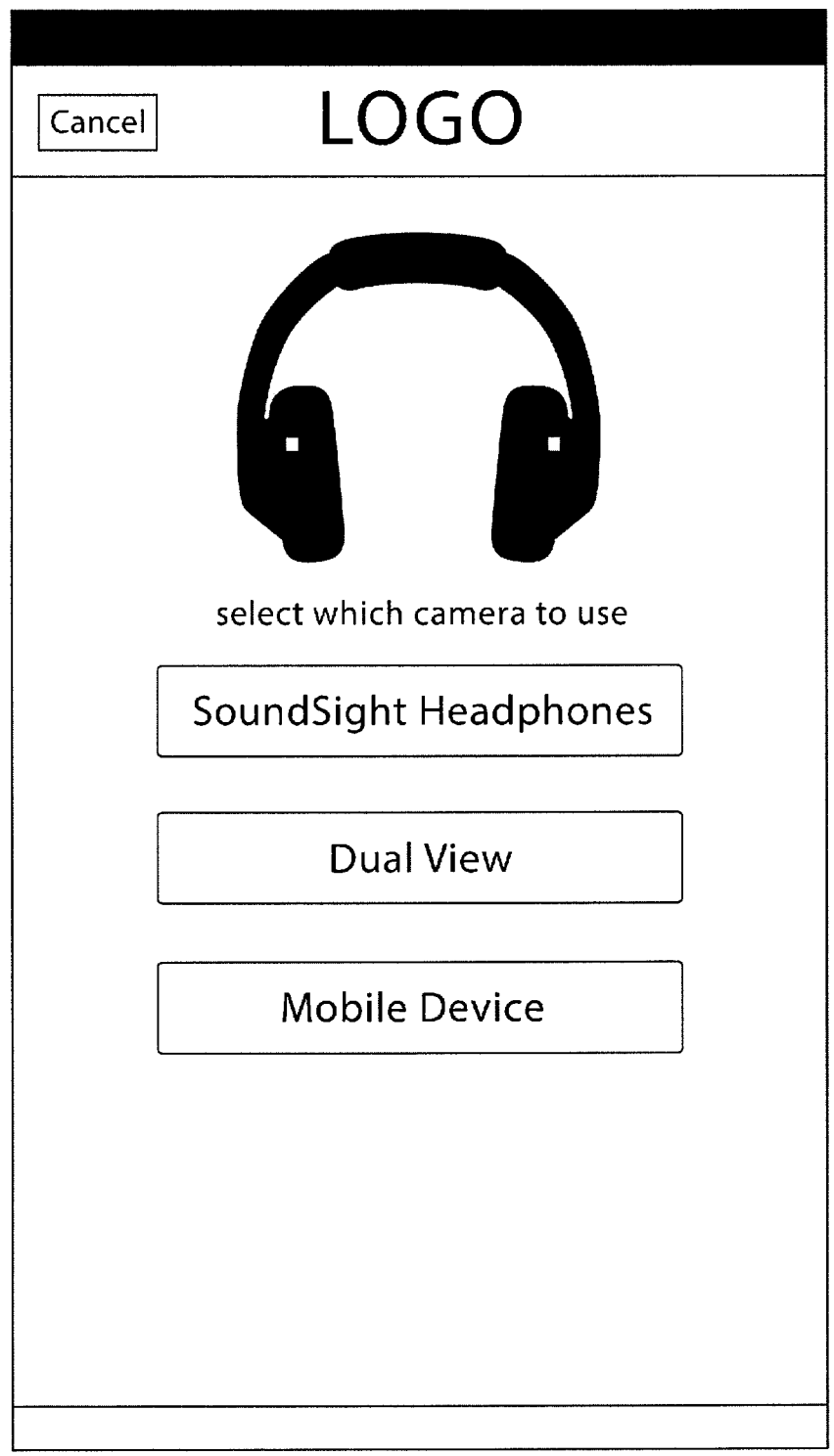
FIG. 54 shows an example of a Create—Camera Selection user interface screen.

A user interface may be provided on a screen (e.g. a touch screen) of the mobile device (e.g. a smartphone) through which a user may control actions of the video headphones when the video headphones are in connection with the mobile device. A connection may be a wired connection. A connection may be a wireless connection. A user interface screen of the mobile device may provide a selectable (e.g. touch screen selectable) option, which when selected by a user selects a camera or cameras to be used for a video recording. A selectable option may be to use a particular camera of the video headphones for video recording. A selectable option may be to use two cameras of the video headphones for video recording. A selectable option may be to use a camera of the mobile device for video recording. An example user interface screen is shown in FIG. 54.

Figure 55:
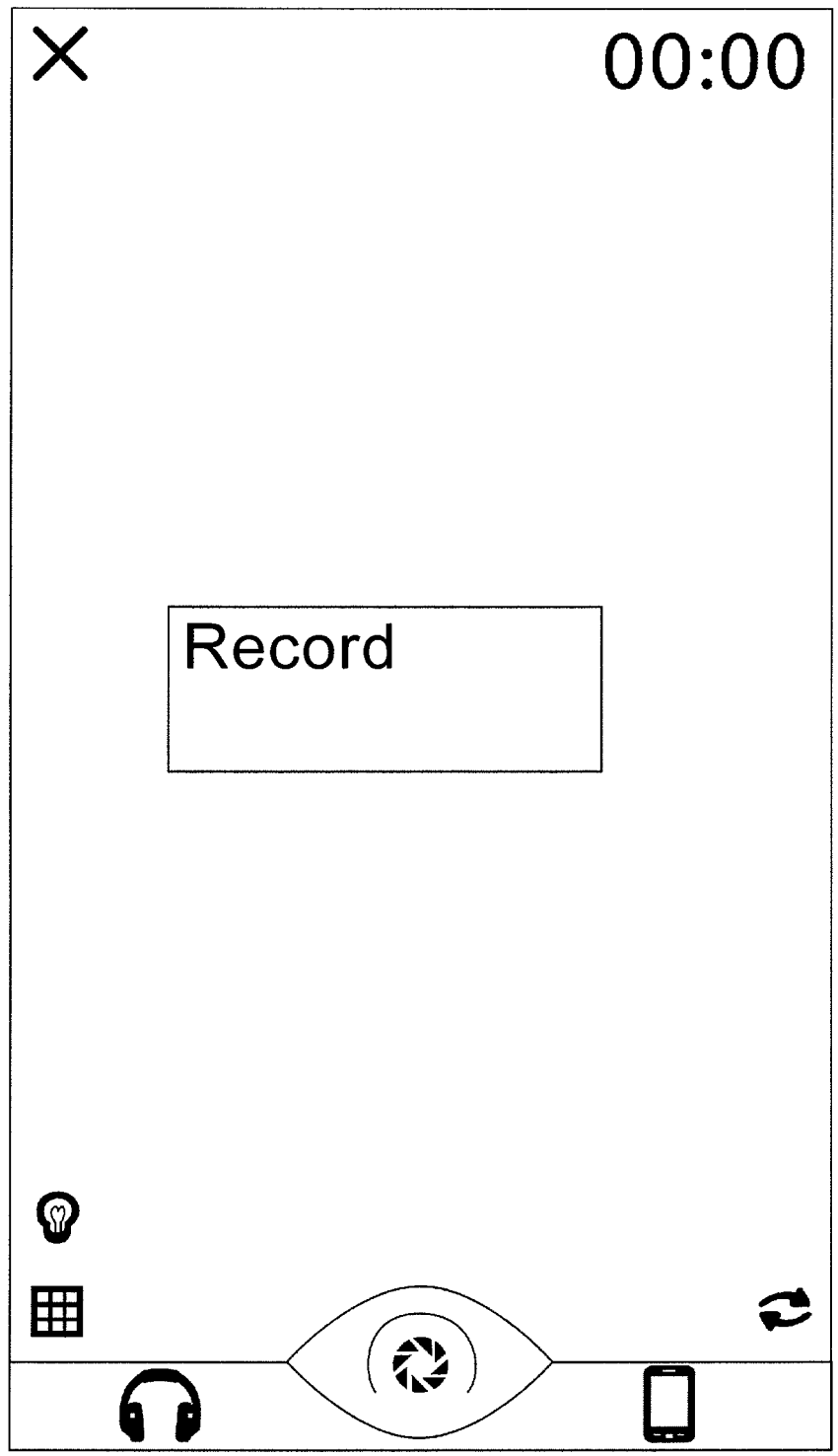
FIG. 55 shows an example of a user interface screen.

A user interface may be provided on a screen (e.g. a touch screen) of the mobile device (e.g. a smartphone) through which a user may control actions of the video headphones when the video headphones are in connection with the mobile device. A connection may be a wired connection. A connection may be a wireless connection. A user interface screen of the mobile device may provide a selectable (e.g. touch screen selectable) option, which when selected by a user begins a video recording. An example user interface screen is shown in FIG. 55.

Figure 56:
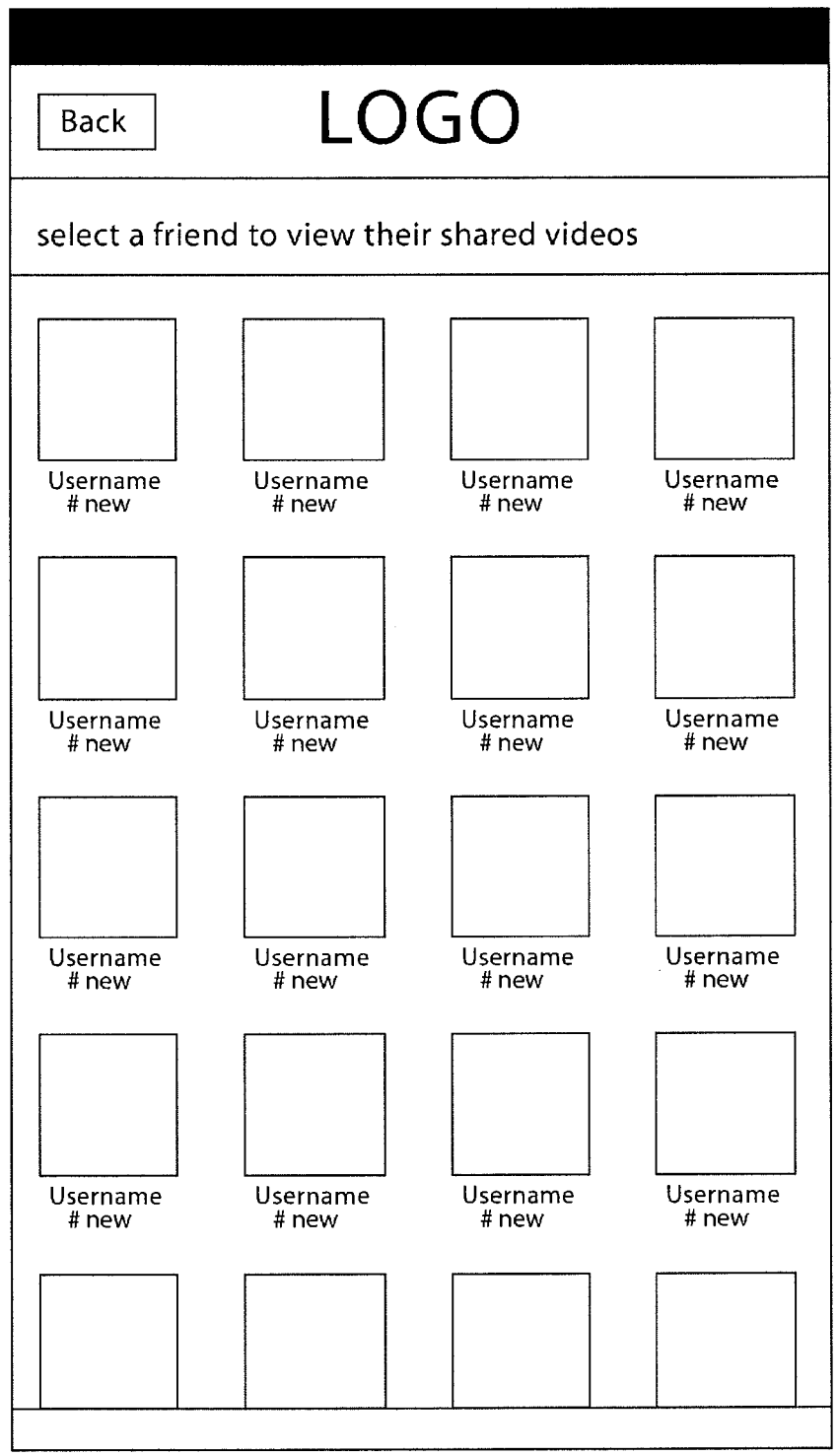
FIG. 56 shows an example of a user interface screen.

A user interface may be provided on a screen (e.g. a touch screen) of the mobile device (e.g. a smartphone) through which a user may control actions of the video headphones when the video headphones are in connection with the mobile device. A connection may be a wired connection. A connection may be a wireless connection. A user interface screen of the mobile device may provide a plurality of selectable (e.g. touch screen selectable) options, each of which corresponds to a friend of the user, which when selected by the user selects a friend so that the friend's shared videos can be viewed. An example user interface screen is shown in FIG. 56.

Figure 57:
FIG. 57 shows an example of a Create—Import from video headphones user interface screen.

A user interface may be provided on a screen (e.g. a touch screen) of the mobile device (e.g. a smartphone) through which a user may control actions of the video headphones when the video headphones are in connection with the mobile device. A mobile device screen may be provided for importing and beginning editing of videos stored on the video headphones to the mobile device. The mobile device screen may display a screenshot, username and title associated with each of a plurality of videos of which are selectable for importing and editing on the mobile device. An example user interface screen is shown in FIG. 57.

Figure 58:
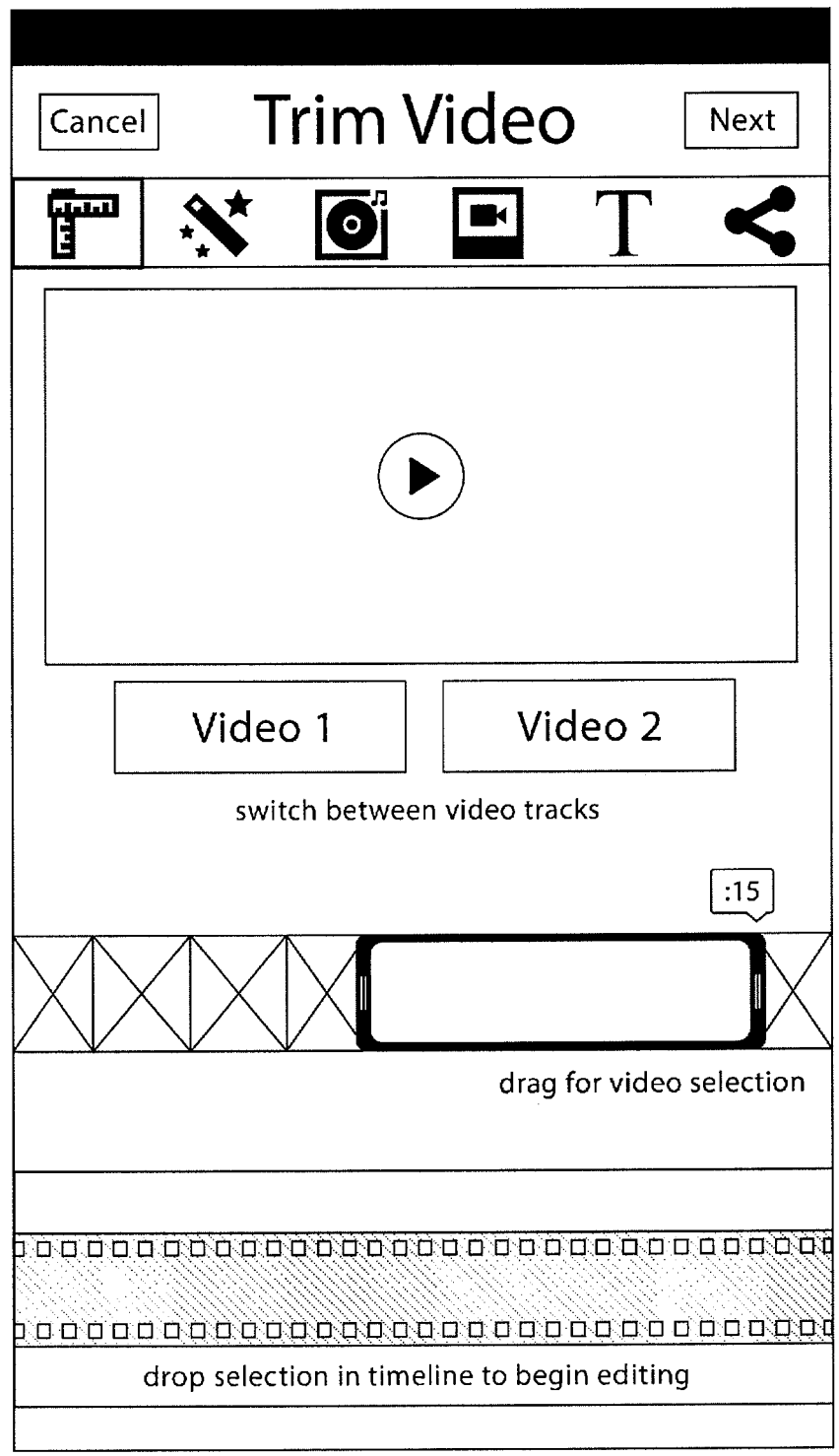
FIG. 58 shows an example of a Create—Edit—Trim user interface screen.

A user interface may be provided on a screen (e.g. a touch screen) of the mobile device (e.g. a smartphone) through which a user may control editing actions for videos that have been imported from the video headphones when the video headphones were in connection with the mobile device. The mobile device screen may display a screenshot associated with a video which has been selected for editing on the mobile device. Selectable icons may be provided on the screen for switching between video tracks. A rectangle of an adjustable length may be provided for selecting a portion of a video from the entire duration of a video, so that the other portions are not included in an edited video file. A selected portion of a video may be dragged and dropped on the screen so as to form part of a longer video file. The screen may include selectable icons to perform editing functions on a video, such as to adjust an aspect ratio of a video, or to adjust the brightness or contrast of a video, or to add text to a video. An example user interface screen is shown in FIG. 58.

Figure 59:
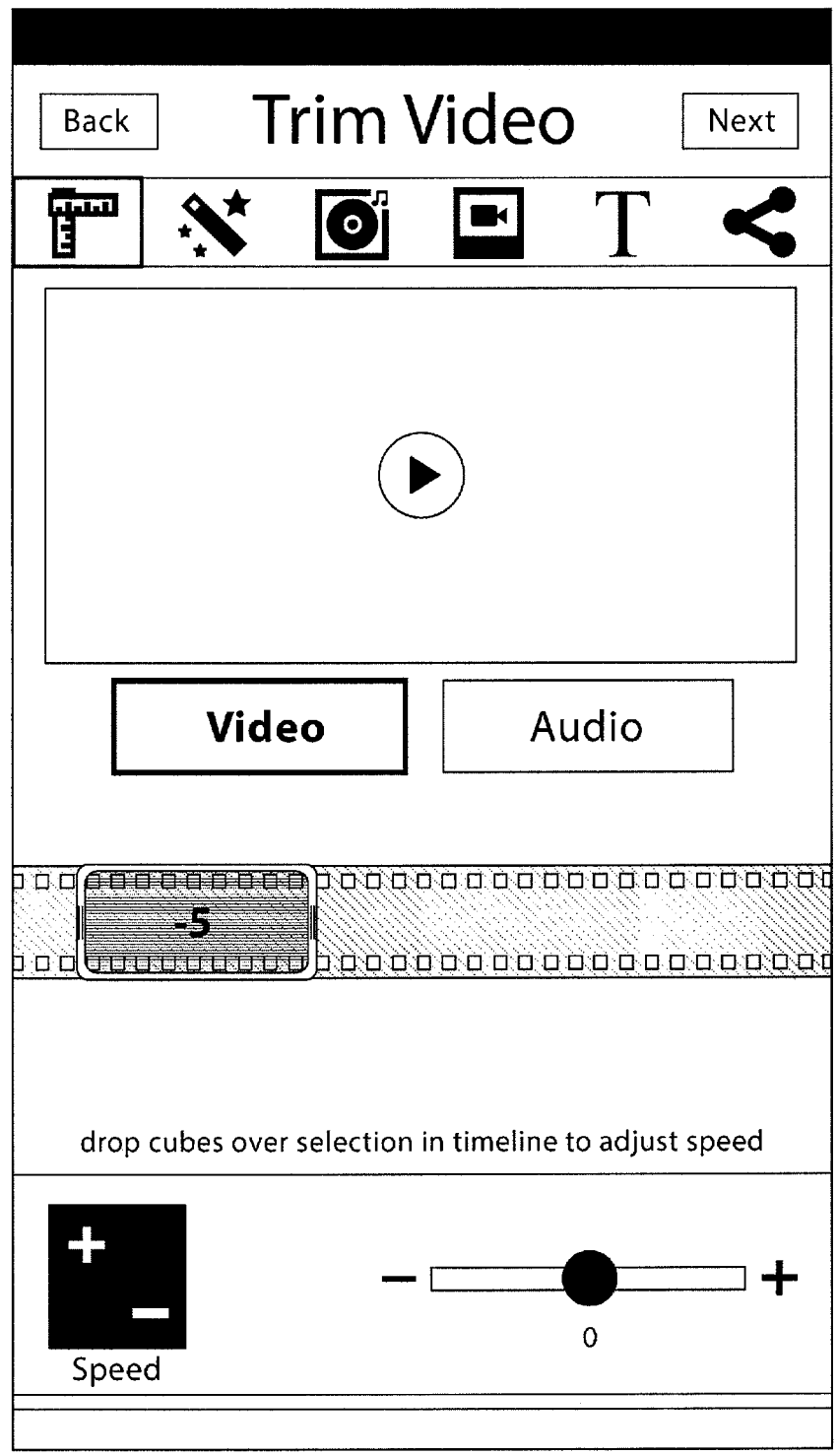
FIG. 59 shows an example of a Create—Edit—Video Speed user interface screen.

A user interface may be provided on a screen (e.g. a touch screen) of the mobile device (e.g. a smartphone) through which a user may control editing actions for videos that have been imported from the video headphones when the video headphones were in connection with the mobile device. The mobile device screen may display a screenshot associated with a video which has been selected for editing on the mobile device. Selectable icons may be provided on the screen for switching between video editing and audio editing. A rectangle of an adjustable length may be provided for selecting a portion of a video from the entire duration of a video, so that the playback speed of the selected portion may be adjusted. The playback speed of a selected portion of the video may be adjusted by sliding a slider input icon, with sliding in a first direction indicating an increase in playback speed and sliding in a second direction opposite to the first direction indicating a decrease in the playback speed. The screen may include selectable icons to perform editing functions on a video, such as to adjust an aspect ratio of a video, or to adjust the brightness or contrast of a video, or to add text to a video. An example user interface screen is shown in FIG. 59.

Figure 60:
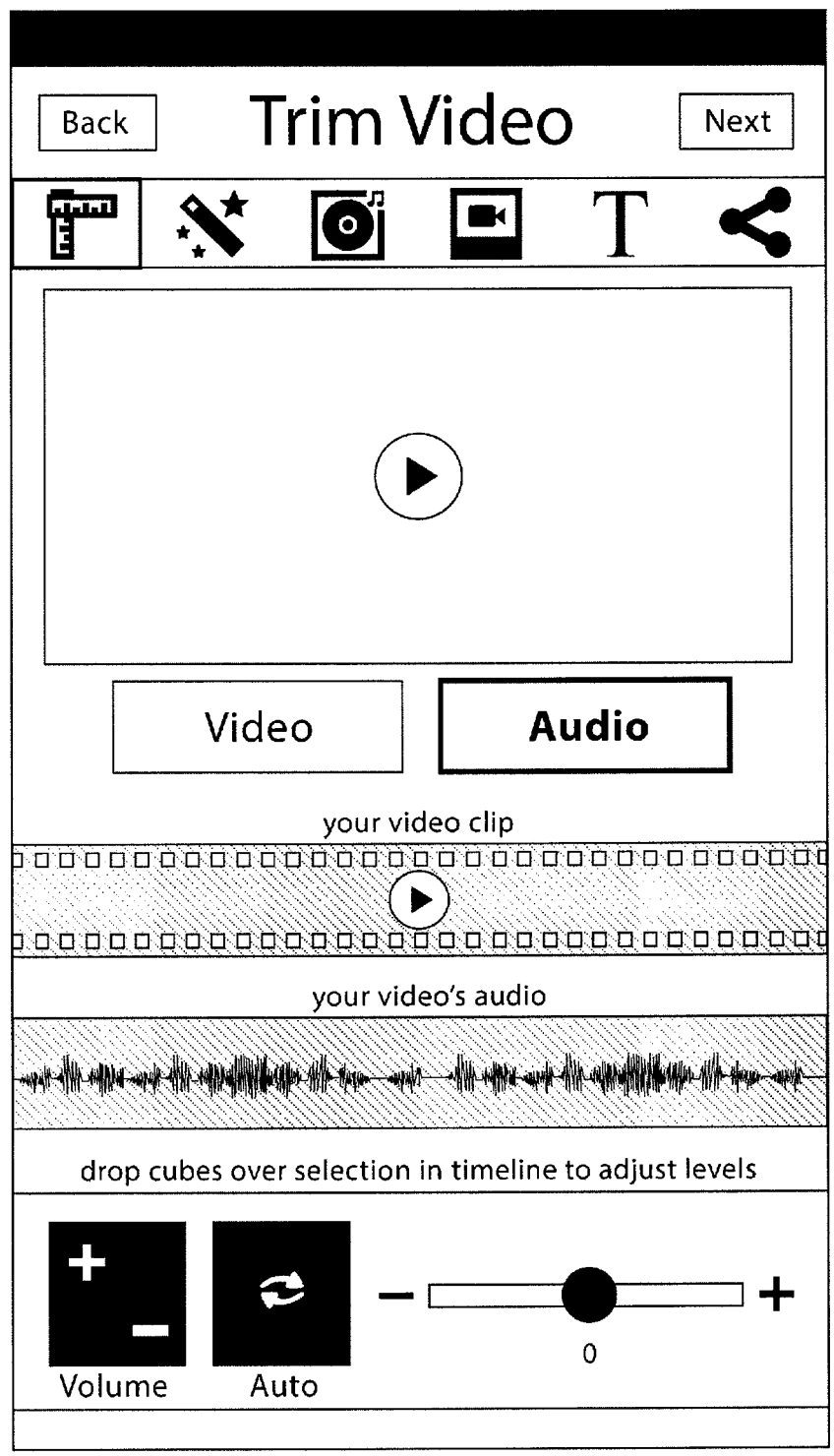
FIG. 60 shows an example of a Create—Edit—Video Audio user interface screen.

A user interface may be provided on a screen (e.g. a touch screen) of the mobile device (e.g. a smartphone) through which a user may control editing actions for videos that have been imported from the video headphones when the video headphones were in connection with the mobile device. The mobile device screen may display a screenshot associated with a video which has been selected for editing on the mobile device. Selectable icons may be provided on the screen for switching between video editing and audio editing. A rectangle of an adjustable length may be provided for selecting a portion of a video from the entire duration of a video, so that the audio sound level of the selected portion may be adjusted. The audio sound level of a selected portion of the video may be adjusted by sliding a slider input icon, with sliding in a first direction indicating an increase in audio sound level and sliding in a second direction opposite to the first direction indicating a decrease in the audio sound level. The screen may include selectable icons to perform editing functions on a video, such as to adjust an aspect ratio of a video, or to adjust the brightness or contrast of a video, or to add text to a video. An example user interface screen is shown in FIG. 60.

Figure 61:
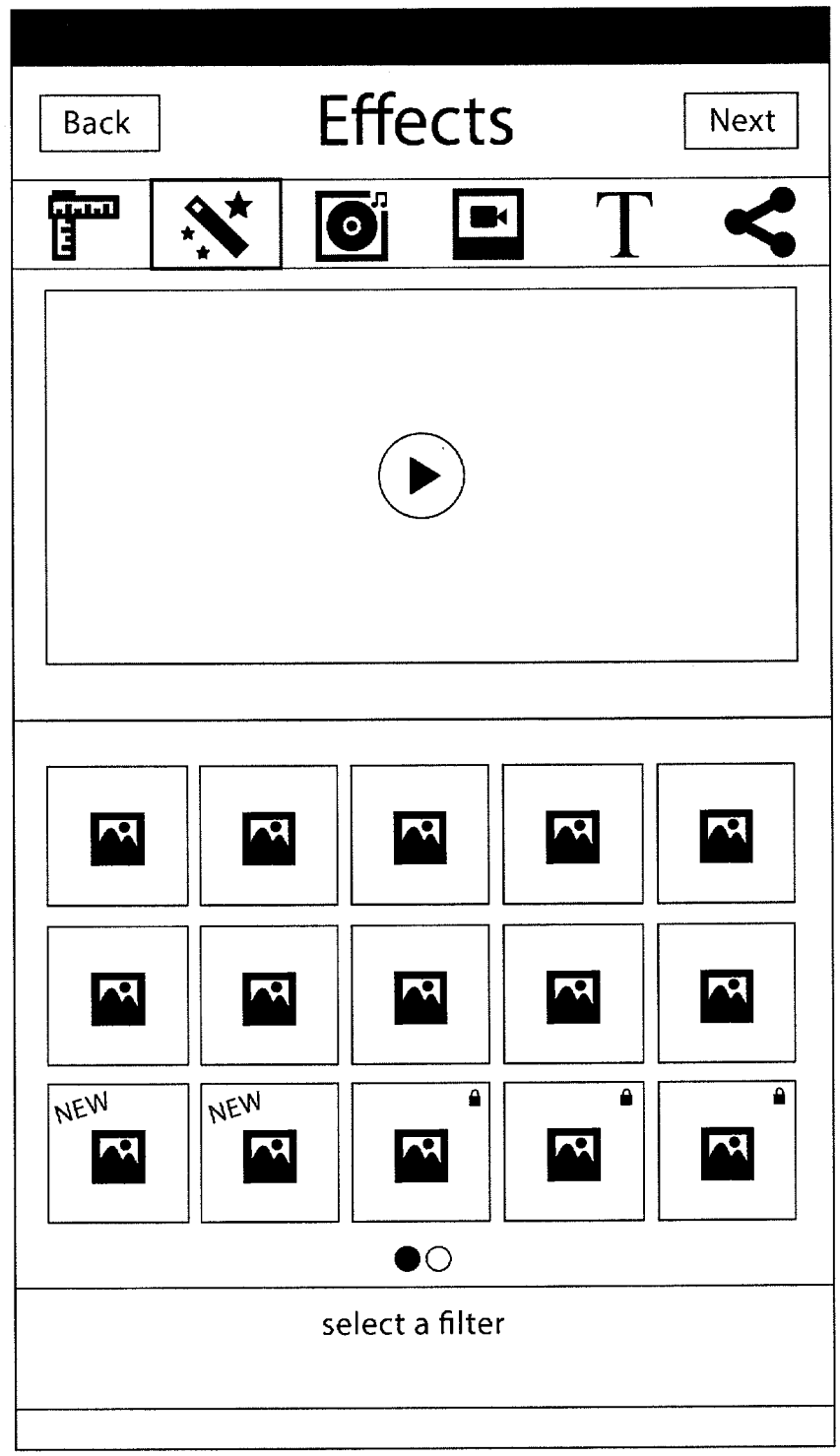
FIG. 61 shows an example of a Create—Edit—Apply Video Effects user interface screen.

A user interface may be provided on a screen (e.g. a touch screen) of the mobile device (e.g. a smartphone) through which a user may control editing actions for videos that have been imported from the video headphones when the video headphones were in connection with the mobile device. The mobile device screen may display a screenshot associated with a video which has been selected for editing on the mobile device. The screen may include selectable icons to perform editing functions on a video, such as to adjust an aspect ratio of a video, or to adjust the brightness or contrast of a video, or to add text to a video. A selectable icon may provide a set of selectable filters to be applied to a video, such as for increasing brightness, for decreasing brightness, for providing a colour scheme, or for providing a tint, to the video, for example. An example user interface screen is shown in FIG. 61.

Figure 62:
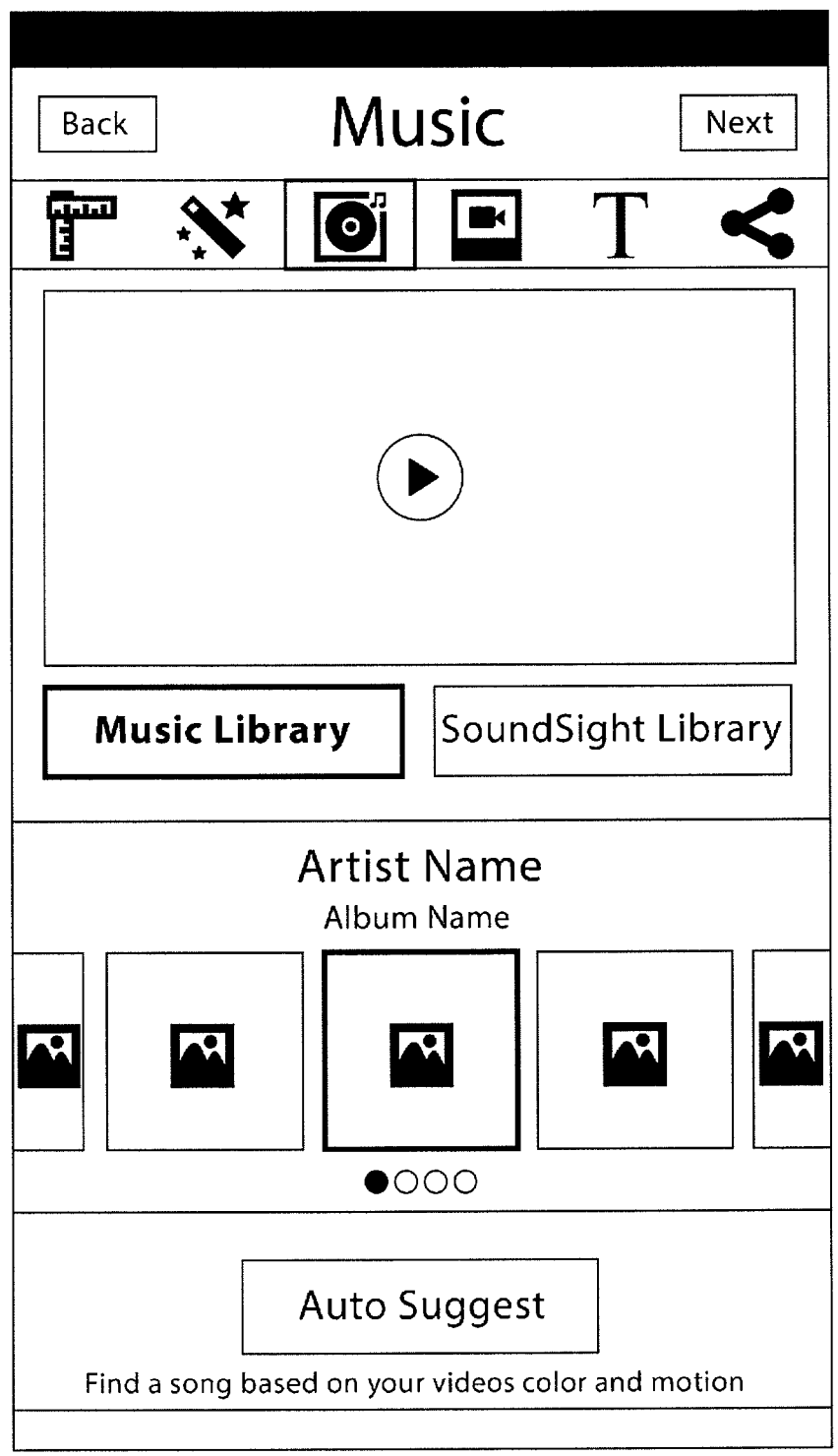
FIG. 62 shows an example of a Create—Edit—Add Music user interface screen.
Figure 63:
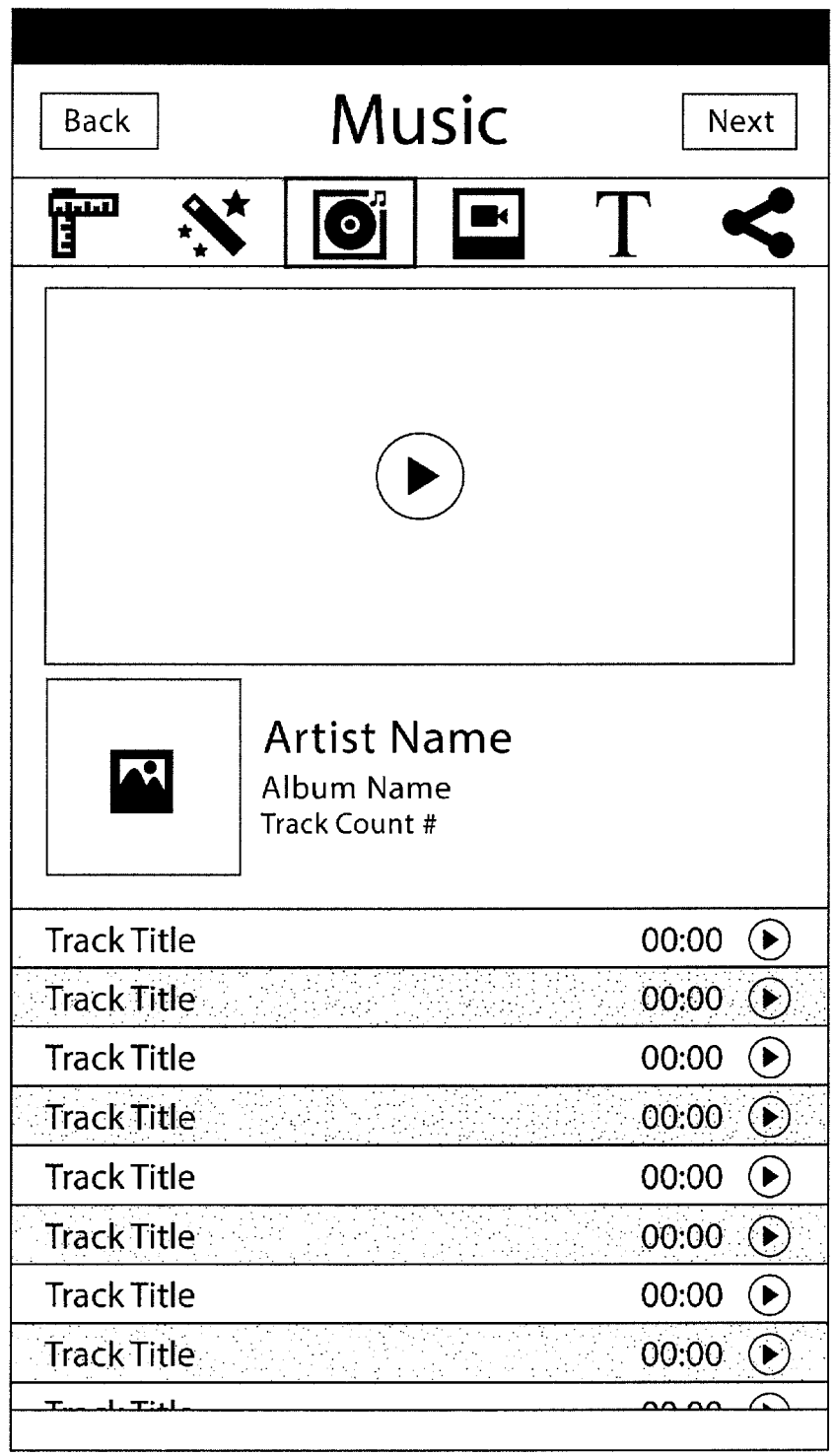
FIG. 63 shows an example of a Create—Edit—Select Track user interface screen.

A user interface may be provided on a screen (e.g. a touch screen) of the mobile device (e.g. a smartphone) through which a user may control editing actions for videos that have been imported from the video headphones when the video headphones were in connection with the mobile device. The mobile device screen may display a screenshot associated with a video which has been selected for editing on the mobile device. The screen may include selectable icons to perform editing functions on a video, such as to adjust an aspect ratio of a video, or to adjust the brightness or contrast of a video, or to add text to a video. A selectable icon may provide a music library of albums (such as one associated with a particular artist) from which a sound track may be selected to provide a soundtrack to the video. A selectable icon may be provided which if selected auto suggests sound tracks which match the video's colour and motion. An example user interface screen is shown in FIG. 62. If an album is selected, a further screen may be provided from which a track of the selected album may be selected. An example user interface screen is shown in FIG. 63.

Figure 64:
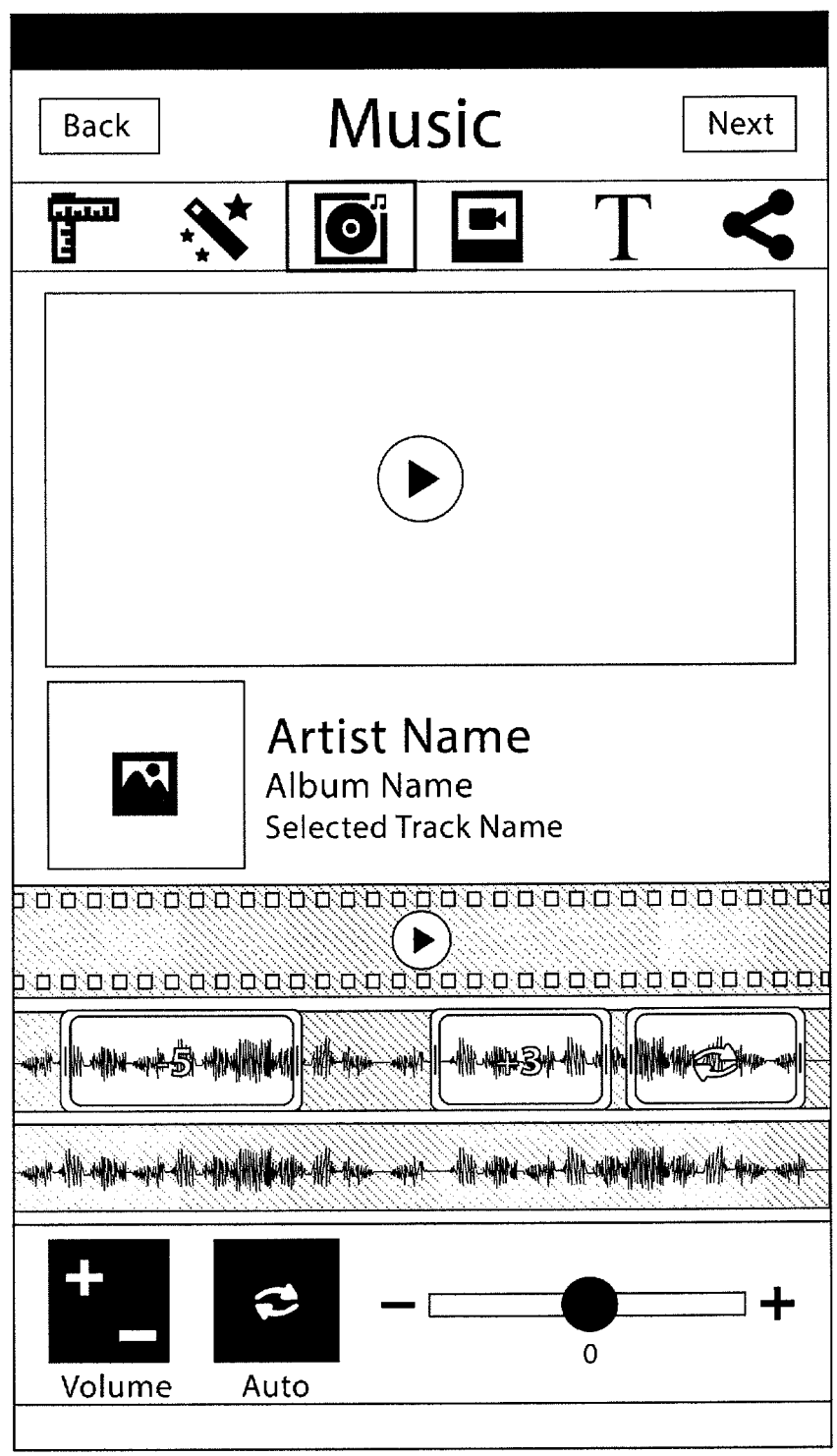
FIG. 64 shows an example of a user interface screen.

A user interface may be provided on a screen (e.g. a touch screen) of the mobile device (e.g. a smartphone) through which a user may control editing actions for videos that have been imported from the video headphones when the video headphones were in connection with the mobile device. The mobile device screen may display a screenshot associated with a video which has been selected for editing on the mobile device. The screen may include selectable icons to perform editing functions on a video, such as to adjust an aspect ratio of a video, or to adjust the brightness or contrast of a video, or to add text to a video. A selectable icon may provide a music library from which a sound track may be selected to provide a soundtrack to the video. A further screen may be provided on which the artist's name, an album name, and a name of the selected track are provided. A rectangle of an adjustable length may be provided for selecting a portion of an audio track from the entire duration of an audio track, so that the selected portion may be adjusted. A plurality of rectangles of an adjustable length may be provided for selecting portions of a track from the entire duration of a track, so that the audio sound level of the selected portions may be adjusted. The audio sound level of a selected portion of the track may be adjusted by sliding a slider input icon, with sliding in a first direction indicating an increase in audio sound level and sliding in a second direction opposite to the first direction indicating a decrease in the audio sound level. Each of a plurality of selected portions of the track may have its audio characteristics edited independently of the other selected portions. An example user interface screen is shown in FIG. 64.

Figure 65:
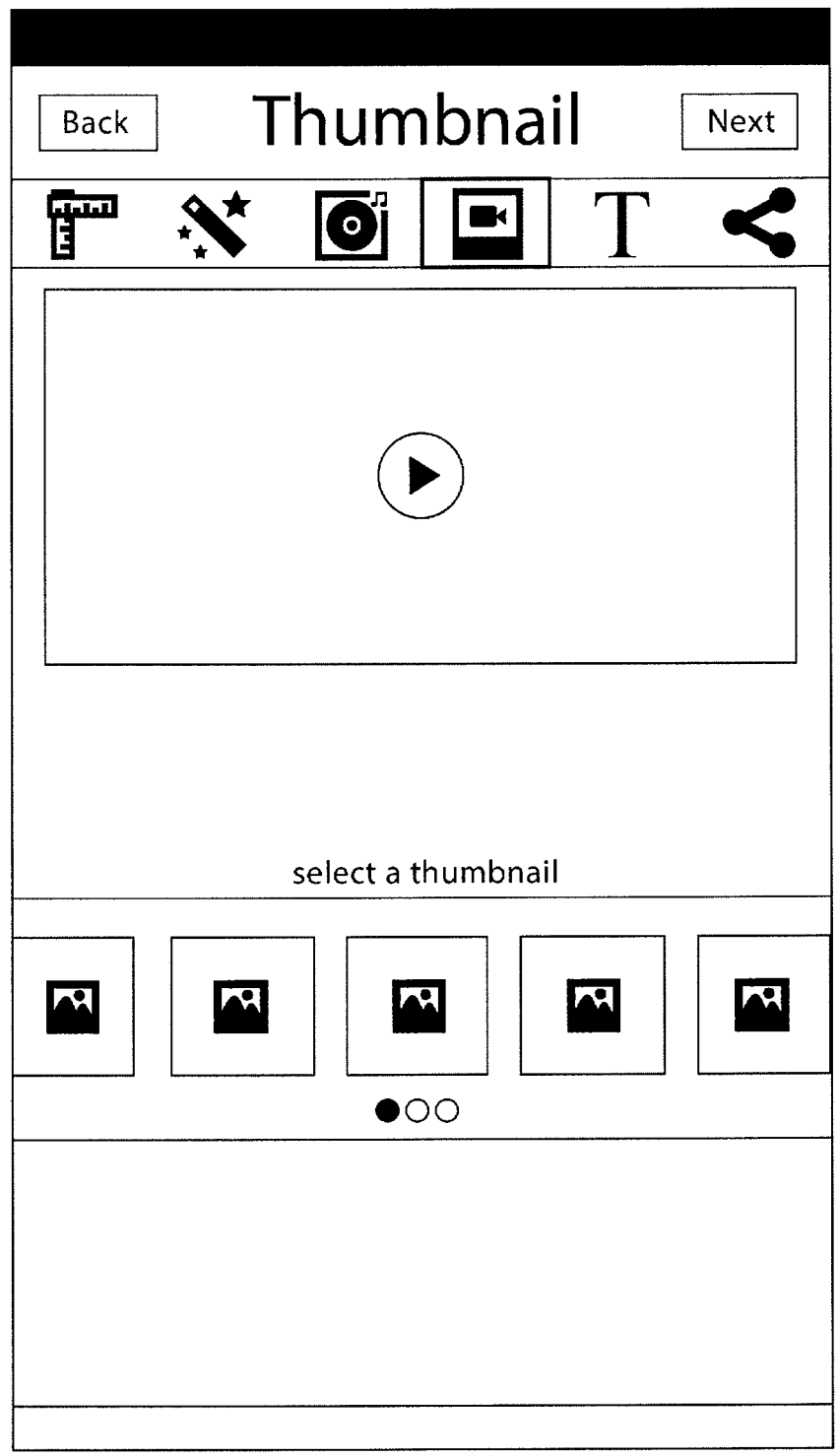
FIG. 65 shows an example of a Create—Edit—Thumbnail Selection user interface screen.

A user interface may be provided on a screen (e.g. a touch screen) of the mobile device (e.g. a smartphone) through which a user may control editing actions for videos that have been imported from the video headphones when the video headphones were in connection with the mobile device. The mobile device screen may display a screenshot associated with a video which has been selected for editing on the mobile device. Selectable icons may be provided on the screen for selecting a thumbnail for the video. The selectable icons may provide representative screen shots for the video, for different times during the video, for use in generating a thumbnail for the video. The screen may include selectable icons to perform editing functions on a video, such as to adjust an aspect ratio of a video, or to adjust the brightness or contrast of a video, or to add text to a video. An example user interface screen is shown in FIG. 65.

Figure 66:
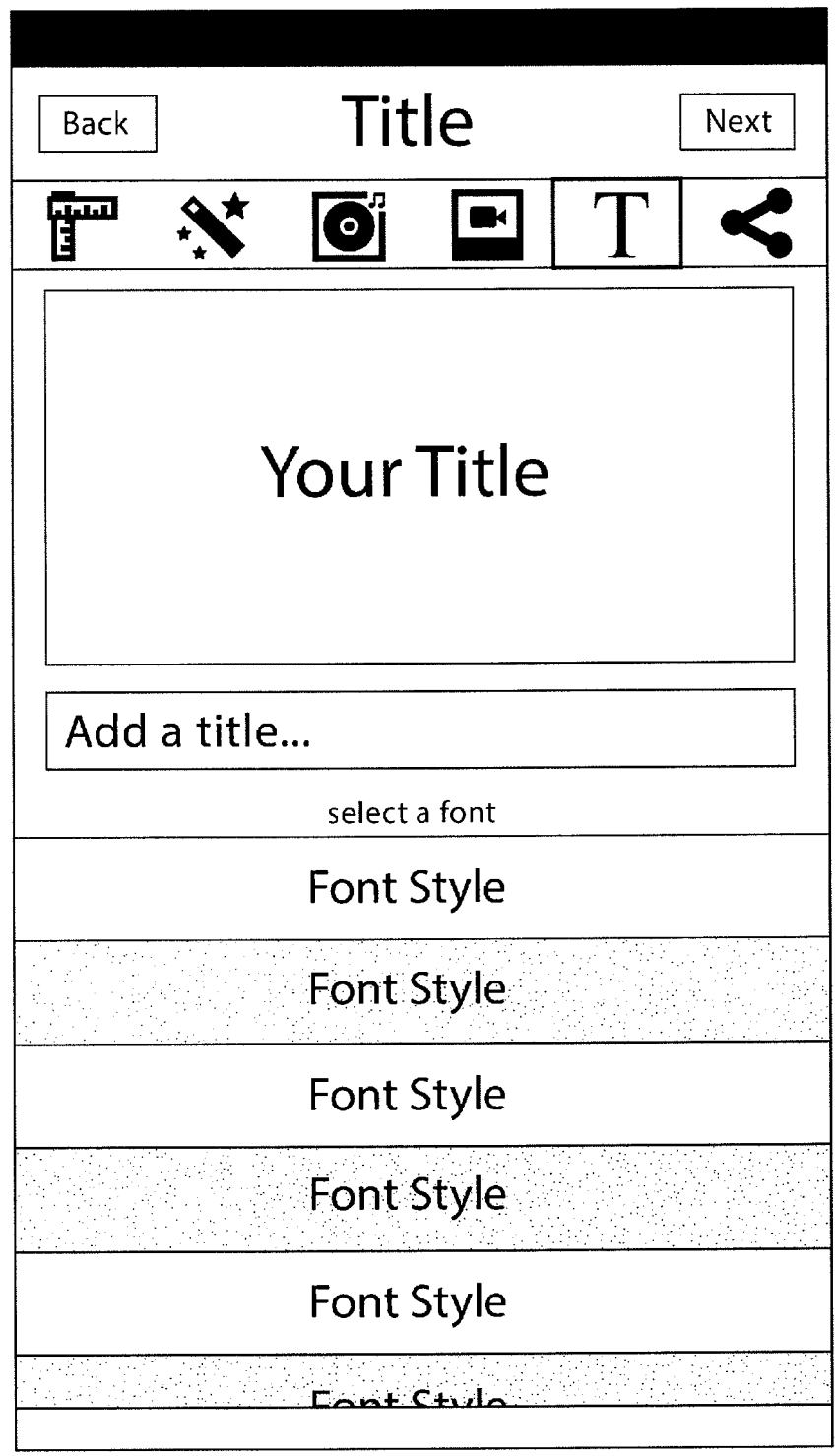
FIG. 66 shows an example of a Create—Edit—Title user interface screen.

A user interface may be provided on a screen (e.g. a touch screen) of the mobile device (e.g. a smartphone) through which a user may control editing actions for videos that have been imported from the video headphones when the video headphones were in connection with the mobile device. The mobile device screen may display a title associated with a video which has been selected for editing on the mobile device. An input field may be provided for inputting a title for the video. Selectable icons may be provided for selecting a font style in which to display the title. The screen may include selectable icons to perform editing functions on a video, such as to adjust an aspect ratio of a video, or to adjust the brightness or contrast of a video, or to add text to a video. An example user interface screen is shown in FIG. 66.

Figure 67:
FIG. 67 shows an example of a Create—Edit—Preview user interface screen.

A user interface may be provided on a screen (e.g. a touch screen) of the mobile device (e.g. a smartphone) through which a user may control editing actions for videos that have been imported from the video headphones when the video headphones were in connection with the mobile device. The mobile device may be in communication with a server, which may be real or virtual. A preview screen may be provided. The mobile device screen may display a title associated with a video which has been edited on the mobile device. A title may be provided superimposed on a selected screen shot from the video. A selectable icon may be provided for selecting to share the video with other users via the server. A selectable icon may be provided for selecting to terminate the video editing process. An advertisement may be provided on the screen. The screen may include selectable icons to resume editing functions on a video, such as to adjust an aspect ratio of a video, or to adjust the brightness or contrast of a video, or to add text to a video. An example user interface screen is shown in FIG. 67.

Figure 68:
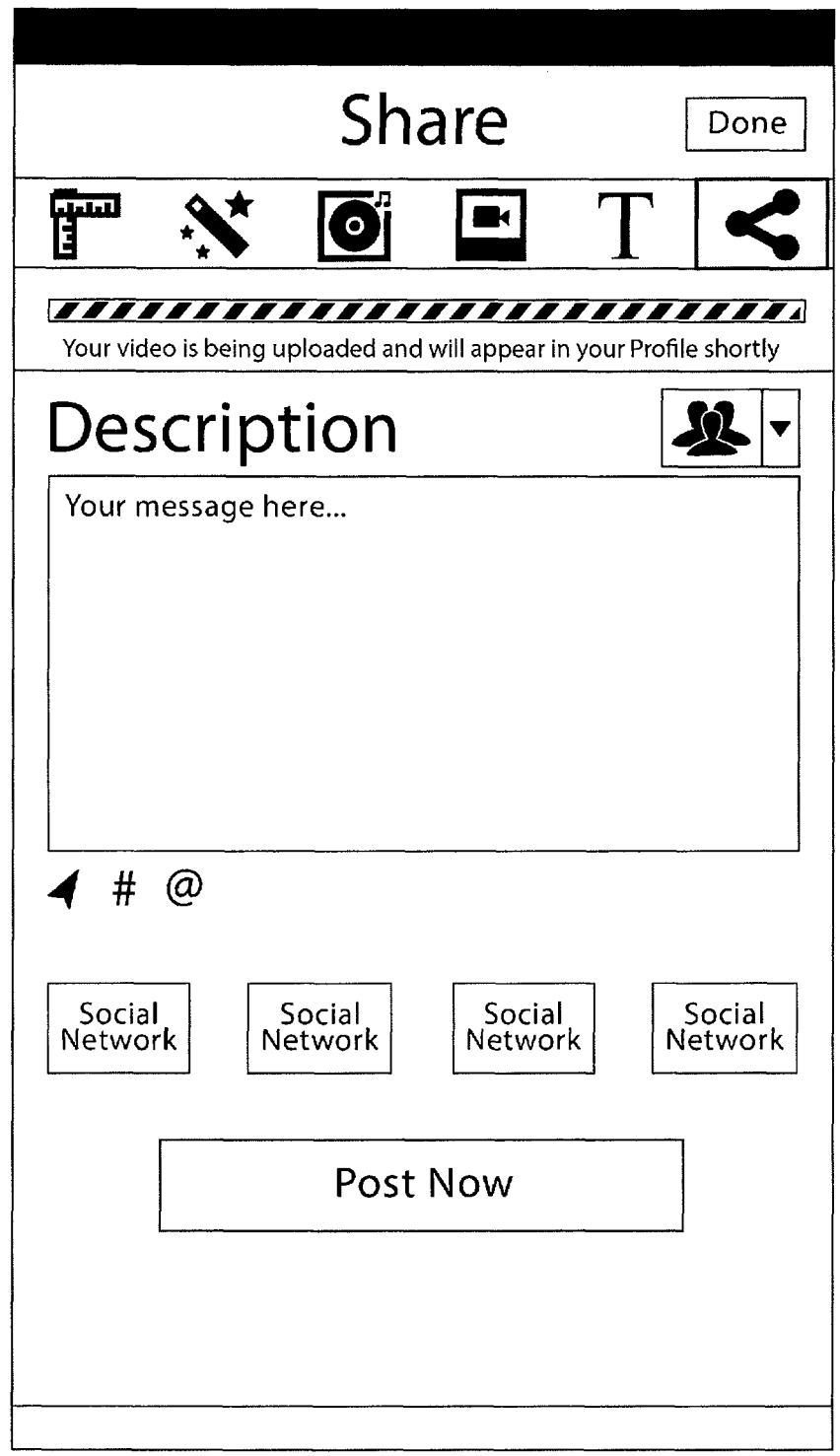
FIG. 68 shows an example of a Create—Edit—Share user interface screen.

A user interface may be provided on a screen (e.g. a touch screen) of the mobile device (e.g. a smartphone) through which a user may control sharing actions for videos that have been imported from the video headphones when the video headphones were in connection with the mobile device. A sharing screen may be provided. The mobile device screen may display a graphic which indicates that a video is being uploaded from the mobile device to a server (which may be real or virtual) from which the video will be shared. A description of the video may be provided by a user through input to the screen. Selectable icons corresponding to individual social network sites may be provided for selecting to share the video with other users on the corresponding individual social network site. A selectable icon may be provided for selecting to post the video on selected social network sites. The screen may include selectable icons to resume editing functions on a video, such as to adjust an aspect ratio of a video, or to adjust the brightness or contrast of a video, or to add text to a video. An example user interface screen is shown in FIG. 68.

Figure 71:
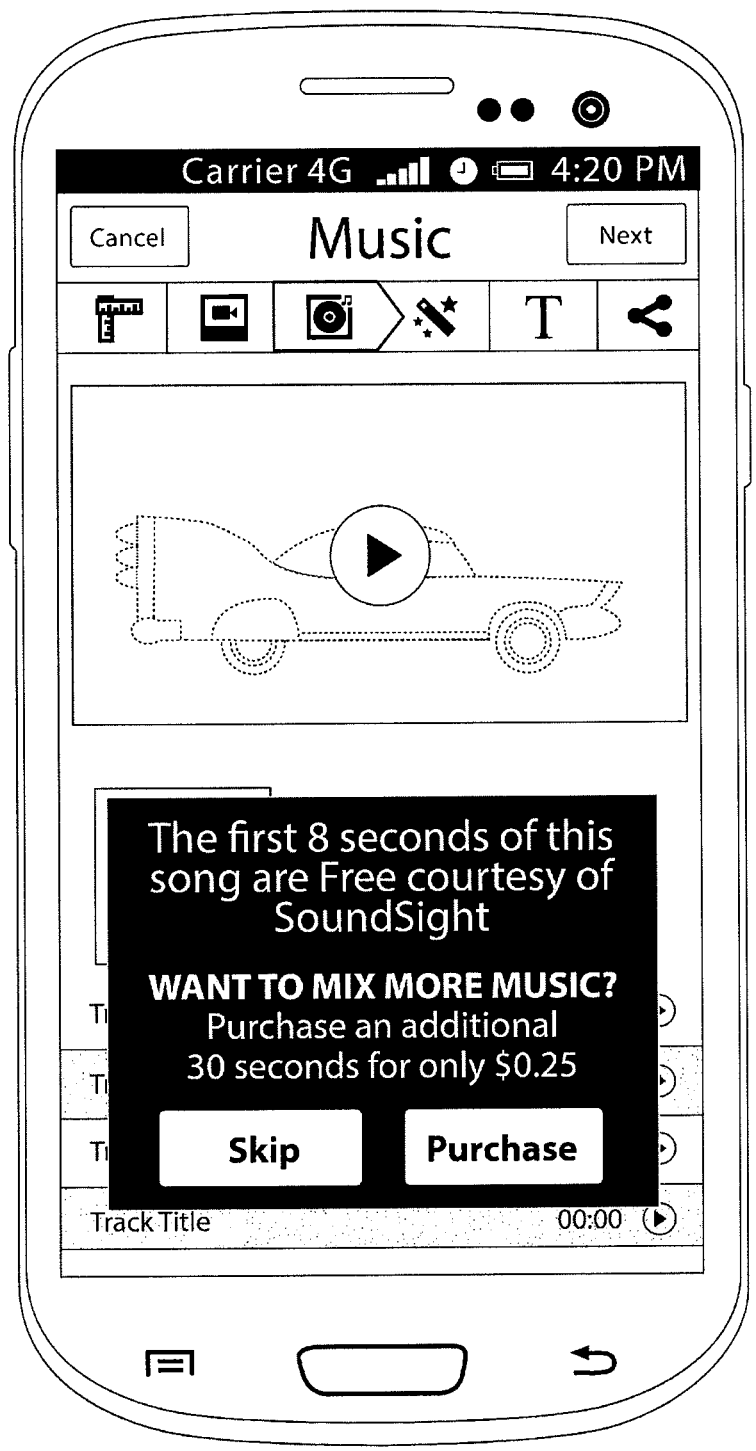
FIG. 71 shows an example of a user interface screen.

There is provided a system including video headphones which are connectable to a mobile device (e.g. a smartphone) running an App, wherein the mobile device is in connection with a server. The mobile app allows users to purchase filters and/or music within the app for integration into their videos. An example user interface screen is shown in FIG. 71.

Professional-Quality Video Camera

There is provided a portable camera capable of capturing professional-quality video (e.g. 1080p30 or better), which is connectable wirelessly, which can connect wirelessly (e.g. by WiFi or Bluetooth) to wirelessly connectable headphones, and which can record a soundtrack for a video which is a soundtrack being listened to on the headphones. The camera may be wearable, gear-mountable or waterproof. The camera may include a wide-angle lens. The camera may also automatically use the music you're listening to on your headphones as the soundtrack for a video recorded by the camera. A connection between the camera and the headphones may be a wired connection.

Spectacles Including a Video Camera

There is provided spectacles comprising a computer built-into the spectacle frames, with a display provided in the field of vision, and a camera which can record a video. The spectacles may respond to voice commands. The spectacles may use the sound of a soundtrack being listened to on audio output apparatus of the spectacles as the soundtrack of a video recorded by the camera of the spectacles. The spectacles may be connectable wirelessly. The spectacles may connect wirelessly (e.g. by WiFi) to wirelessly connectable headphones. The spectacles may record a soundtrack for a video which is a soundtrack being listened to on the headphones. The spectacles may include speakers, which may be bone conduction type, or other types. The spectacles may also automatically use the music a user is listening to on his headphones as the soundtrack for a video recorded by the spectacles. A connection between the spectacles and the headphones may be a wired connection.

Further Disclosures

With a video headphone as disclosed herein users will be able to record video through a small camera embedded in the headphones themselves. Audio can also be recorded through microphones, which can be installed into the headphone cable control unit and also located underneath the video camera.

Once a user has finished recording video, audio can be added, music can be selected for the video and filters added. After the editing process has been completed, audio and video can be seamlessly synced and the output can be shared to desired social networks.

A video headphone as disclosed herein may be configured for use and with suitable wired interfacing to connect to an audio source as well as a SmartPhone USB connector.

The video headphone may stream audio and video signals to a SmartPhone for storage and later editing and/or uploading through a wire with audio and video controls on the controls that connects from video headphone to smartphone.

The video headphone may be worn and/or used by the user such that the camera's view may be adjusted to monitor what may be seen by the user and it's signal output may be combined with the audio source feed, such as that which is monitored by the user, and provided to an external SmartPhone.

Specific audio performance desired for the headphone device are those typical in professional use, i.e. bandwidth of 20 Hz to 20 kHz. Specific video performance desired for the camera attachment to the video headphone device shall permit image motion captures of 25 fps or better with a resolution adequate and similar to that which is commonly downloaded to SmartPhone devices from various video streaming and downloadable sources with typical formats such as MP4, FL V, MPEG, etc.

Packaging may include 3 connection types from headphone to various inputs of smartphone models. Connection 1 may be a Micro-USB to Apple iPhone, iPhone 3G, iPhone 4, iPhone 4S 30-Pin Style Charger Adapter Tip. Connection 2 may be a 3.5 mm Auxiliary Cable Sync Connector. Connection 3 may be a Micro USB Cable.

An app for use with a video headphone may:

Add filters to videos (e.g., sepia filter, black and white filter, monochromatic filter).

record video (e.g., any length, for up to 15 seconds.)

Provide the user with the ability to edit video by shortening timeline.

Add various frames around video.

Audio features of a system according to the present invention may include:

Ability to import songs from a user's playlist to video recording.

Ability to store the user's playlist locally on the user's device or on a web server.

WAY, AIFF, AU or raw header-less PCM; Formats with lossless compression, such as FLAC, Monkey's Audio (filename extension APE), WavPack (filename extension WV), TTA, ATRAC Advanced Lossless, Apple Lossless (filename extension m4a), MPEG-4 SLS, MPEG-4 ALS, MPEG-4 DST, Windows Media Audio Lossless (WMA Lossless), and Shorten (SHN), and/or the like audio formats may be supported.

ability to sync the audio and video recording from any point in timeline to record final output.

ability to upload final video to Facebook, Tumblr, Twitter, Instagram, Pinterest, Vimeo, YouTube.

ability to edit audio sound speed 2×, 3× faster or slower via a button.

ability to edit audio sound with auto tune feature with a single button.

ability to press a single button to post artist credit for song being used. The artist credit will scroll across video. Process is controlled by a one button process.

A system according to the present invention may:

Provide a user with the ability to create a profile. This includes username, location, sex, age, email address.

Provide ability to store user profile data at a central web database server using REST API.

Provide Audio/video sync software to time to actions in video.

Provide playlist suggestions of songs from users playlist that have the same tempo as the actions in video.

Provide the ability for user to pay for audio and video features (e.g., video filters and audio enhancements).

Provide the ability to combine 2 videos into one, edit music and make one video.

This disclosure (including the written description, figures, claims, abstract, appendices, and/or the like) for VIDEO HEADPHONES PLATFORM METHODS, APPARATUSES AND MEDIA shows various examples via which the claimed innovations may be practiced. It is to be understood that these examples and the features are a representative sample presented to assist in understanding the claimed innovations, and are not exhaustive and/or exclusive. As such, the various examples, implementations, examples, and/or the like are deemed non-limiting throughout this disclosure. Furthermore, alternate undescribed examples may be available (e.g., equivalent examples). Such alternate examples have not been discussed in detail to preserve space and/or reduce repetition. That alternate examples have not been discussed in detail is not to be considered a disclaimer of such alternate undescribed examples, and no inference should be drawn regarding such alternate undescribed examples relative to those discussed in detail in this disclosure. It is to be understood that such alternate undescribed examples may be utilized without departing from the spirit and/or scope of the disclosure. For example, the organizational, logical, physical, functional, topological, and/or the like structures of various examples may differ. In another example, the organizational, logical, physical, functional, topological, and/or the like structures of a VHP coordinator, VHP coordinator elements, VHP data stores, VHP components and their subcomponents, capabilities, applications, and/or the like described in various examples throughout this disclosure are not limited to a fixed operating order and/or arrangement, instead, all equivalent operating orders and/or arrangements are contemplated by this disclosure. In yet another example, a VHP coordinator, VHP coordinator elements, VHP data stores, VHP components and their subcomponents, capabilities, applications, and/or the like described in various examples throughout this disclosure are not limited to serial execution, instead, any number and/or configuration of threads, processes, instances, services, servers, clients, nodes, and/or the like that execute in parallel, concurrently, simultaneously, synchronously, asynchronously, and/or the like is contemplated by this disclosure. Furthermore, it is to be understood that some of the features described in this disclosure may be mutually contradictory, incompatible, inapplicable, and/or the like, and are not present simultaneously in the same example. Accordingly, the various examples, implementations, examples, and/or the like are not to be considered limitations on the disclosure as defined by the claims or limitations on equivalents to the claims.

This disclosure includes innovations not currently claimed. Applicant reserves all rights in such currently unclaimed innovations including the rights to claim such innovations and to file additional provisional applications, nonprovisional applications, continuation applications, continuation-in-part applications, divisional applications, and/or the like. It is to be understood that while some examples of a VHP discussed in this disclosure have been directed to world view sharing video headphones, the innovations described in this disclosure may be readily applied to a wide variety of other fields and/or applications.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred example(s) of the invention, it will be apparent to those of ordinary skill in the art that numerous modifications can be made without departing from the principles and concepts of the invention as set forth herein.

The invention claimed is:

1. Music headphones including a pair of headphone units, each headphone unit comprising a loudspeaker housing in which is situated a small loudspeaker for high quality stereo music reproduction, in which the headphone units are circum-aural or supra-aural, wherein at least one integral video camera is built into each headphone unit and the headphones include at least one connection to a physically separate portable music device;
   wherein at least one of the connections enables (i) high quality playback of stereo music from the portable music device using the small loudspeakers; and
   at least one of the connections enables (ii) transferring of video data from the at least one video camera to the portable music device for one or more of: editing or mixing
music or other audio in order to create a soundtrack for a video recording, or sharing a video recording, and wherein the video data is editable;
   wherein the at least one integral video camera is concealed within a speaker housing of the headphones,
   in which a user can record a video using the at least one integral video camera, and the user can select at least one music track, genre, channel or playlist stored or accessible from the portable music device, to be the soundtrack to that video wherein said one music track, genre, channel or playlist is automatically generated by the portable music device based on they matching color and motion characteristics of the video being captured; and
   wherein said transferring of video data from the at least one video camera to the portable music device includes the transfer of real-time video that is relatively low resolution but sufficient to enable the user to view the scene being captured, and wherein high resolution video data is sent subsequently to the portable music device to store and to allow the user to edit that video on the portable music device.

2. The music headphones of claim 1 in which the music headphones provide hi-fi stereo music reproduction and are circum-aural, with an earpad that surrounds each outer ear of the user, or supra-aural, with an earpad that is pressed upon each outer ear of the user, and wherein the earpads are attached to a loudspeaker housing and that housing conceals the at least one video camera.

3. The music headphones of claim 1 in which the selected track, genre, channel or playlist that forms the soundtrack to the video is being played by the portable music device over the music headphones at the time the video is being recorded.

4. The music headphones of claim 1 in which the selected track, genre, channel or playlist is not being played by the portable music device over the music headphones at the time the video is being recorded, but instead is subsequently selected by the user interacting with the portable music device and is then made the soundtrack to that video.

5. The music headphones of claim 1 in which a body of the or each integral video camera is entirely contained within the loudspeaker housing of each of the headphone units.

6. The music headphones of claim 1 in which the presence of a camera lens is the only visible object or structure denoting the presence of a video camera in the music headphones.

7. The music headphones of claim 1 in which a surface of the at least one video camera forms a contiguous surface with the surface of a speaker housing.

8. The music headphones of claim 1 in which the headphones include a motion sensor to detect motion.

9. The music headphones of claim 8 in which the motion sensor is used for image stabilisation of the image filmed by the at least one integral video camera.

10. The music headphones of claim 1 which include a sensor to detect whether they are being worn or not, and to automatically pause music playback when not being worn.

11. The music headphones of claim 1 which include a sensor to detect whether they are being worn or not, and to automatically pause video recording when not being worn.

12. The music headphones of claim 1 in which the at least one video camera is positioned inside rotatable units that form part of the loudspeaker housing, enabling the user to alter the orientation of the at least one camera, including for example one forward POV and one rearward POV.

13. The music headphones of claim 12 in which there is a video camera positioned inside a rotatable unit that forms part of the loudspeaker housing for each headphone unit, and each rotatable unit is independently rotatable.

14. The music headphones of claim 1 in which the music headphones include multiple integral video cameras.

15. The music headphones of claim 14 in which a position of each video camera can be altered by sliding that camera along a member, such as part of a headband of the music headphones.

16. The music headphones of claim 1 in which the connection to the portable music device includes a physical connector selected from the list: an audio jack, phone jack, phone plug, jack plug, stereo plug, mini-stereo, mini jack, headphone jack, USB, USB OTG, Micro USB, Firewire, Thunderbolt.

17. The music headphones of claim 1 in which the connection to the portable music device includes a short-distance wireless connection, such as Bluetooth A2DP, or Wi-Fi.

18. The music headphones of claim 1 which are not headsets as such.

19. The music headphones of claim 1 including multiple video cameras, each positioned to enable a panoramic image, including both video and still images, to be taken.

20. The music headphones of claim 1 including an ambient light sensor.

21. The music headphones of claim 1 including a colour or colour temperature sensor.

22. The music headphones of claim 1 including a physiological sensor to detect physiological parameters of the user.

23. The music headphones of claim 1 in which the real-time video is editable by the user and any edits are subsequently and automatically applied to the high resolution version.

24. A system including stereo music headphones including a pair of headphone units, each headphone unit comprising a loudspeaker housing in which is situated a loudspeaker for high quality stereo music reproduction, in which the headphone units are circum-aural or supra-aural, wherein at least one integral video camera is built into at least one of the headphone units and the headphones include at least one connection to a physically separate portable music device, the connection specifically enabling high quality playback of stereo music from the portable music device using the speakers;

the system further including an application running on a processor in the portable music device, or elsewhere, the application handling video data from the music headphones including transferring of the video data from the at least one video camera to the portable music device and enabling a user to do one or more of: edit the video; add music or other audio to the video;

share the video wherein the at least one integral video camera is concealed within a speaker housing of the headphones, in which a user can record a video using the at least one integral video camera, and the user can select at least one music track, genre, channel or playlist stored or accessible from the portable music device, to be the soundtrack to that video wherein said one music track, genre, channel or playlist is automatically generated by the portable music device based on they matching color and motion characteristics of the video being captured; and wherein said transferring of video data from the at least one video camera to the portable music device includes the transfer of real-time video that is relatively low resolution but sufficient to enable the user to view the scene being captured, and wherein high resolution video data is sent subsequently to the portable music device to store and to allow the user to edit that video on the portable music device.

25. The system of claim 24 in which the application provides music edit capability and the user creates or edits a soundtrack for the video by adding or editing a music track, genre, channel or playlist of choice.

26. The system of claim 24 in which the application provides video edit capability and the user edits the video on the device by adding or using an image filter of choice.

27. The system of claim 24 in which the application provides video edit capability and the user edits the video on the device by adding or using a video effect filter of choice.

28. The system of claim 24 in which the headphones include a motion sensor, to detect motion and data from the motion sensor is used by the application for image stabilisation of the image filmed by the or each at least one integral video camera.

29. The system of claim 24 in which the application displays an on-screen menu item on the music playback device that, if selected, enables a user to purchase an image and/or video filter for application to video(s).

30. The system of claim 24 in which the application displays an on-screen menu item on the portable music device that, if selected, enables a user to purchase a music track, genre, channel or playlist for application to video(s).

31. The system of claim 24 in which the application is a downloadable app that allows users to record video, edit video, select music as the soundtrack for that video, edit music, and to share videos with accompanying soundtracks.

32. The system of claim 24 in which the portable music device is a data connected device that can share the video with its accompanying music soundtrack over a wireless or wired data network.

33. The system of claim 32 in which sharing can be live streaming of a POV video and accompanying music track(s).

34. The system of claim 32 in which sharing is to one or more of a social network, a social media platform, a website to which users can contribute and share videos with others.

* * * * *